United States Patent
Ohtsuka et al.

[11] Patent Number: 6,075,614
[45] Date of Patent: Jun. 13, 2000

[54] SYSTEM FOR GENERATING PROOF

[75] Inventors: Shuichi Ohtsuka; Akira Yoda; Akito Ohkubo, all of Kanagawa-ken, Japan

[73] Assignee: Fuji Photo Film Co., Ltd., Kanagawa-ken, Japan

[21] Appl. No.: 09/382,016

[22] Filed: Aug. 24, 1999

Related U.S. Application Data

[62] Division of application No. 08/732,711, Oct. 18, 1996.

[30] Foreign Application Priority Data

| Oct. 20, 1995 | [JP] | Japan | 7-273247 |
| Mar. 18, 1996 | [JP] | Japan | 8-60912 |
| Apr. 12, 1996 | [JP] | Japan | 8-90983 |

[51] Int. Cl.[7] .............. B41B 15/00; H04N 1/21; G03F 3/08; G03F 3/10
[52] U.S. Cl. .............. 358/1.1; 358/1.1; 358/1.9; 358/298; 358/518; 358/527; 347/19; 382/162; 382/167
[58] Field of Search .............. 358/1.1, 1.9, 298, 358/518, 501–504, 527; 382/162, 167; 347/19

[56] References Cited

U.S. PATENT DOCUMENTS

| 4,481,532 | 11/1984 | Clark et al. | 358/80 |
| 4,926,254 | 5/1990 | Nakatsuka et al. | 358/527 |
| 4,959,669 | 9/1990 | Haneda et al. | |
| 5,121,195 | 6/1992 | Seki et al. | 358/75 |
| 5,598,272 | 1/1997 | Fisch et al. | 358/518 |

FOREIGN PATENT DOCUMENTS

| 0 405 470 | 1/1991 | European Pat. Off. | |
| 0 599 495 A1 | 6/1994 | European Pat. Off. | |
| 0 624 028 A1 | 11/1994 | European Pat. Off. | |
| 0 660 590 A2 | 6/1995 | European Pat. Off. | |
| 0 669 754 A2 | 8/1995 | European Pat. Off. | |
| 0 685 962 A2 | 12/1995 | European Pat. Off. | |
| 56-141673 | 11/1981 | Japan | H04N 1/46 |
| 5-181246 | 7/1993 | Japan | G03C 8/40 |
| 6-161070 | 6/1994 | Japan | G03C 8/40 |
| 6-237373 | 8/1994 | Japan | H04N 1/40 |
| 6-242546 | 9/1994 | Japan | G03C 1/498 |
| 6-289555 | 10/1994 | Japan | G03C 8/40 |
| 8-304982 | 11/1996 | Japan | G03C 8/40 |

*Primary Examiner*—Edward L. Coles
*Assistant Examiner*—Twyler Lamb
*Attorney, Agent, or Firm*—Sughrue, Mion, Zinn, Macpeak & Seas, PLLC

[57] ABSTRACT

Layout data are classified into character data, line image data, and gradation image data by an interpreter, and the line image data and the gradation image data are converted into data depending on printing conditions and output conditions of an output apparatus by a color conversion processor. The gradation image data are converted into data to which an image structure produced upon printing is imparted, by a halftone dot simulation processor. These data are converted into image data for scanning recording by a raster image processor, and outputted as a color proof image from the output apparatus.

18 Claims, 41 Drawing Sheets

FIG.9

| $d_{11}$ ($d_{ij}$) | | | | AF | | | | |
|---|---|---|---|---|---|---|---|---|
| 4 | 10 | 16 | 20 | 22 | 20 | 16 | 10 | 4 |
| 10 | 25 | 40 | 50 | 55 | 50 | 40 | 25 | 10 |
| 16 | 40 | 64 | 80 | 88 | 80 | 64 | 40 | 16 |
| 20 | 50 | 80 | 100 | 110 | 100 | 80 | 50 | 20 |
| 22 | 55 | 88 | 110 | 121 | 110 | 88 | 55 | 22 |
| 20 | 50 | 80 | 100 | 110 | 100 | 80 | 50 | 20 |
| 16 | 40 | 64 | 80 | 88 | 80 | 64 | 40 | 16 |
| 10 | 25 | 40 | 50 | 55 | 50 | 40 | 25 | 10 |
| 4 | 10 | 16 | 20 | 22 | 20 | 16 | 10 | 4 |

$d_{55}$

F I G. 19
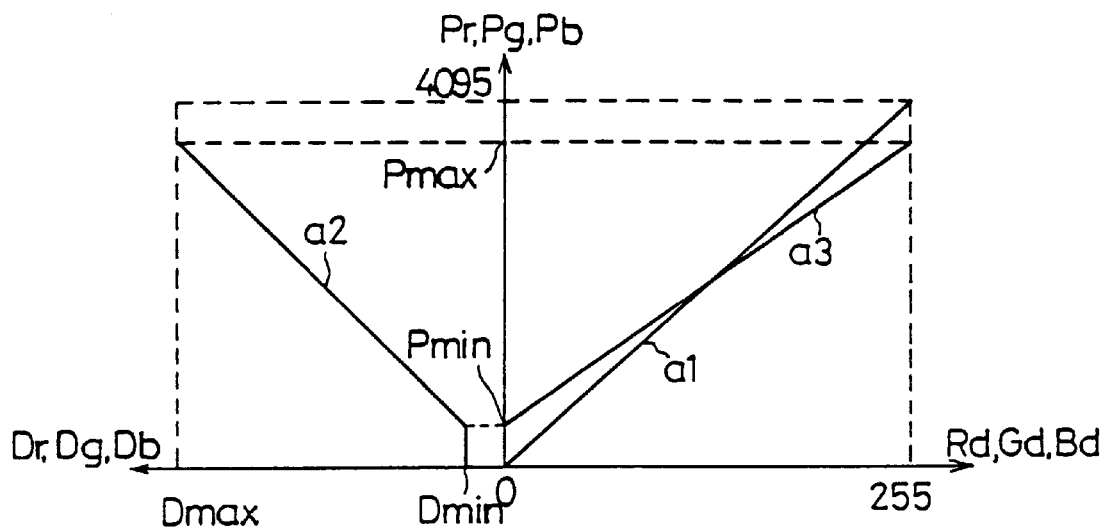
F I G. 20
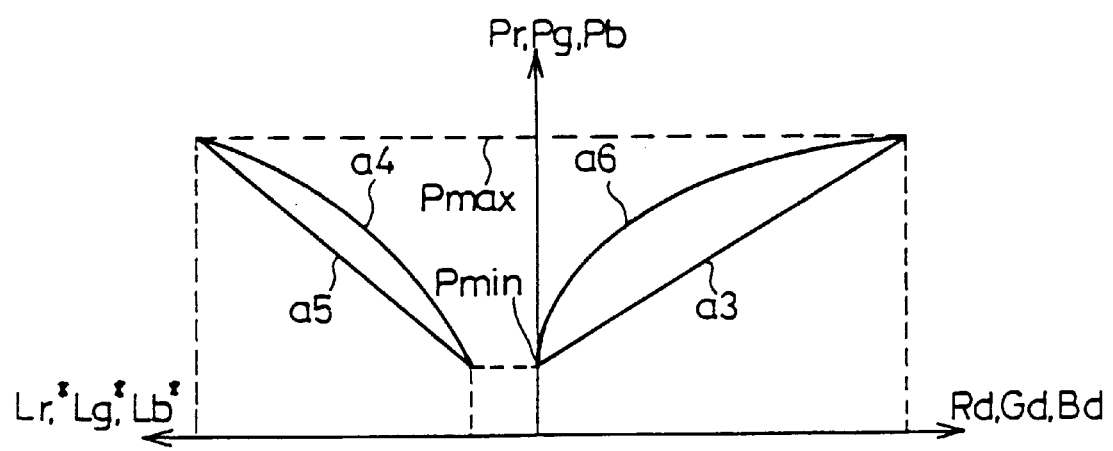

F I G. 22
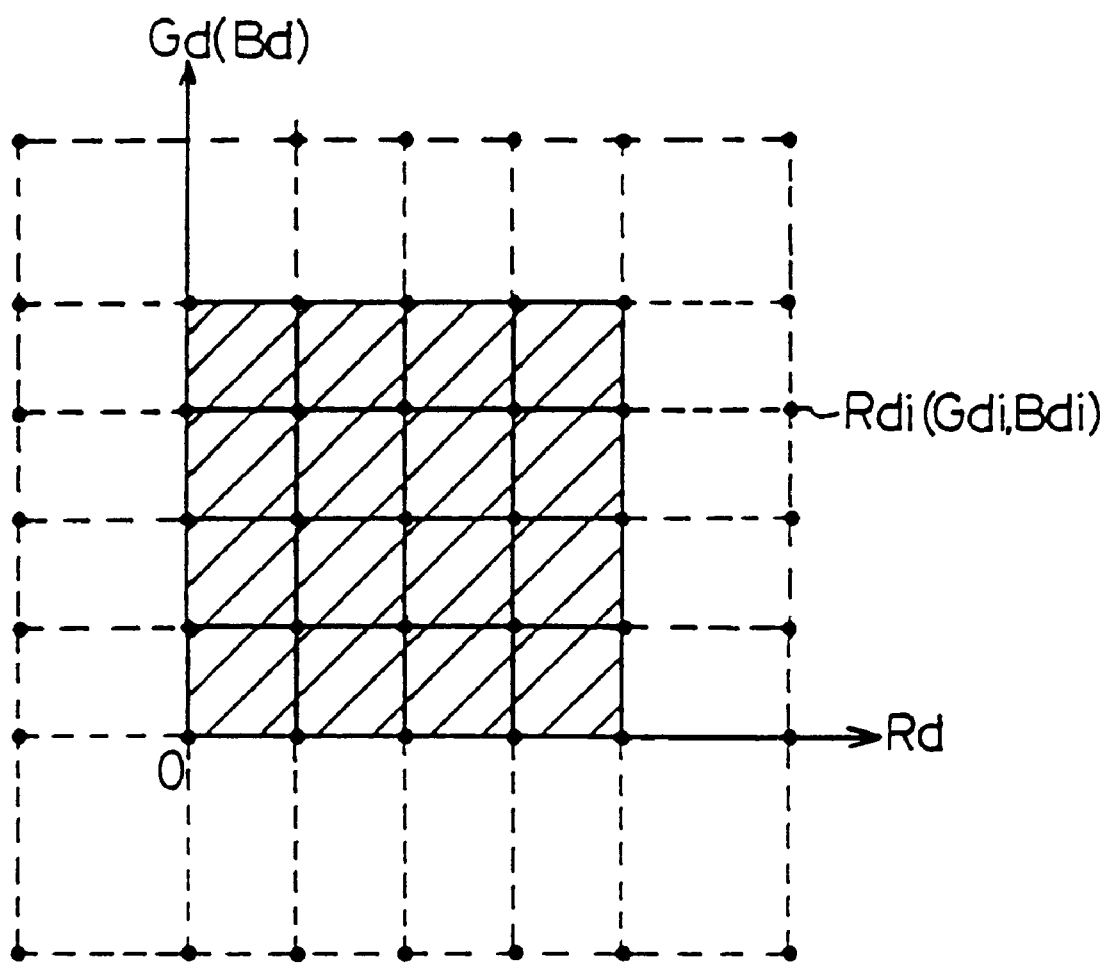

F I G. 28
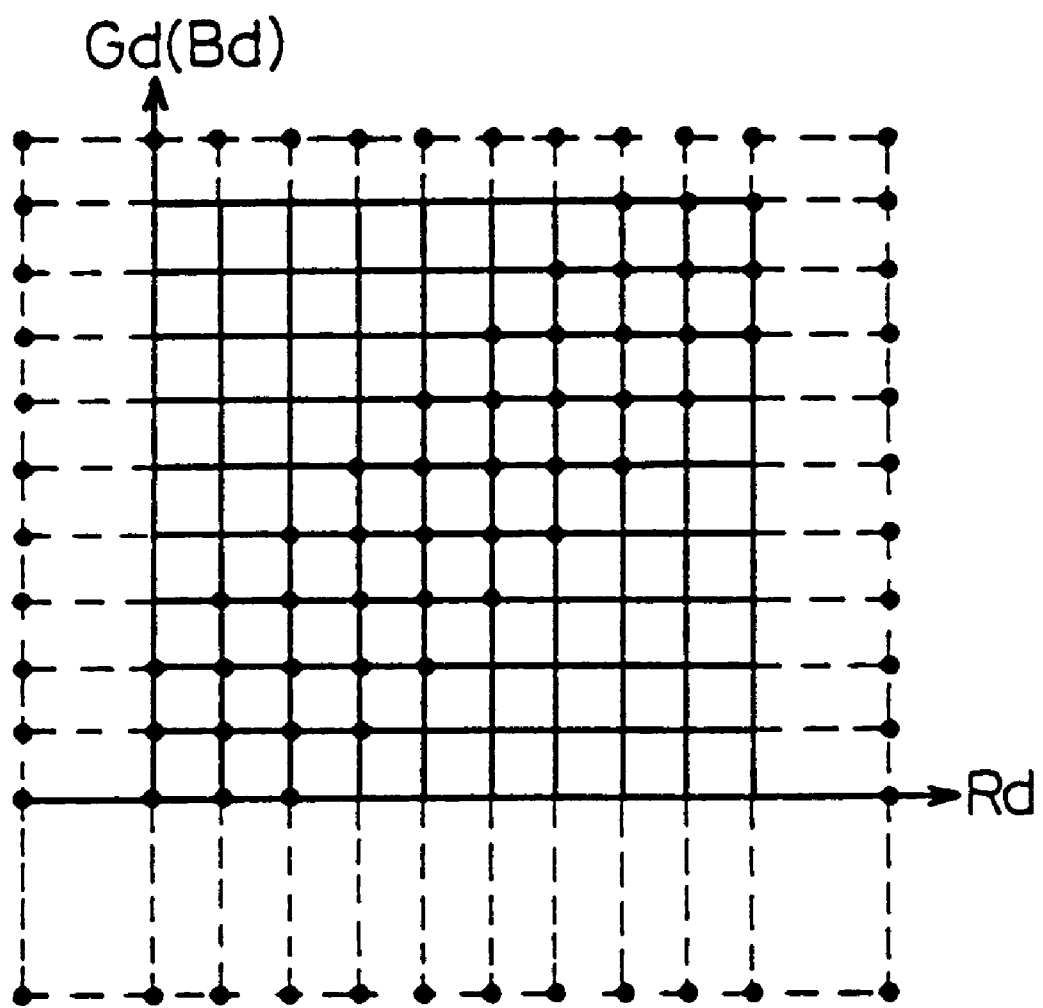

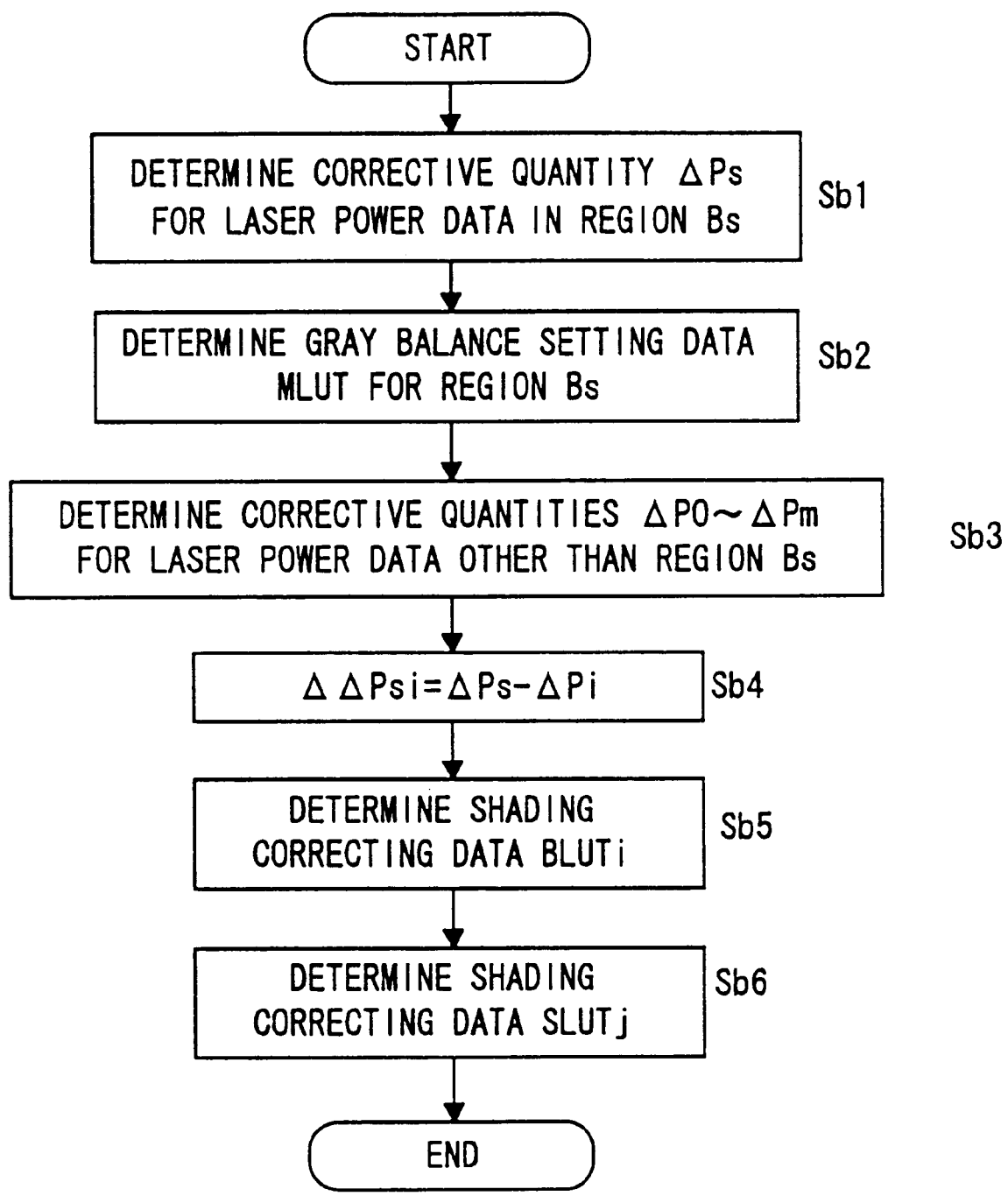

SYSTEM FOR GENERATING PROOF

This is a divisional of application Ser. No. 08/732,711 filed Oct. 18, 1996, the disclosure of which is incorporated herein by reference.

BACKGROUND OF THE INVENTION

1. Field of the Invention

The present invention relates to a system for generating a color proof image or color proof sheet to be checked against the original image, before a printed color document including a half-tone dot image is produced by a color printing machine such as a rotary press or the like.

2. Description of the Related Art

It has heretofore been customary to produce a color proof for examining and correcting colors before a printed color document of a halftone dot image is produced by a color printing press.

Color printers are used to produce color proofs because the color printers are relatively simple in structure and inexpensive to manufacture and can produce hard copies with images formed on sheets a plurality of times in a short period of time since, as well known in the art, they do not need the production of process-plate films and presensitized plates which are required by color printing machines.

FIG. 43 of the accompanying drawings shows the sequence of a conventional process of producing a color proof.

According to the conventional process of producing a color proof, as shown in FIG. 43, an image on an image document 2 is read by an image reader such as a color scanner having a CCD area sensor or the like, and gradation image data Ia of each of the colors R (red), G (green), and B (blue) are generated from the read image in a step F1.

Then, the RGB gradation image data Ia are converted by a color conversion process into halftone dot area percentage data aj of the four plates of respective colors C (cyan), M (magenta), Y (yellow), and K (black), where j=C, M, Y, K) in a step F2. The color conversion process has various versions corresponding to different color printing machines, and those versions are based on know-hows of various printing companies depending on their color printing machines.

Images on printed color documents produced by the color printing machines are halftone dot images. To produce a printed color document actually, halftone dot area percentage data aj produced by a color conversion process are developed into bit map data, and a process-plate film or the like is generated based on the bit map data. Because an automatic image developing machine is required, a process following the generation of the process-plate film is considerably complex.

In order to facilitate the production of a color proof, a digital color printer DP is employed as an image output apparatus. The digital color printer DP forms an image on a donor film by digitally controlling the intensity and time of three-primary emission of LED (light-emitting diode) light or LD (laser diode) light per pixel, and transfers the image from the donor film to an image-receiving sheet to form the image thereon. The digital color printer DP is much more inexpensive than a color printing machine which generates presensitized plates from printing plates and produces a printed color document with the presensitized plates. The digital color printer DP is also smaller in volume and lighter in weight.

In order to employ the digital color printer DP, it is necessary to convert the halftone dot area percentage data aj of the four plates C, M, Y, K produced in the step F2 into image data (called "common color space data") independent of devices including a printing device, a CRT, a photographic device, an LED, etc., e.g., tristimulus value data X, Y, Z.

Therefore, the halftone dot area percentage data aj of the four plates C, M, Y, K are converted into tristimulus value data X, Y, Z by a image data processing in a step F4. The image data processing has heretofore been carried out by a process which uses the Neugebauer's equation.

For such conversion, calorimetric data Xi, Yi, Zi (i represents $2^4=16$ colors for the four plates C, M, Y, K) for the colors of printing inks are measured by a calorimeter. For measuring the calorimetric data Xi, Yi, Zi, the 16 colors are printed on a print sheet which will be used to produce a printed color document by a color printing machine. The 16 colors correspond to the presence and absence of the respective colors C, M, Y, K, which represent a combination of $2^4=16$ colors.

Specifically, the 16 colors include the color W (white) which is present when nothing is printed on the print sheet, the primary colors C, M, Y, the color K (black), and the mixed colors C+M, C+Y, C+K, M+Y, M+K, Y+K, C+M+Y, C+M+K, C+Y+K, M+Y+K, and C+M+Y+K. The colors of reflections from the colors printed on the print sheet are measured by a calorimeter such as a spectrometer, for example, thereby producing the calorimetric data Xi, Yi, Zi.

According to the process which uses the Neugebauer's equation, the calorimetric data Xi, Yi, Zi are multiplied by a coefficient of halftone-dot area percentage data hi, as shown below, thus producing the tristimulus value data X, Y, Z in the step F4.

$$X = \sum hi \cdot Xi, \quad (1)$$
$$Y = \sum hi \cdot Yi, \text{ and}$$
$$Z = \sum hi \cdot Zi$$

where $i = 0 \sim 15$, $h0 = (1-c) \cdot (1-m) \cdot (1-y) \cdot (1-k)$, $h1 = c \cdot (1-m) \cdot (1-y) \cdot (1-k)$, $h2 = (1-c) \cdot m \cdot (1-y) \cdot (1-k)$, $h3 = c \cdot m \cdot (1-y) \cdot (1-k)$, $h4 = (1-c) \cdot (1-m) \cdot y \cdot (1-k)$, $h5 = c \cdot (1-m) \cdot y \cdot (1-k)$, $h6 = (1-c) \cdot m \cdot y \cdot (1-k)$, $h7 = c \cdot m \cdot y \cdot (1-k)$, $h8 = (1-c) \cdot (1-m) \cdot (1-y) \cdot k$, $h9 = c \cdot (1-m) \cdot (1-y) \cdot k$, $h10 = (1-c) \cdot m \cdot (1-y) \cdot k$, $h11 = c \cdot m \cdot (1-y) \cdot k$, $h12 = (1-c) \cdot (1-m) \cdot y \cdot k$, $h13 = c \cdot (1-m) \cdot y \cdot k$, $h14 = (1-c) \cdot m \cdot y \cdot k$, and $h15 = c \cdot m \cdot y \cdot k$ where c, m, y, k represent halftone-dot area percentage data aj of the colors C, M, Y, K.

The tristimulus value data X, Y, Z thus generated are supplied to the digital color printer DP. The digital color printer DP converts the tristimulus value data X, Y, Z into data of the three primaries with respect to the LED or the like, i.e., image data depending on the devices, which may also be called inherent color space data, based on a look-up table (LUT), and thereafter generates the color proof CPa, which is a hard copy with an image formed on a sheet, based on the image data.

In the case where the tristimulus value data X, Y, Z for the digital color printer DP are generated according to the Neugebauer's equation, the colors of a printed color document to be produced can accurately be reproduced in the image on the hard copy because the colorimetric data measured by a colorimeter as representing the colors of an image to be formed on the printed color document by the color printing machine are employed. However, interference fringes such as moiré, a rosette image, or the like (hereinafter referred to as a "false pattern") which appears on a printed color document, or stated otherwise an interference irregularity caused by a periodic structure of halftone dots peculiar to printed documents, cannot be reproduced in the image on the hard copy.

If such a false pattern actually appears on a printed color document, then it should also accurately be reproduced on a color proof CPa. Generally speaking, the conventional color proof CPa which fails to reproduce a false pattern thereon cannot be said as an accurate proof for a printed color document.

It is believed that no false pattern can be reproduced on a hard copy produced by the digital color printer DP because the Neugebauer's equation is a formula based on a kind of theory of probability and is unable to reproduce a microscopic image structure (halftone structure) of a false pattern.

For reproducing an image structure, it is necessary for an image output device which outputs a hard copy to have a mechanism for producing the same image structure (threshold matrix, bit map data, or the like) as that of a printed document which is to be approximated. It is difficult and substantially expensive for such a mechanism to cope with all of various printing conditions.

In order to generate an accurate proof image for printed color documents, it is not enough to reproduce the above image structure. For example, there are available various sheets and inks for printing depending on how printed documents are used and also on the user. Some color printers can use materials which are identical or very similar to those of printed documents, but find highly limited applications. It is also necessary to generate proof images in view of environments in which to compare printed documents and proof images. For example, the colors of printed documents or proof images may look different under different light sources used for observation.

The digital color printer DP for generating color proof images may not be able to reproduce desired colors depending on initial settings or aging. To correct the relationship between image data in the form of halftone dot area percentage data and colors that are outputted, it has been proposed to generate monochromatic halftone charts of the primary colors C, M, Y, measure the densities of the monochromatic halftone charts, and feed back the measured densities to generate a color conversion table for outputting desired colors, as disclosed in Japanese laid-open patent publication No. 56-141673. According to the proposed process, since no gray balance adjustments are made, the accuracy of the color of gray may not necessarily be ensured though monochromatic gradations can be reproduced with high precision. Specifically, the color of gray is produced by a superposition of plural individual colors, and even if the individual colors are established accurately and the color of gray can accurately be obtained from a theoretical standpoint, the color of gray may not accurately be obtained actually due to trapping and a dot gain upon printing because the proportions of the individual colors tend to varies thereby.

According to another conventional process, as revealed in Japanese laid-open patent publication No. 6-237373, any difference between the colors of gray between two output devices is corrected using a corrective matrix which is established to equalize equivalent neutral densities (END). This process allows the gray balance of one output device to be adjusted with respect to another output device, used as a reference, for which the color of gray has been established accurately.

With the above process, however, it is difficult to adjust the gray balance with high precision because the difference between the colors of gray is approximately corrected linearly using the corrective matrix regardless of the fact that image data are converted into output control data by a nonlinear color conversion relationship.

In either of the above conventional processes, the gray balance of an output device used as a reference is established by outputting charts based on device data of the output device and determining a conversion relationship capable of making the charts gray as a gray balance on a trial-and-error basis. Therefore, it has been quite time-consuming to establish the gray balance.

Output devices for outputting images, such as digital color printers, may undergo trouble known as shading, resulting in color irregularities on a print sheet, when an image is recorded on the entire area of the print sheet based on uniform image data. In an output device which records an image by scanning a print sheet on a drum with a laser beam, such shading may be caused by density differences due to different spot shapes of the laser beam depending on the position on the drum. In an output device which records an image on a print sheet on a drum through thermal transfer recording, such shading may be caused by density differences due to temperature irregularities in the axial direction of the drum.

The shading may be corrected by forming an image based on uniform image data over the entire area of a print medium and generating a color conversion table such that the density of the image is constant irrespective of the position on the print medium, according to the C, M, Y. The conventional process disclosed in Japanese laid-open patent publication No. 56-141673. However, such shading correction cannot be made with respect to the color of gray which is a tertiary color produced from the colors C, M, Y. The conventional shown in Japanese laid-open patent publication No. 6-237373 serves to calibrate the color of gray, but not to correct shading. Any of the above conventional processes requires a very large number of measuring points for highly accurate shading correction, and needs a considerable processing time for shading correction.

SUMMARY OF THE INVENTION

It is a general object of the present invention to provide a system for generating a color proof image which agrees highly accurately with a printed color document produced by a color printing machine, using an output apparatus such as a color printer which is relatively inexpensive and low in resolution.

A principal object of the present invention is to provide a system for generating a color proof, which is capable of establishing and adjusting a gray balance with high precision in an output apparatus that is desired to produce a printed color document.

Another object of the present invention is to provide a system for generating a color proof, which is capable of establishing a gray balance easily and highly accurately using output characteristic data of a reference output apparatus for which a gray balance has been established, with respect to a number of output apparatus that are desired to produce printed color documents.

Still another object of the present invention is to provide a system for generating a color proof, which is capable of correcting shading highly accurately around the color of gray, simultaneously with establishing a gray balance, with a reduced number of measuring points.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 9 is a diagram showing an anti-aliasing filter in the halftone dot simulation process shown in FIG. 7;

FIG. 19 is a diagram illustrative of the process for generating output adjustment data shown in FIG. 18;

FIG. 20 is a diagram illustrative of the process for generating output adjustment data shown in FIG. 18;

FIG. 22 is a diagram illustrative of device data including hypothetical device data;

FIG. 28 is a diagram of device data including hypothetical device data obtained from a temporary gray balance;

FIG. 37 is a flowchart of another process of establishing a gray balance and correcting shading with respect to the desired output apparatus;

DETAILED DESCRIPTION OF THE PREFERRED EMBODIMENTS

Figure 1:
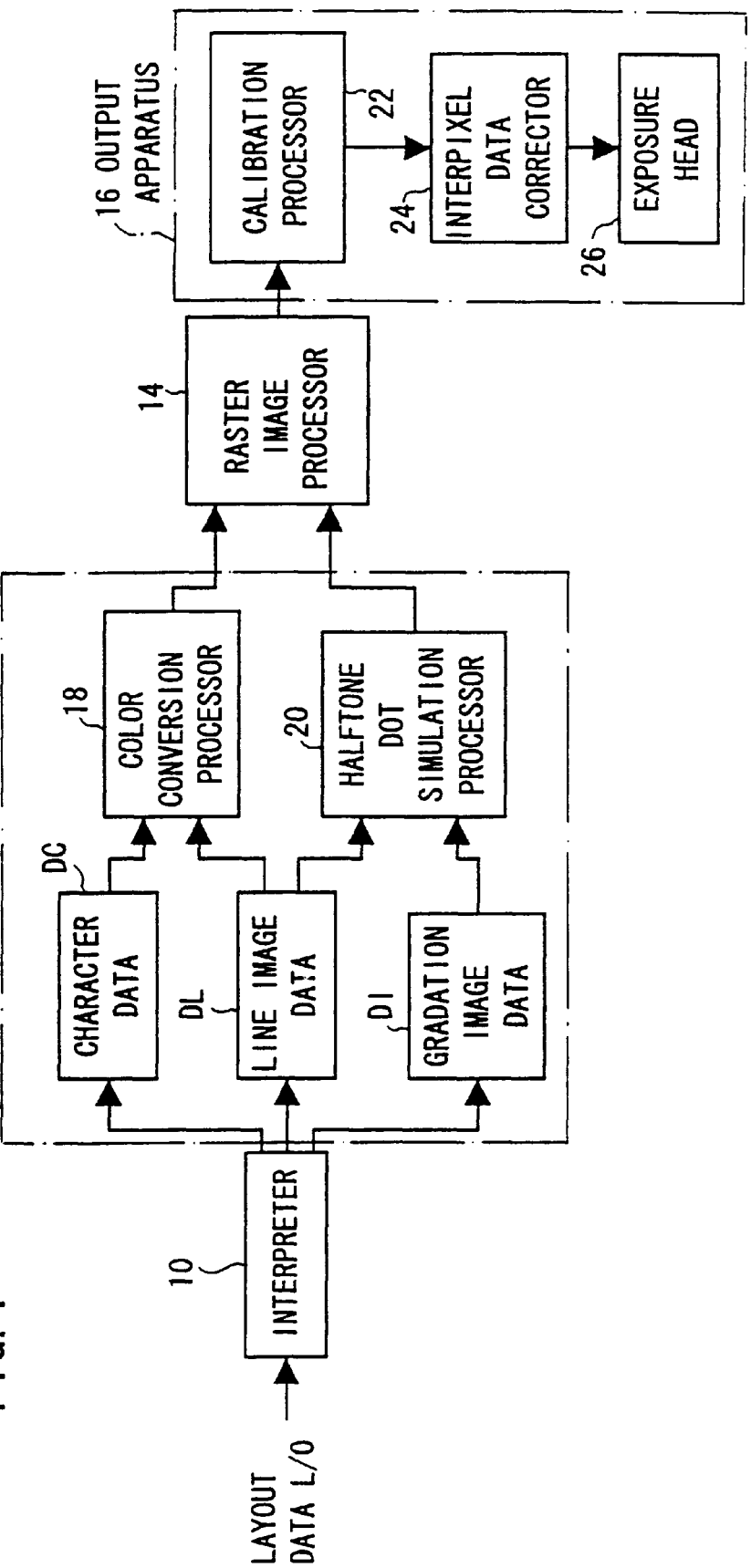
FIG. 1 is a block diagram of a proof generating system according to the present invention.

FIG. 1 schematically shows a proof generating system according to the present invention.

As shown in FIG. 1, the proof generating system basically comprises an interpreter 10 for interpreting layout data L/O (see FIG. 2) containing character data DC, line image data DL, and gradation image data DI assembled in a printed image layout, and separating the data depending on their type, a proof generating apparatus 12 for generating color proof data for examining a printed color document, from the layout data L/O, a raster image processor 14 for converting the color proof data into raster image data to be outputted by scanning, and an output apparatus 16 for generating a color proof image based on the raster image data.

The proof generating apparatus 12 has a color conversion processor 18 (image data converter) for effecting a color conversion process on the character data DC and the line image data DL based on printing conditions of a printed color document produced by a color printing machine and output conditions of a color proof image generated by the output apparatus 16. The proof generating apparatus 12 also has a halftone dot simulation processor 20 (image data converter) for carrying out a process on the gradation image data DI to reproduce an image structure of an image which is produced due to a halftone dot screening process for producing a printed color document.

The output apparatus 16 has a calibration processor 22 for calibrating output characteristics thereof against aging and characteristics of a recording medium against variations. The output apparatus 16 also has an interpixel data corrector 24 for correcting interpixel data out of an interference between adjacent pixels to be recorded which is caused by the scanning of the recording medium by an exposure head 26.

Figure 3:
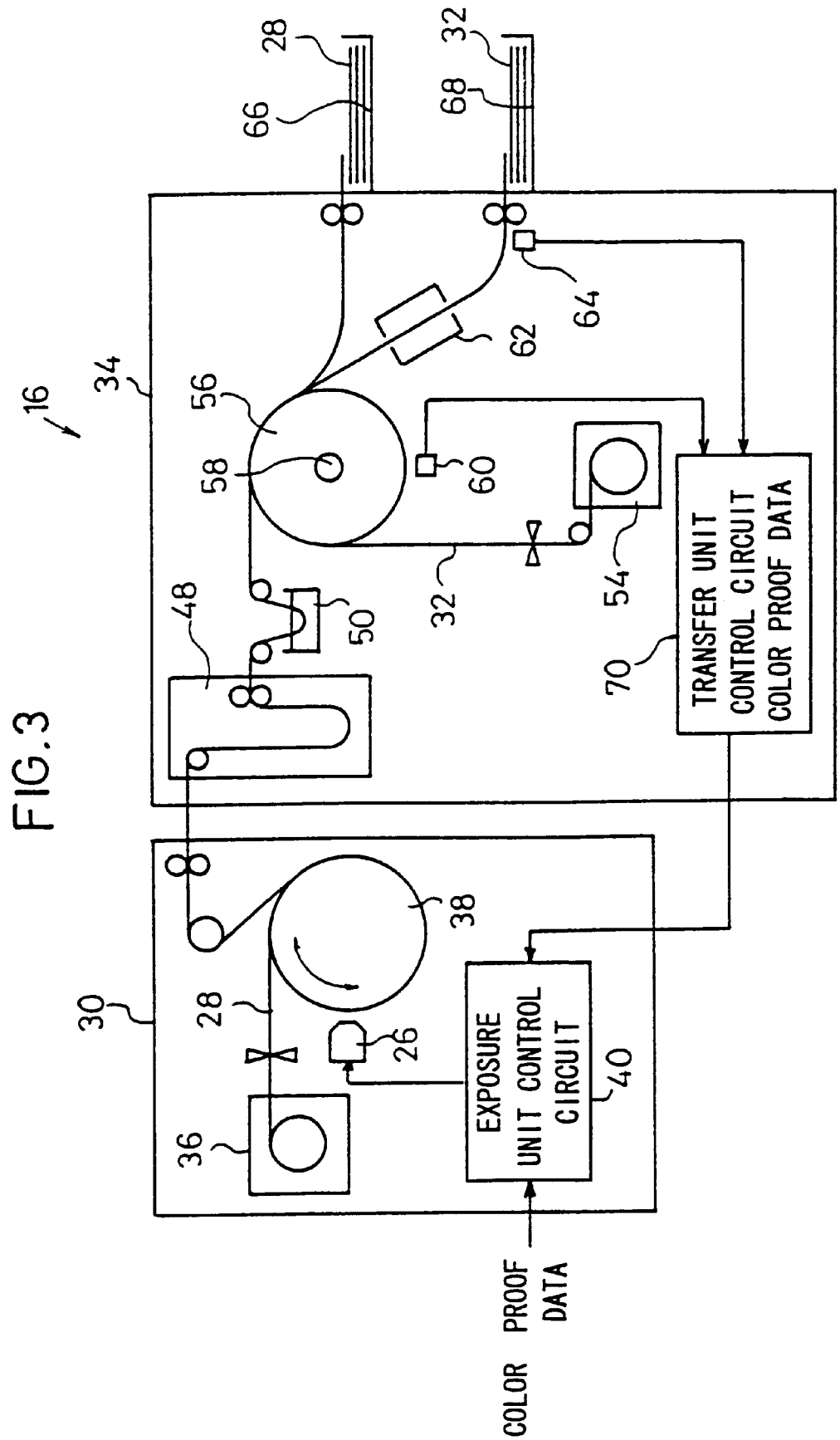
FIG. 3 is a schematic diagram, partly in block form, of an output apparatus of the proof generating system shown in FIG. 1.

Details of the output apparatus 16 will be described below with reference to FIG. 3.

The output apparatus 16 basically comprises an exposure unit 30 for forming a latent image of a color proof on a photosensitive medium 28, and a transfer unit 34 for heating the photosensitive medium 28 in superposed relation to an image-receiving medium 32 to transfer a visible image of the color proof onto the image-receiving medium 32.

The exposure unit 30 comprises a magazine 36 which accommodates a roll of the photosensitive medium 28, an exposure drum 38 for winding thereon the photosensitive medium 28 unreeled from the magazine 36, an exposure head 26 for scanning the photosensitive medium 28 on the exposure drum 38 with a beam modulated by color proof data for thereby forming a latent image of a color proof on the photosensitive medium 28, and an exposure unit control circuit 40 for controlling the exposure unit 30 and the exposure head 26. The exposure head 26 is movable along the axis of the exposure drum 38 for forming a two-dimensional latent image on the photosensitive medium 28 on the exposure drum 38 while it is rotating about its axis.

Figure 4:
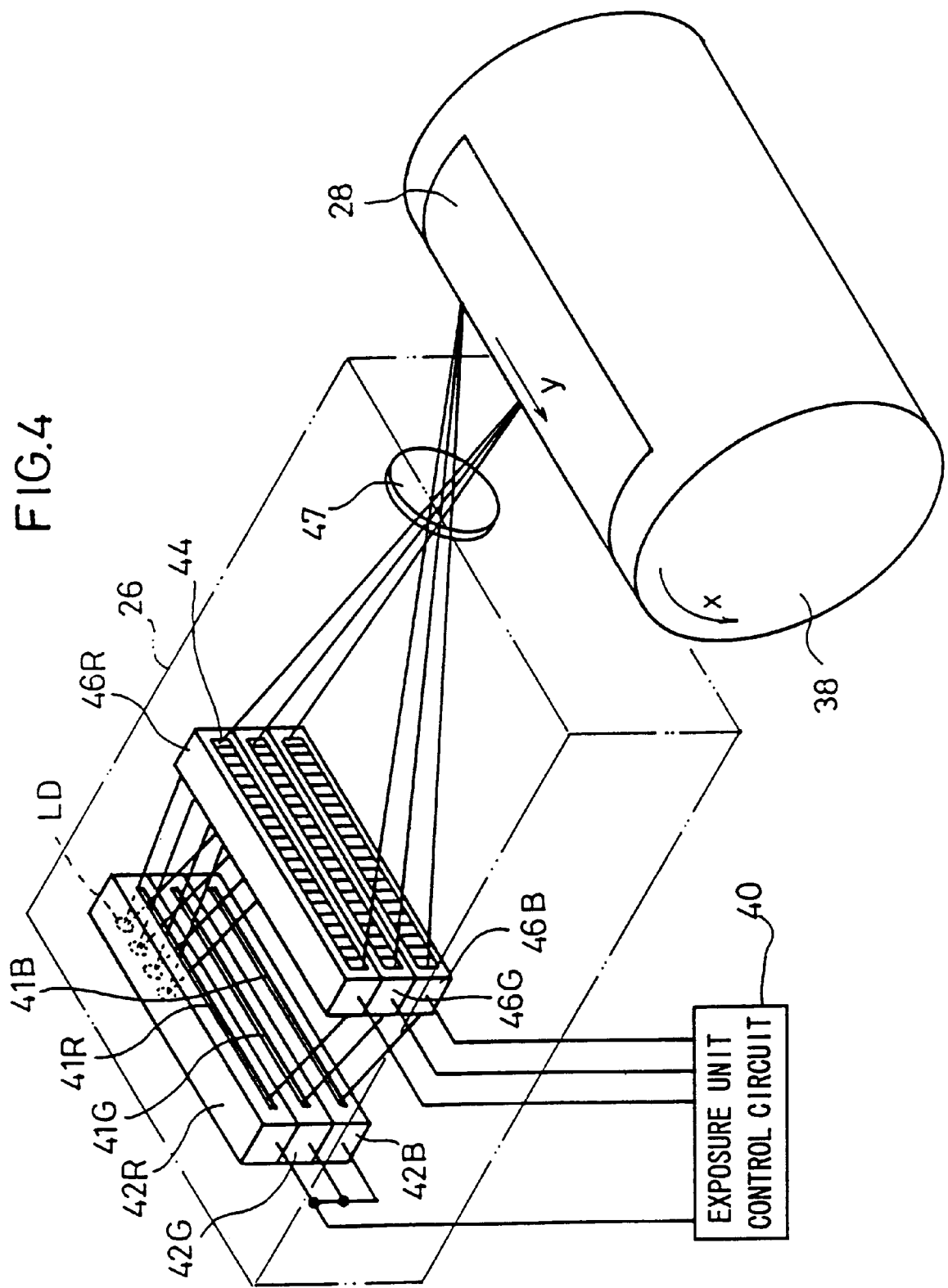
FIG. 4 is a perspective view, partly in block form, of an exposure head of the output apparatus shown in FIG. 3.

As shown in FIG. 4, the exposure head 26 is arranged to move in an auxiliary scanning direction "y" along the axis of the exposure drum 38 which rotates in a main scanning direction "x". The exposure head 26 comprises a plurality of light source units 42R, 42G, 42B having respective slits 41R, 41G, 41B which extend parallel to the auxiliary scanning direction "y" and accommodating a plurality of laser diodes (LD), a plurality of linear light modulators (LLMs) 46R, 46G, 46B aligned respectively with the light source units 42R, 42G, 42B and having a plurality of light modulator elements 44 arrayed along the auxiliary scanning direction "y", and a condenser lens 47. Laser beams emitted from the laser diodes are applied to the respective light modulator elements 44.

The light modulator elements 44 of the linear light modulators 46R, 46G, 46B individually modulate the laser beams from the light source units 42R, 42G, 42B with color proof data R, G, B supplied from the exposure unit control circuit 40. Each of the light modulator elements 44 may comprise a PLZT device made of a metal compound ceramic material comprising a piezoelectric material PLZT ($PbZrO_3$ or $PbTiO_3$) with La added thereto, or a liquid crystal switching device. The laser beams emitted from the laser diodes of the light source units 42R, 42G, 42B have different wavelengths for forming respective latent images of R, G, B on the photosensitive medium 28.

While the wavelengths of the laser beams emitted from the laser diodes need to correspond to the respective photosensitive wavelengths of respective layers of R, G, B of the photosensitive medium 28, the wavelengths may not necessarily be those of R, G, B, but laser diodes for emitting red beams or infrared beams, which are stably available in the art, may be used.

In FIG. 4, the light modulator elements 44 are linearly arrayed parallel to the axis of the exposure drum 38, but may be arranged otherwise. For example, the light modulator elements 44 may be arrayed obliquely to the axis of the exposure drum 38 for recording image pixels on the photosensitive medium 28 at a pitch different from the pitch of the light modulator elements 44 for recording an image at a high resolution or changing the resolution of an image on the photosensitive medium 28. Alternatively, the light modulator elements 44 may be arranged in a zigzag pattern for recording image pixels at an interval smaller than the pitch of the light modulator elements 44.

The transfer unit 34 comprises a buffer 48 for adjusting the speed at which the photosensitive medium 28 supplied from the exposure unit 30 is fed to prevent the photosensitive medium 28 from being excessively sagged or tensioned, a water applicator 50 for applying moistening water to the photosensitive medium 28 which has passed through the buffer 48, a magazine 54 which accommodates a roll of the image-receiving medium 32, a heating drum 56 for winding and heating the photosensitive medium 28 and the image-receiving medium 32 in superposed relation to each other, a heater 58 such as a halogen lamp or the like for heating the heating drum 56 to a predetermined temperature, a temperature sensor 60 for detecting the temperature of the heating drum 56, a drier 62 for drying the image-receiving medium 32 to which a color proof image has been transferred from the photosensitive medium 28, a calorimeter 64 for measuring the colors of the image recorded on the image-receiving medium 32, a tray 66 for receiving the photosensitive medium 28, a tray 68 for receiving the image-receiving medium 32, and a transfer unit control circuit 70 for controlling operation of the transfer unit 34.

The photosensitive medium 28 used in the exposure unit 30 may be made of a heat-development photosensitive material for heat-developing a latent image formed thereon by exposure to modulated laser beams, in the presence of an image forming solvent, and transferring the developed image onto the image-receiving medium 32. The heat-development photosensitive material basically comprises a photosensitive silver halide, a reducing agent, a binder, and a dye donating compound (the reducing agent may double as such a dye donating compound) which are coated on a support, and may also contain an organic metal oxidizing agent, etc.

The heat-development photosensitive material may produce a negative image or a positive image upon exposure to modulated laser beams. For producing negative image, a positive emulsifying agent may be used as the photosensitive silver halide and either a sensitizer or exposure to light may be used, or a dye donating compound may be used which discharges a diffusive dye image in a positive pattern.

The heat-development photosensitive material for producing a positive image may be any of the materials disclosed in Japanese laid-open patent publications Nos. 6-161070 and 6-289555. The heat-development photosensitive material for producing a negative image may be any of the materials disclosed in Japanese laid-open patent publications Nos. 5-181246 and 6-242546 and Japanese patent applications Nos. 7-127386 and 7-195709.

Processing operation of the proof generating system of the above structure will be described below.

Figure 2:
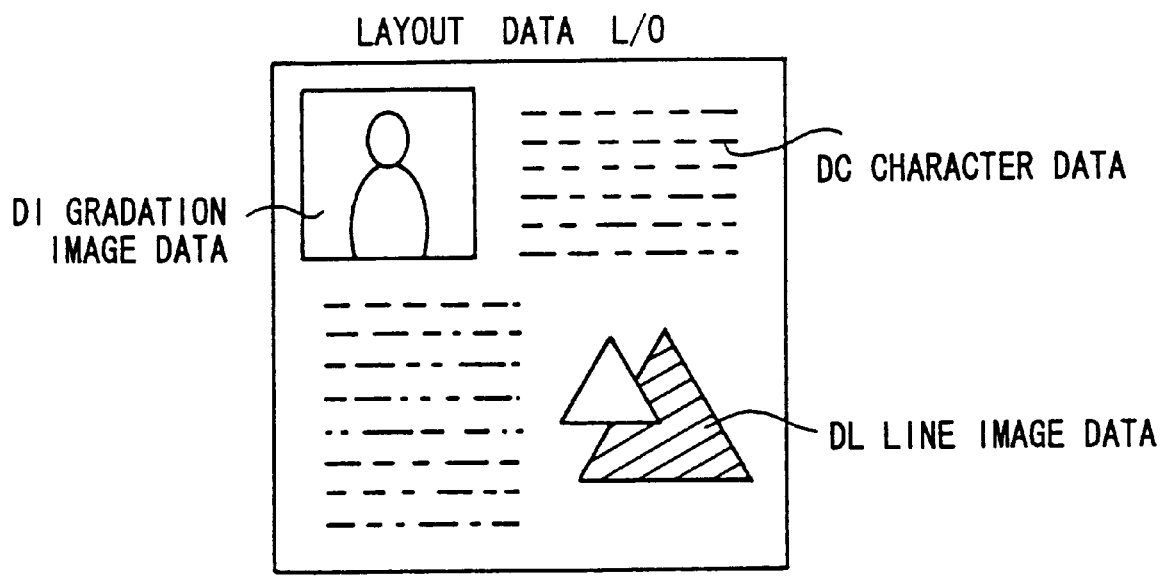
FIG. 2 is a diagram showing layout data.

First, the layout data L/O containing character data DC, line image data DL, and gradation image data DI as shown in FIG. 2 which are assembled in a printed image layout are supplied to the interpreter 10.

In a normal printing process, color plates, i.e., plates C, M, Y, K, are generated from the layout data L/O, then print plates are generated from the color plates, and a color image is printed on a desired print sheet with desired inks using the print plates. For generating the plates C, M, Y, K, the gradation image data DI which are to be subject to a halftone dot screening process and are composed of halftone dot area percentage data of C, M, Y, K are compared with threshold data having desired screen types, screen angles, and screen rulings (second printing conditions) for conversion into bit map data which are binary data of 1s and 0s. Based on the bit map data, laser diodes or the like are energized to form the plates C, M, Y, K on a photosensitive medium. The printed color image which is generated using the color plates has an image structure in the form of interference fringes such as moire, a rosette image, or the like that are produced due to the halftone dot screening process. The printed color image has features depending on the print sheet and inks used, and suffers a color tone which varies depending on a light source with which to observe the printed color image.

The proof generating system according to the present invention processes the layout data L/O in view of printing conditions and output conditions of the output apparatus 16 to produce a color proof which is equivalent to the printed color image, as follows:

The interpreter 10 interprets supplied layout data L/O, separates the layout data L/O into character data DC, line image data DL, and gradation image data DI, and supplies them to the proof generating apparatus 12. The proof generating apparatus 12 supplies the character data DC and the line image data DL to the color conversion processor 18, and supplies the gradation image data DI to the halftone dot simulation processor 20. If the line image data DL are to be subject to the halftone dot screening process, then the line image data DL are also supplied to the halftone dot simulation processor 20.

Figure 5:
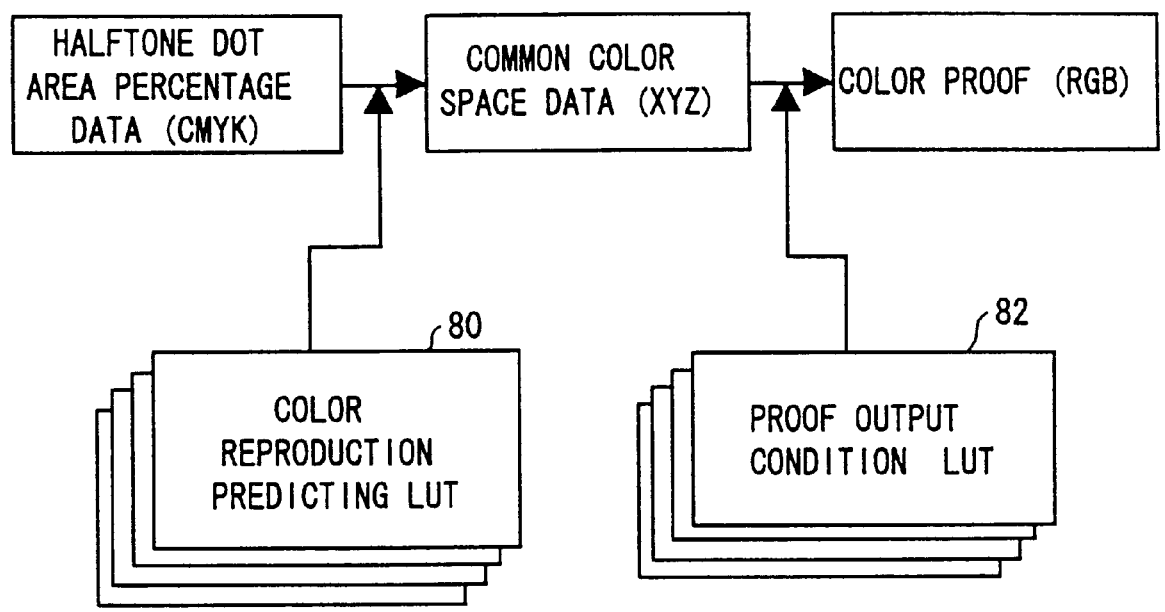
FIG. 5 is a block diagram of a color conversion process of the proof generating system shown in FIG. 1.

The color conversion processor 18 effects a color conversion process on the character data DC and the line image data DL as shown in FIG. 5. As shown in FIG. 5, the character data DC or the line image data DL, which comprise halftone dot area percentage data of the four plates C, M, Y, K, are converted into calorimetric data not dependent on output devices, e.g., tristimulus data X, Y, Z, using a color reproduction predicting lookup table (LUT) 80 which has been established with respect to first printing conditions.

The first printing conditions include the type of a print sheet (a coated sheet, a mat coated sheet, an uncoated sheet, or the like) on which a final printed color image is to be formed, the type of inks used for printing the color image, etc. The color reproduction predicting lookup table 80 is produced by generating a test pattern of printed color document with respect to the printing conditions and measuring the tristimulus data X, Y, Z of the colors of the test pattern. The relationship of colors not present in the test pattern can be determined by an interpolating process.

The colors of the printed color document vary depending on the light source used for observation. Therefore, a plurality of color reproduction predicting lookup tables 80 are prepared for respective different light sources for observation, e.g., daylight, fluorescent light, etc., as one of the first printing conditions, and one of the color reproduction predicting lookup tables 80 is selected depending on the observational light source used. A certain print sheet contains a fluorescent brightener which emits light differently depending on the proportion of an ultraviolet radiation contained in the observational light source. Therefore, the fluorescent brightener emits light in a different color when irradiated by a different observational light source. To take into account the dependency of the fluorescent brightener and the observational light source, a coefficient $\epsilon$ representing the dependency of the observational light source and coefficients $\Delta X$, $\Delta Y$, $\Delta Z$ representing the dependency of the fluorescent brightener are made selectively available depending on the observational light source and the print sheet which are used, and tristimulus data $X_0$, $Y_0$, $Z_0$ of the color reproduction predicting lookup tables 80 with respect to a standard observational light source are corrected as follows:

$$X = X_0 + \epsilon \Delta X,$$

$$Y = Y_0 + \epsilon \Delta Y, \text{ and}$$

$$Z = Z_0 + \epsilon \Delta Z \quad (2)$$

thereby producing new tristimulus data X, Y, Z.

More specifically, tristimulus data are determined with a light source which emits a different amount of ultraviolet radiation from a standard observational light source and which has the same spectral intensity in the visible range as the standard observational light source, and the differences between the determined tristimulus data and tristimulus data that have been determined with the standard observational light source are used as the coefficients $\Delta X$, $\Delta Y$, $\Delta Z$. The coefficient $\epsilon$, which represents the internal ratio of the amount of ultraviolet radiation of the observational light source that is present between the above two light sources, and the above coefficients $\Delta X$, $\Delta Y$, $\Delta Z$ are substituted in the equations (2), thereby determining tristimulus data X, Y, Z with the desired observational light source.

The color reproduction predicting lookup table 80 is thus selected depending on the first printing conditions, and corrected, if necessary, depending on the observational light source used and the fluorescent brightener of the print sheet used, and the halftone dot area percentage data are converted into tristimulus data X, Y, Z depending on the first printing conditions, using the selected color reproduction predicting lookup table 80.

Then, the tristimulus data X, Y, Z are converted into color proof data depending on the output apparatus 16, e.g., RGB data, using a proof output condition lookup table (LUT) 82 (third converting means) established depending on the output conditions of the output apparatus 16 which is used.

Proof output conditions include the type of the photosensitive medium 28 and the type of the image-receiving medium 32 (a mat sheet, a gloss sheet, etc.) which are used in the output apparatus 16. The proof output condition lookup table 82 is produced by selecting a photosensitive medium 28 and an image-receiving medium 32 according to given proof output conditions, generating a test pattern using the photosensitive medium 28 and the image-receiving medium 32 with the output apparatus 16, and measuring the tristimulus data X, Y, Z of the colors of the test pattern. The relationship of colors not present in the test pattern can be determined by an interpolating process. There are available a plurality of proof output condition lookup tables 82 corresponding to various proof output conditions.

One of the proof output condition lookup tables 82 which corresponds to desired proof output conditions is selected, and the tristimulus data X, Y, Z are converted into RGB data using the selected proof output condition lookup table 82. The RGB data are thus produced taking into account the photosensitive medium 28 and the image-receiving medium 32 which are used in the output apparatus 16. The color reproduction predicting lookup table 80 and the proof output condition lookup table 82 may be combined into a single lookup table, and color proof data may be generated directly from the halftone dot area percentage data aj using such a single lookup table.

Figure 6:
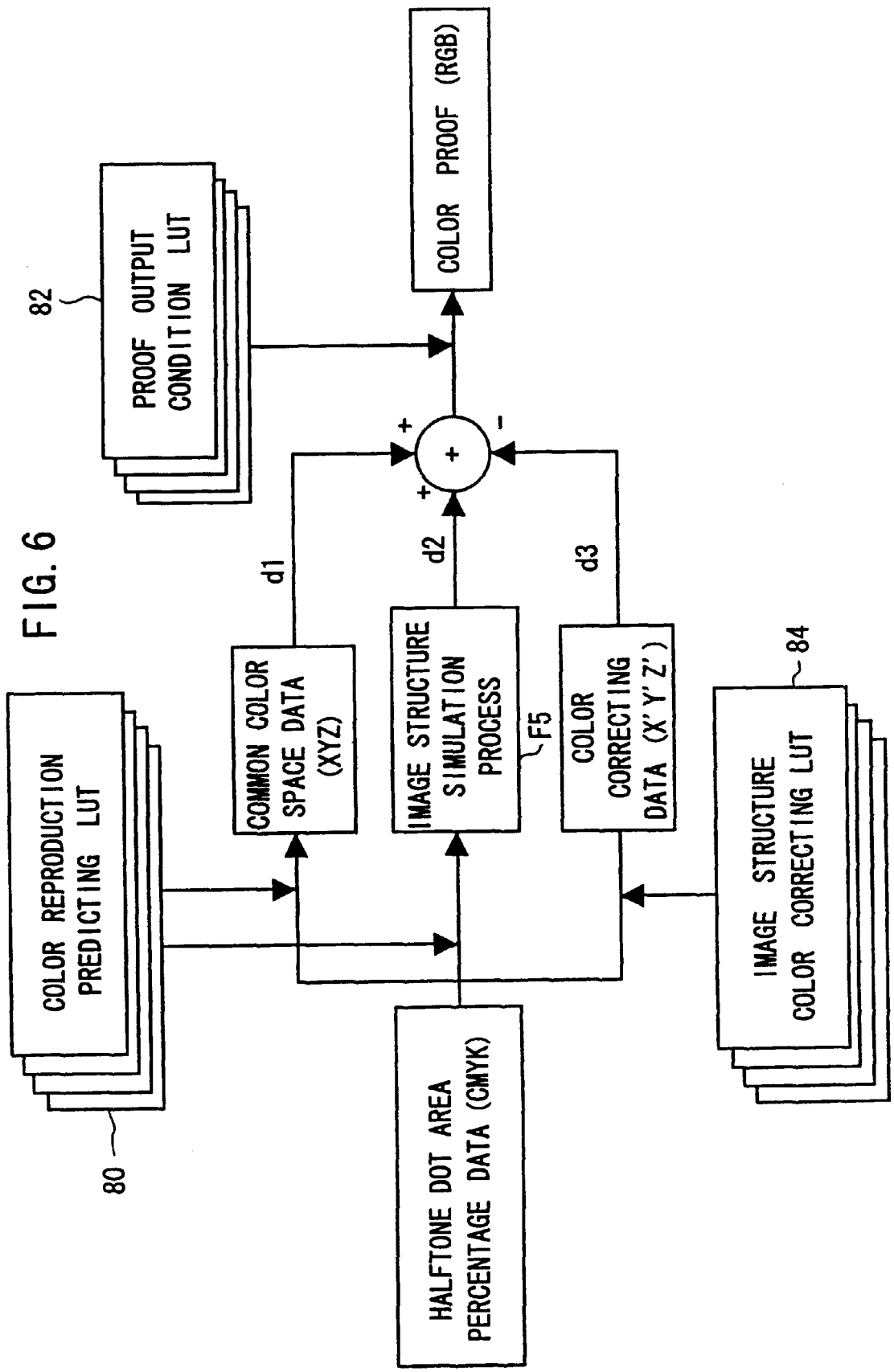
FIG. 6 is a block diagram of a halftone dot simulation processor of the proof generating system shown in FIG. 1.

The halftone dot simulation processor 20 effects a color conversion process on halftone dot area percentage data which needs to be subject to the halftone dot screening process, as shown in FIG. 6. Specifically, as shown in FIG. 6, the halftone dot simulation processor 20 (second converting means) executes an image structure simulation process in a step F5, described later in detail, to accurately reproduce an image structure of a printed color document. Since the colors reproduced by the image structure suffer a color shift, however, it is necessary to correct such a color shift.

To correct such a color shift, an image structure color correcting lookup table (LUT) 84 (first color shift correcting means) for generating corrective data to correct a color shift is generated in advance depending on printing conditions. The image structure color correcting lookup table 84 can be determined as calorimetric values of a test image which is outputted from the output apparatus 16 based on data that are obtained when an image structure simulation process is effected on test pattern data, for example.

Therefore, the halftone dot simulation processor 20 converts the gradation image data DI or the line image data DL, which comprise halftone dot area percentage data aj of the four plates C, M, Y, K, are converted into calorimetric data not dependent on output devices, e.g., tristimulus data X, Y, Z (referred to as calorimetric data d1), using the color reproduction predicting lookup table (LUT) 80 which has been established with respect to the first printing conditions. The halftone dot simulation processor 20 also converts the halftone dot area percentage data aj into calorimetric data d2 having an image structure corresponding to the halftone dot screening process by effecting the image structure simulation process on the halftone dot area percentage data aj. The calorimetric data d2 have a color shift. The halftone dot simulation processor 20 further converts the halftone dot area percentage data aj into color correcting data X', Y', Z' (hereinafter referred to as colorimetric data d3) using the image structure color correcting lookup table 84. The colorimetric data d1, d2, d3 are then subjected to a simple calculation process representing d1+(d2−d3) or d1·d2/d3, thereby generating common color space data with respect to which the color shift has been corrected and which has been given a desired image structure. The common color space data are then converted into color proof data, e.g., RGB data, corresponding to the output apparatus 16, using one of the proof output condition lookup tables 82 which corresponds to the output conditions of the output apparatus 16 which is used.

Figure 7:
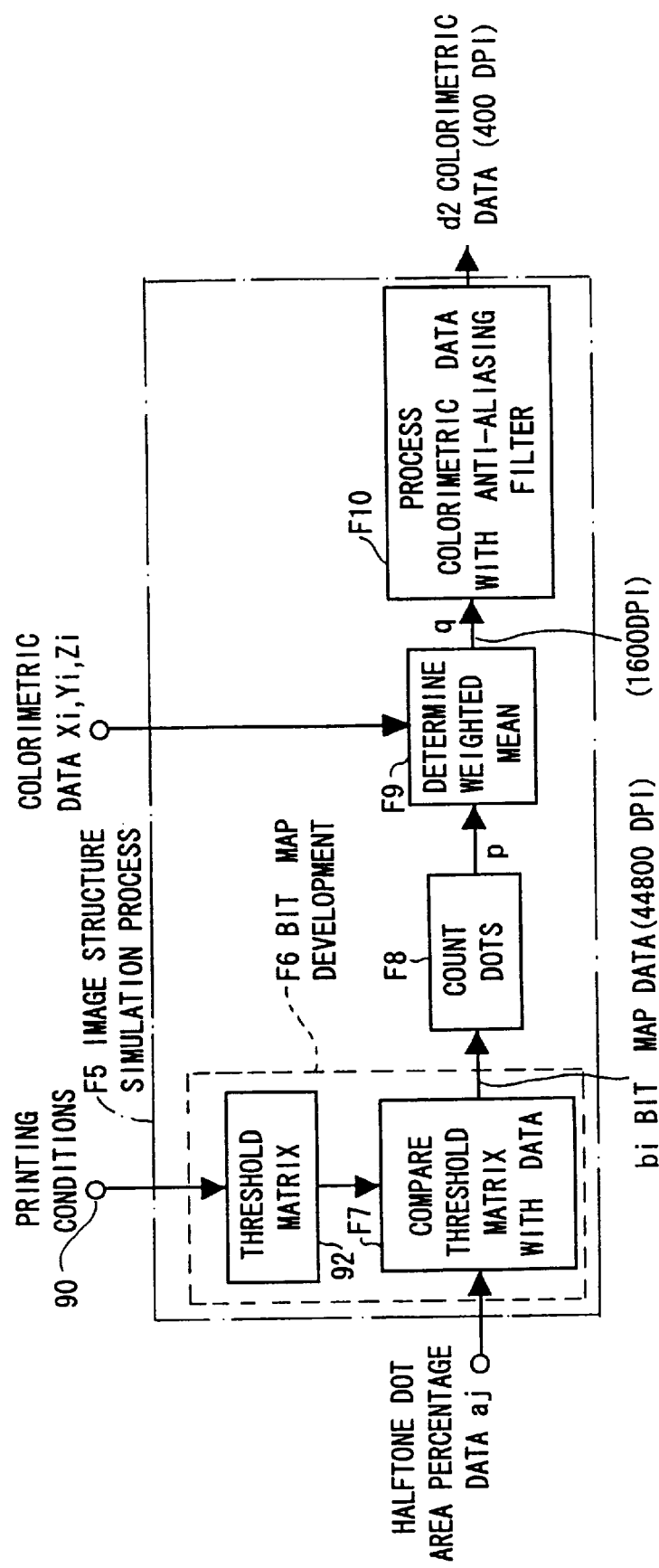
FIG. 7 is a diagram illustrative of a halftone dot simulation process carried out by the halftone dot simulation processor shown in FIG. 6.

The image structure simulation process in the step F5 will be described below with reference to FIG. 7.

In the image structure simulation process, bit map data peculiar to the image structure simulation process are generated in a step F6. Specifically, threshold matrixes 92 whose resolution is higher than the resolution used for actual printing are selected depending on the screen type, screen ruling, and screen angle which are the same as those of printing conditions (second printing conditions) supplied from an input terminal 90, for increasing the resolution of bit map data bi. The screen type, screen ruling, and screen angle relative to the threshold matrixes 92 must be the same as those of the printing process for the reproduction of the same moiré, etc.

In order to increase the resolution, the threshold matrixes 92 for generating halftone dots have elements 256×256= 65536, for example. The threshold in each of the elements may take either one of values of 1, 2, 3, . . . , 255, for example. The threshold matrixes 92 and the halftone dot area percentage data aj are compared with each other, thus generating bit map data bi in a step F7.

The bit map data bi thus generated for the four plates C, M, Y, K have a resolution of 44800 (256×175) DPI if the screen ruling is 175. The resolution is required to be of 2000 DPI or higher. Here, the resolution of 44800 DPI will be described as a preferred example suitable for various conditions as described above.

Then, the bit map data bi of 44800 DPI are converted into data of 1600 DPI. For converting the bit map data bi of 44800 DPI, a counting process is carried out in a step F82 by counting 28×28 (=784) dots of the bit map data bi and converting them into one dot of count data p.

Figure 8A:
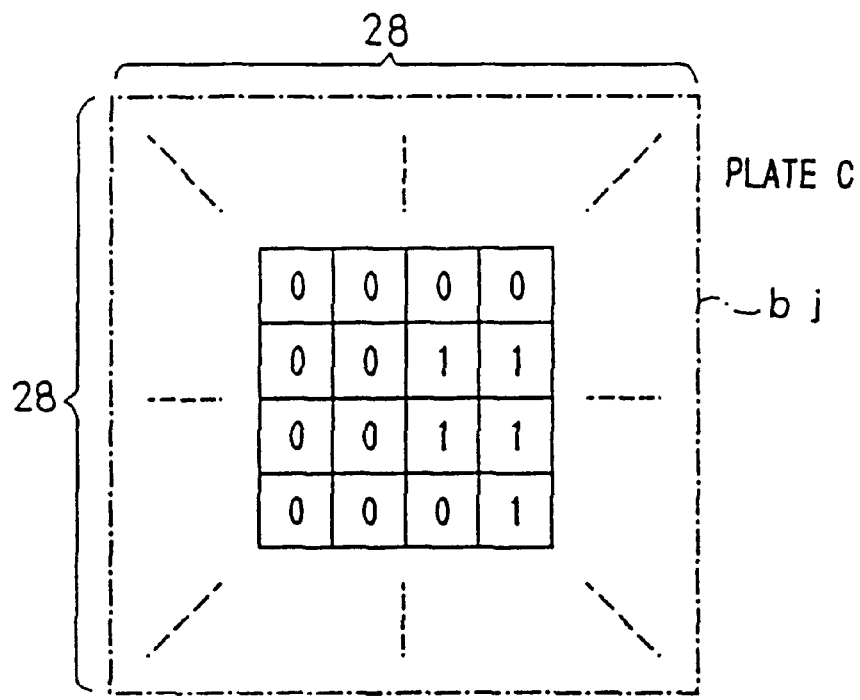
FIGS. 8A and 8B are diagrams illustrative of bit map data in the halftone dot simulation process shown in FIG. 7.
Figure 8B:
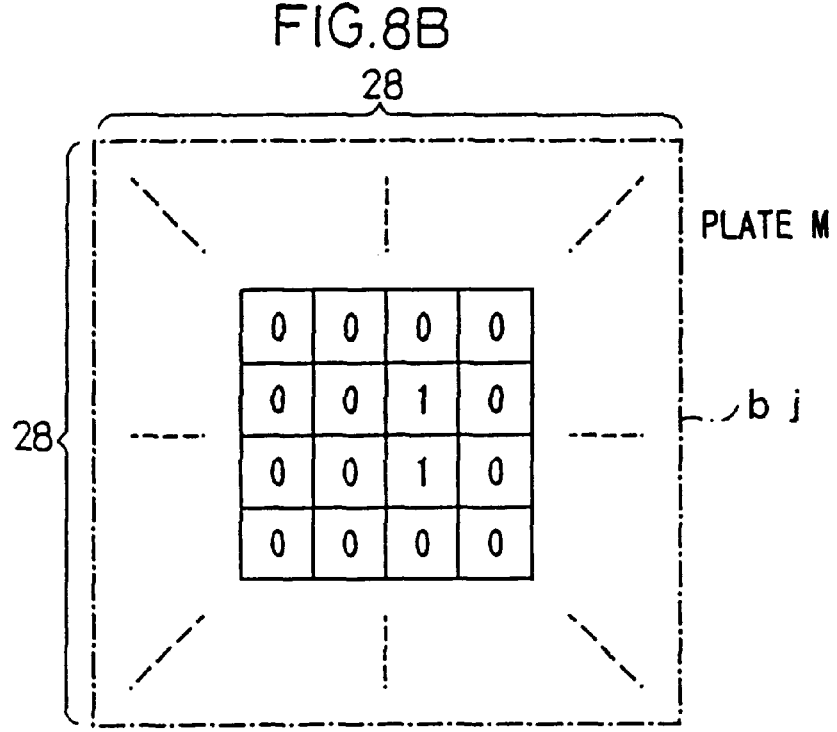

For illustrating the counting process in the step F8, 28×28 dots of the bit map data bi for the plate C are shown in FIG. 8A, and 28×28 dots of the bit map data bi for the plate M are shown in FIG. 8B. It is assumed that all non-illustrated elements in FIGS. 8A and 8B have a value of "0" and all elements of the remaining bit map data bi for the plates Y, K also have a value of "0".

With respect to the 28×28 dots, the bit map data bi for the four plates C, M, Y, K (in this example, the bit map data bi for the two plates C, M) are simultaneously referred to, and area percentages ci for the respective colors, i.e., the $2^4$=16 colors because there are four plates, are counted.

For the pixels (corresponding to 28×28 dots) shown in FIGS. 8A and 8B, the area percentages ci for the respective colors are calculated as follows:

Color C; $ci=c_c=3/784$ (The area percentage $c_c$ represents an area where only the color C is present when the plates C, M are superposed and viewed in a transmissive manner, and an area where the plates C, M are superposed is represented by the area percentage $c_{c+M}$ of the color C+M=B.)

Color C+M; $c_{C+M}=2/784$

Color W; $c_W=779/784$ (This area percentage represents an area where neither the color C nor the color M is present when the plates C, M are superposed and viewed in a transmissive manner.)

The area percentage ci of remaining colors (13 colors such as the colors Y, K, etc.) is nil. When the area percentage ci per each group of 28×28 dots is thus generated, the count data p (each element value is represented by the area percentage ci) of 1600 DPI are generated.

Then, the calorimetric data Xi, Yi, Zi (i represents $2^4$=16 colors for the four plates C, M, Y, K) of each of the 16 colors printed by the printed color document, which have been measured by the colorimeter, are processed into calorimetric data q (tristimulus value data X, Y, Z) using the area percentages ci for the respective colors counted in the step F8 as a weighting coefficient, according to the equation (3) given below in a step F9. Stated otherwise, the weighted mean of the calorimetric data Xi, Yi, Zi is calculated with the area percentages ci for the respective colors, thus determining tristimulus value data X, Y, Z (calorimetric data q).

$$X = \sum ci \cdot Xi \quad (3)$$
$$(3/784)X_C + (2/784)X_{C+M} + (779/784)X_W$$
$$Y = \sum ci \cdot Yi$$
$$(3/784)Y_C + (2/784)Y_{C+M} + (779/784)Y_W$$
$$Z = \sum ci \cdot Zi$$
$$(3/784)Z_C + (2/784)Z_{C+M} + (779/784)Z_W$$

When the counting process in the step F8 and the weighted-mean determining process in the step F9 for each group of 784 (28×28) dots are carried out in the full range of the bit map data bi of 44800 DPI, the calorimetric data q of 1600 DPI are obtained.

Then, the obtained calorimetric data q of 1600 DPI are processed by an anti-aliasing filter AF shown in FIG. 9 into calorimetric data d2 of 400 DPI which is equal to the resolution of the output apparatus 16 in a step F10.

The anti-aliasing filtering process in the step F10 is inserted to avoid, in advance, aliasing noise which would be introduced due to the resolution of the output apparatus 16 when the color proof is to be generated with the resolution (400 DPI in this embodiment) of the output apparatus 16. For effectively carrying out the anti-aliasing filtering process, it is necessary that the resolution of the image data (the colorimetric data q) which is an original signal to be processed by the anti-aliasing filter AF be higher than the resolution (400 DPI) of the output apparatus 16. In this embodiment, the resolution of the image data (the calorimetric data q) to be processed by the anti-aliasing filter AF is set to 1600 DPI.

The structure of a matrix (a square matrix of n×n elements) of the anti-aliasing filter AF shown in FIG. 9 will be analyzed below.

Generally, for converting the colorimetric data q which are image data having a resolution of 1600 DPI into the colorimetric data d2 which are image data having a resolution of 400 DPI, since one dot of 400 DPI corresponds to 16 dots of 1600 DPI, the minimum number of elements of a filter with no anti-aliasing capability is 4×4.

To minimize aliasing noise, the number of elements of the anti-aliasing filter AF should preferably be as large as possible, but is limited by the operating speed, hardware, etc. thereof.

As can be analogized from the fact that color information can be reproduced by the Neugebauer's equation, the anti-aliasing filter AF is required to have such frequency characteristics that it will produce as small an insertion loss as possible in the vicinity of DC components because it is necessary for the anti-aliasing filter AF to pass components of relative low frequencies including DC components. Therefore, the response of the anti-aliasing filter AF at the center of the matrix should ideally be 0 dB.

An interference fringe component such as of moiré, i.e., a component which is equal to or less than the screen frequency (screen ruling) component, should remain unremoved in its entirety after the anti-aliasing filtering process in the step F10.

The anti-aliasing filter AF should be designed also in view of the fact that if the attenuation curve of the anti-aliasing filter AF is sharp, then a new false pattern will appear due to the anti-aliasing filtering process.

The structure of the anti-aliasing filter AF shown in FIG. 9 is composed of 9×9 elements designed in view of the above considerations. If the elements are represented by "dij", then the sum of the values (also called filter coefficients) of the respective elements dij need to be 1.0. Therefore, the actual value of each of the elements dij is divided by the sum ($\Sigma$dij) of elements dij.

The filter coefficients of the anti-aliasing filter AF thus constructed are arranged such that, as shown in FIG. 9, its frequency characteristics provide a bell-shaped attenuation pattern which is monotonously reduced from the center toward the outer edges.

Figure 10A:
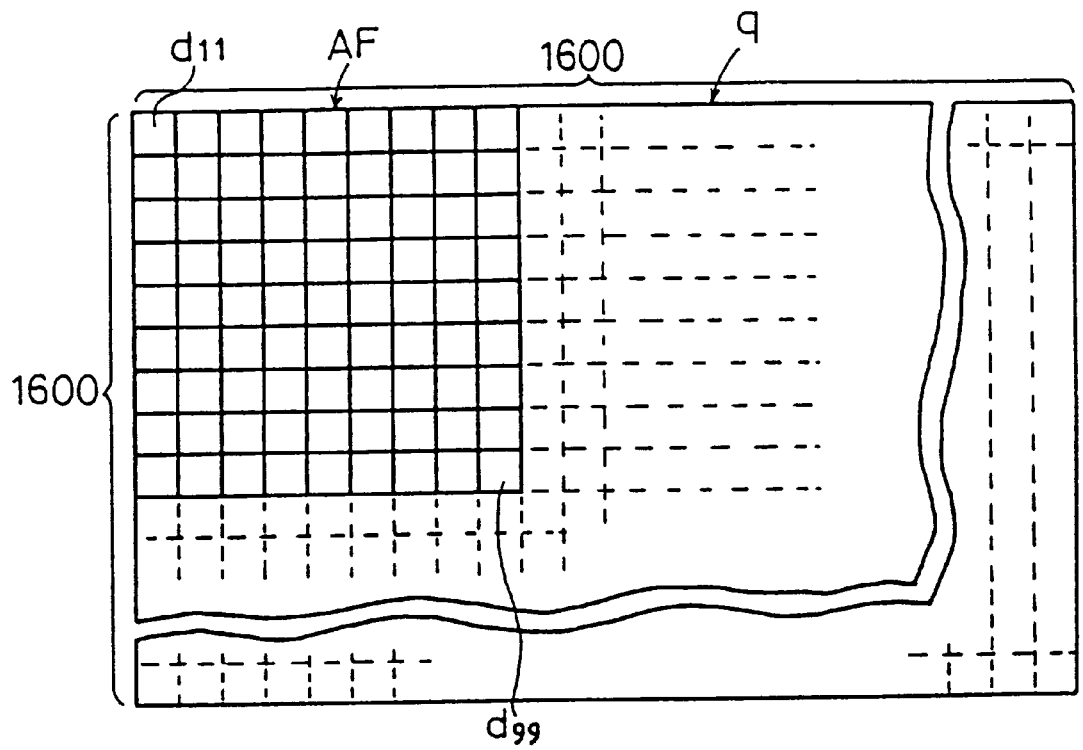
FIGS. 10A and 10B are diagrams illustrating a process carried out by using the anti-aliasing filter shown in FIG. 9.
Figure 10B:
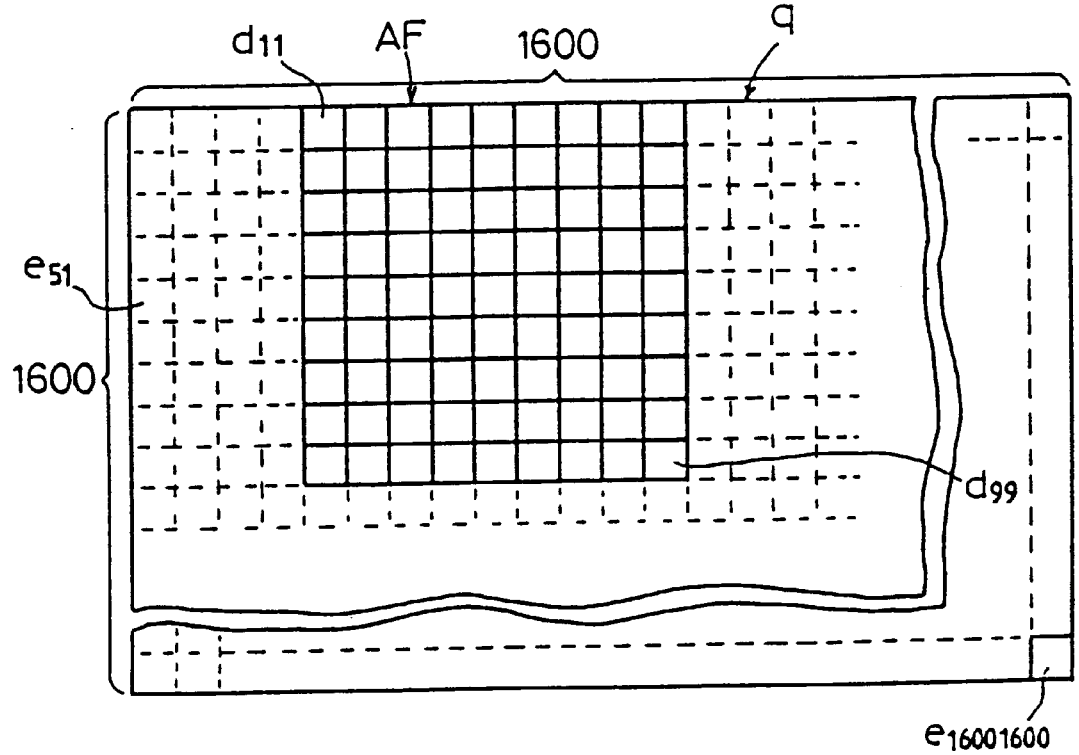

FIGS. 10A and 10B are illustrative of the manner in which the colorimetric data are processed by the anti-aliasing filter AF. As shown in FIG. 10A, 9×9 dots in an upper left portion of the calorimetric data q of 1600 DPI are associated with the anti-aliasing filter AF of the 9×9 matrix whose elements are represented by dij as shown in FIG. 9, and the corresponding elements are multiplied, after which the sum of the products is determined. In this manner, the anti-aliasing filtering process is carried out. More specifically, if each of the elements of the calorimetric data q is represented by eij, then $\Sigma$(dij×eij) (for the 9×9 elements) is calculated, and used as calorimetric data d2 having a resolution of 400 DPI. While the sum of the anti-aliasing filter AF is standardized at $\Sigma$dij=1 as described above, since multiplications involving decimal fractions are time-consuming, the values shown in FIG. 9 may be used as the values of the elements of the anti-aliasing filter AF, which are then represented by d'ij, and $\Sigma$(d'ij×eij)/$\Sigma$d'ij may be determined as a value produced as a result of the anti-aliasing filtering process.

Because the anti-aliasing filtering process converts colorimetric data q having a resolution of 1600 DPI into calorimetric data d2 having a resolution of 400 DPI, the second anti-aliasing filtering process on the calorimetric data q may be carried out by shifting the anti-aliasing filter AF by 4 dots of the calorimetric data q to the right, for example, as shown in FIG. 10B. Similarly, the anti-aliasing filtering process is successively effected by shifting the anti-aliasing filter AF by 4 dots. After the anti-aliasing filtering process is carried out in a position equal to the right-hand end of the calorimetric data q, a fifth element $e_{51}$ from above shown in FIG. 10B is associated with an element $d_{11}$ of the anti-aliasing filter AF, and then the anti-aliasing filtering process is successively effected by shifting the anti-aliasing filter AF by 4 dots until an element $e_{16001600}$ is associated with an element $d_{99}$. In this fashion, the calorimetric data q of 1600 DPI can be converted into the calorimetric data d2 of 400 DPI with its resolution reduced from the resolution of the colorimetric data q. The anti-aliasing filtering process may be defined as a filtering process for cutting off a spatial frequency response inherent in the output apparatus 16 while maintaining a spatial frequency response inherent in the printing screen for the color printed material.

In the manner described above, the RGB data which are color proof data that have been subjected to the color conversion process depending on the desired printing conditions are supplied to the raster image processor 14, which converts the RGB data into scanning image data that are supplied to the output apparatus 16.

In the output apparatus 16, the photosensitive medium 28 unreeled from the magazine 36 is wound around the exposure drum 38 which is rotating in the main scanning direction "x" shown in FIG. 4. The laser beams emitted from the respective laser diodes of the light source units 42R, 42G, 42B are spread and overlapped, and applied to the light modulator elements 44 of the linear light modulators 46R, 46G, 46B. Since the light modulator elements 44 are supplied with the image data R, G, B from the exposure unit control circuit 40, the light modulator elements 44 modulate the laser beams through pulse-width modulation, pulse-intensity modulation, or a combination thereof, and the modulated laser beams are applied to the photosensitive medium 28.

Since the laser beams applied to the light modulator elements 44 are spread and overlapped, laser beam intensity irregularities caused by different individual properties of the laser diodes and the light modulator elements 44 are smoothed, allowing uniform laser beams to be applied to the photosensitive medium 28. The plural laser diodes can produce a high laser beam intensity for recording an image at a high speed. The light source units 42R, 42G, 42B may comprise light-emitting diodes (LEDs) rather than the laser diodes, or alternatively multichannel laser diodes or light-emitting diodes having a plurality of light-emitting elements on a single chip.

Figure 11:
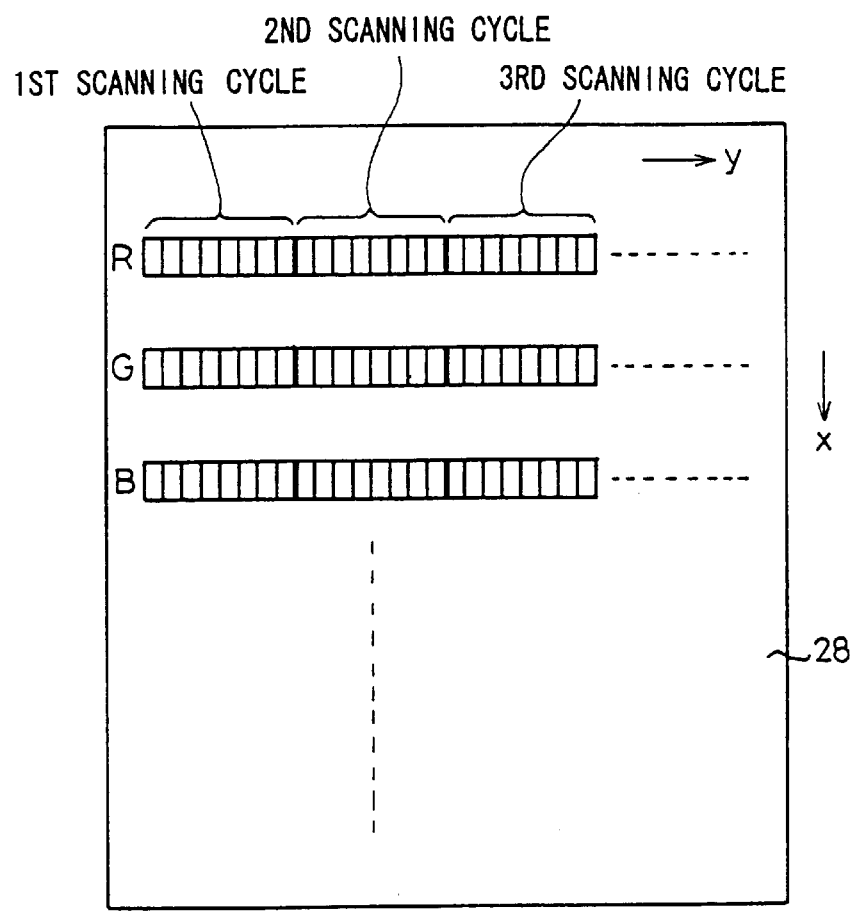
FIG. 11 is a diagram illustrative of an exposure recording process using the exposure head shown in FIG. 4.

As shown in FIG. 11, images in the colors R, G, B, which are as long as the linear light modulators 46R, 46G, 46B, are recorded on the photosensitive medium 28 in a first scanning cycle. Then, the linear light modulators 46R, 46G, 46B are displaced a predetermined distance in the auxiliary scanning direction "y", after which images in the colors R, G, B are recorded on the photosensitive medium 28 in a second scanning cycle. The images in the colors R, G, B are superposed in the main scanning direction "x", producing desired colors. The above process is repeated until a color proof image is formed as a two-dimensional latent image on the photosensitive medium 28.

Figure 12:
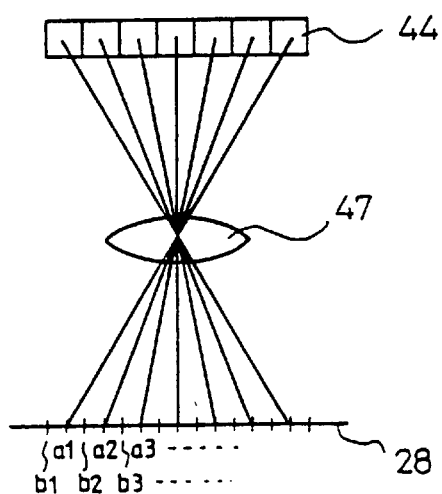
FIG. 12 is a diagram illustrative of an exposure recording process using the exposure head shown in FIG. 4.

Since the photosensitive medium 28 may not produce desired colors because of laser beams applied to adjacent pixels, adjacent regions to be scanned should preferably be processed at certain recording time intervals. For example, adjacent lines are recorded at an interval of one period according to an interleave recording process. Moreover, as shown in FIG. 12, the magnification of pixels formed on the exposure drum 38 may be adjusted to form pixels a1, a2, . . . in a first scanning cycle, and then form pixels b1, b2, . . . between the pixels a1, a2, . . . in a second scanning cycle for thereby preventing the adjacent pixels from largely affecting each other.

After the latent color proof image has been formed on the photosensitive medium 28, the photosensitive medium 28 is peeled off the exposure drum 38, and then delivered into the transfer unit 34. In the transfer unit 34, the photosensitive medium 28 is adjusted in its feed speed by the buffer 48. Thereafter, the water applicator 50 applies moistening water to the photosensitive medium 28, which is then wound around the heating drum 56. Since the image-receiving medium 32 supplied from the magazine 54 has been wound around the heating drum 56, the photosensitive medium 28 is wound in superposed relation to the image-receiving medium 32 around the heating drum 56.

The heating drum 56, which is heated to a predetermined temperature by the heater 58, heats the photosensitive medium 28 and the image-receiving medium 32 which are held in superposed relation to each other, whereupon the latent color proof image is transferred as a visible color proof image from the photosensitive medium 28 to the image-receiving medium 32. The image-receiving medium 32 to which the visible color proof image has been transferred is peeled off the photosensitive medium 28, dried by the drier 62, and then discharged into the tray 68. The photosensitive medium 28 is discharged into the tray 66.

The calibration processor 22 in the output apparatus 16 calibrates the image data depending on inherent characteristics of the output apparatus 16 and inherent characteristics of the photosensitive medium 28.

Specifically, a conversion table is generated which associates image data as RGB data with output control data at each of wavelengths so that an output image produced based on the supplied same image data will be the same at all times, and the image data are corrected depending on a different sensitivity and different gradation characteristics of the photosensitive medium 28 using the conversion table, thereby obtaining output control data for reproducing a predetermined gray curve at all times. By converting the image data into output control data having a greater number of bits than the supplied image data, it is possible to reproduce smooth gradations while preventing gradation jumps when recording the image data.

Figure 13A:
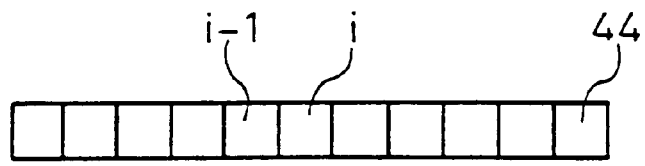
FIGS. 13A through 13C are diagrams illustrative of a process of correcting a drive signal for recording a pixel adjacent to a preceding pixel with the exposure head shown in FIG. 4.
Figure 13B:
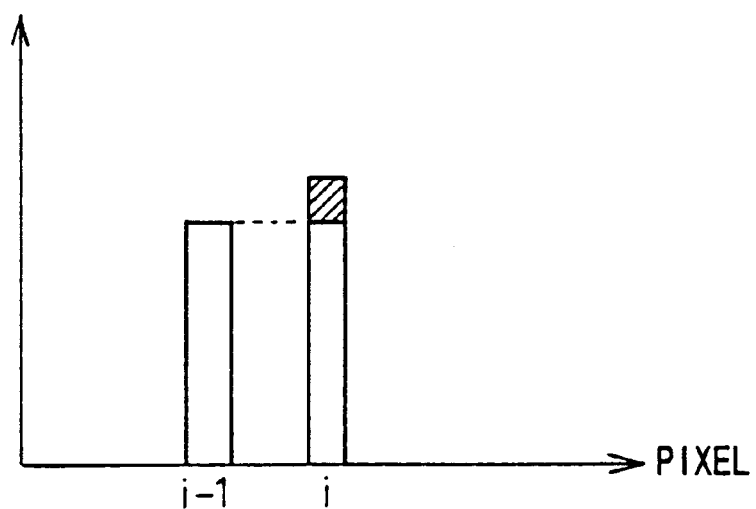
Figure 13C:
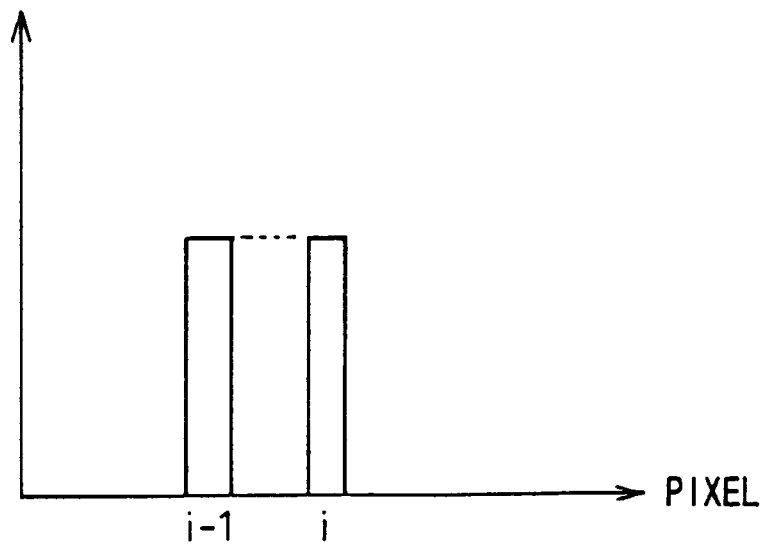

Furthermore, as shown in FIG. 13A, the density of a pixel recorded on the photosensitive medium 28 by laser beams from adjacent (i–1)th and ith light modulator elements 44 becomes higher than a desired density under the influence of light from a preceding pixel which has been recorded, as shown hatched in FIG. 13B. To avoid such a problem, a drive signal Pi supplied to the ith light modulator element 44 is corrected as follows:

$$Pi'=Pi-f\{P(i-1)\} \qquad (4)$$

using a given function f of a drive signal P(i–1) supplied to the (i–1)th light modulator element 44. In this manner, it is possible to record a pixel which is not affected by an adjacent pixel as shown in FIG. 13C.

Figure 14A:
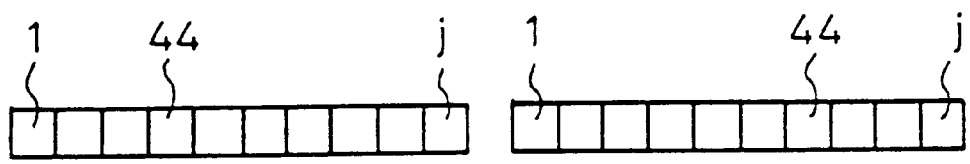
FIGS. 14A through 14C are diagrams illustrative of a process of correcting a drive signal for recording a pixel adjacent to a preceding pixel in first and second scanning cycles with the exposure head shown in FIG. 4.
Figure 14B:
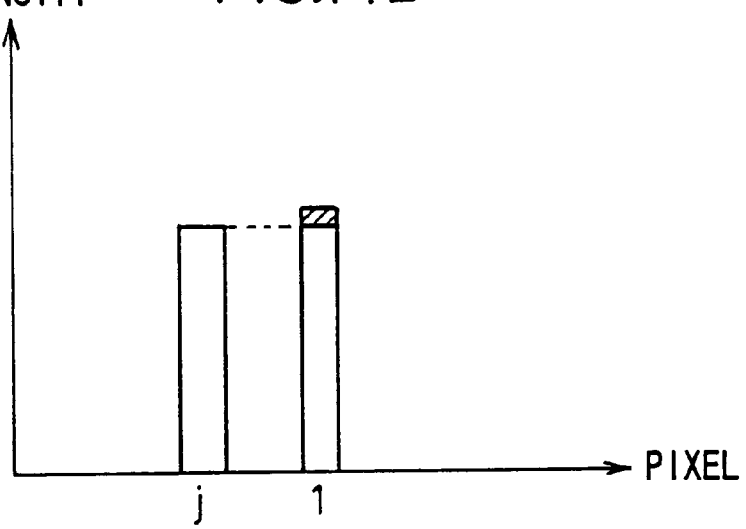
Figure 14C:
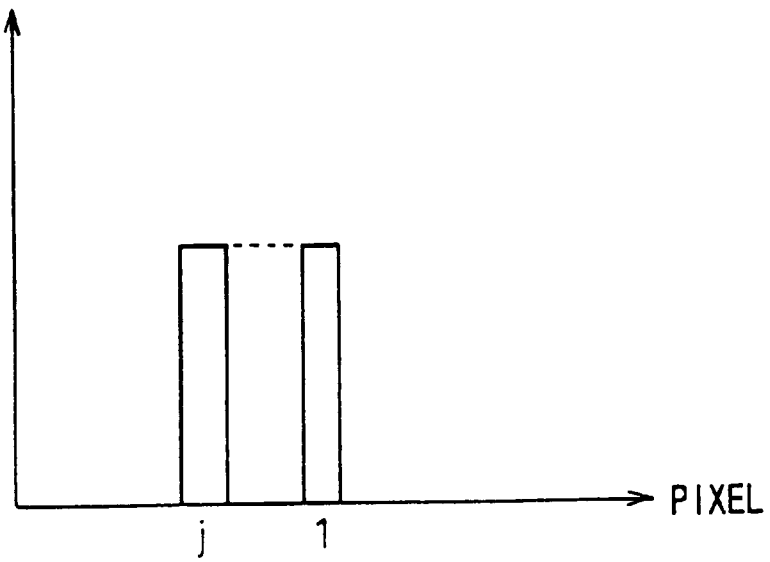

Moreover, as shown in FIG. 14A, since a pixel recorded by the jth light modulator element 44 at one end in a first scanning cycle and a pixel recorded by the 1st light modulator element 44 at the other end in a second scanning cycle are positioned adjacent to each other, the pixel recorded by the first light modulator element 44 has its density affected as shown hatched in FIG. 14B. An image which is produced as a result suffers striped density irregularities. To avoid this shortcoming, a drive signal P1 supplied to the 1st light modulator element 44 is corrected as follows:

$$P1'=P1-g(Pj) \qquad (5)$$

using a given function g of a drive signal Pj supplied to the jth light modulator element 44. In this manner, it is possible to record a pixel which is not affected by an adjacent pixel as shown in FIG. 14C. Inasmuch as the time interval between first and second scanning cycles is relatively large, the pixel recorded in the first scanning cycle is less affected by the adjacent pixel recorded in the second scanning cycle than the pixel is affected by the adjacent pixel recorded in one scanning cycle.

The interpixel data corrector 24 may have corrective curves for the respective light modulator elements 44 to correct the image data in order to absorb the differences between light transmittances and also between switching characteristics of the light modulator elements 44. In this fashion, density variations between all adjacent pixels can be compensated for.

In the transfer unit 34 of the output apparatus 16, the photosensitive medium 28 and the image-receiving medium 32 are heated by the heater 58 for transferring, developing, and recording an image. At this time, the temperature of the heating drum 56 is measured by the temperature sensor 60, and controlled at a constant level for stably transferring, developing, and recording an image. Based on the measured temperature, a control signal supplied to the exposure heat 26 in the exposure unit 30 may be corrected to stabilize conditions in which to record images. The heating drum 56 is heated to different temperatures depending on whether the photosensitive medium 28 and the image-receiving medium 32 are wound around the heating drum 56 or not. Therefore, the temperature may be controlled depending on the length by which the photosensitive medium 28 has been processed. Furthermore, because the area in which the photosensitive medium 28 and the image-receiving medium 32 contact the heating drum 56 varies depending on the sizes of the photosensitive medium 28 and the image-receiving medium 32, the temperature distribution on the surface of the heating drum 56 may suffer irregularities. To eliminate such temperature irregularities, the heater 58 may comprise divided heater segments along the axis of the heating drum 56, a plurality of regions of the heating drum 56 may be measured by a plurality of respective temperature sensors 60, and the heater segments may individually be controlled to heat the heating drum 56 to a uniform temperature.

The calorimeter 64 (detector) in the transfer unit 34 measures the colors of the image recorded on the image-receiving medium 32 to compensate for the aging of the output apparatus 16, the photosensitive medium 28, and the image-receiving medium 32. For example, a desired color proof image is formed on the photosensitive medium 28, and a test pattern based on test data is formed on a side margin of the photosensitive medium 28. The colors of the test pattern are measured by the calorimeter 64, and the image data are corrected to equalize the measured calorimetric values with predetermined values. A gray pattern and monochromatic patterns may be generated as test patterns, and the gray balance of the image may be adjusted and the shading of the image may be corrected using the gray pattern, whereas the individual colors may be corrected using the monochromatic patterns. The test patterns on the side margin of the photosensitive medium 28 may be outputted, measured, and corrected each time an image is outputted. In this case, the image data are corrected into output control data by the calibration processor 22 (signal data converter) for reproducing a color image with high accuracy based on the output control data.

Irregularities produced by the heat development process may be detected from the calorimetric data of a test pattern outputted based on the same image data, among the test pattern formed in the side margin of the photosensitive medium 28. Information such as irregularities may be fed back to the transfer unit control circuit 70 which controls the heater 58 for the heating drum 56 or to the exposure unit control circuit 40 for minimizing image development irregularities.

The test patterns may be in the form of either a solid image or a halftone dot image. If the test patterns are repetitive patterns or uniform patterns, then it is possible to detect differences between the individual light modulator elements 44 for more accurate color correction.

Based on the color proof image thus formed, a printed color image is predicted, and the layout data O/L are corrected, if necessary, to efficiently produce a desired printed color image.

While the colors of a printed document and the colors of a color proof image can calorimetrically be equalized with each other using the above lookup tables and correcting processes, the colors may not be equalized with each other due to a gray balance difference, such as an observational light source difference, at a level which cannot be controlled using the calorimeter. Such a color discrepancy, however, can be corrected highly accurately according to a visual correcting process, described below, for generating a highly accurate color proof.

Figure 15:
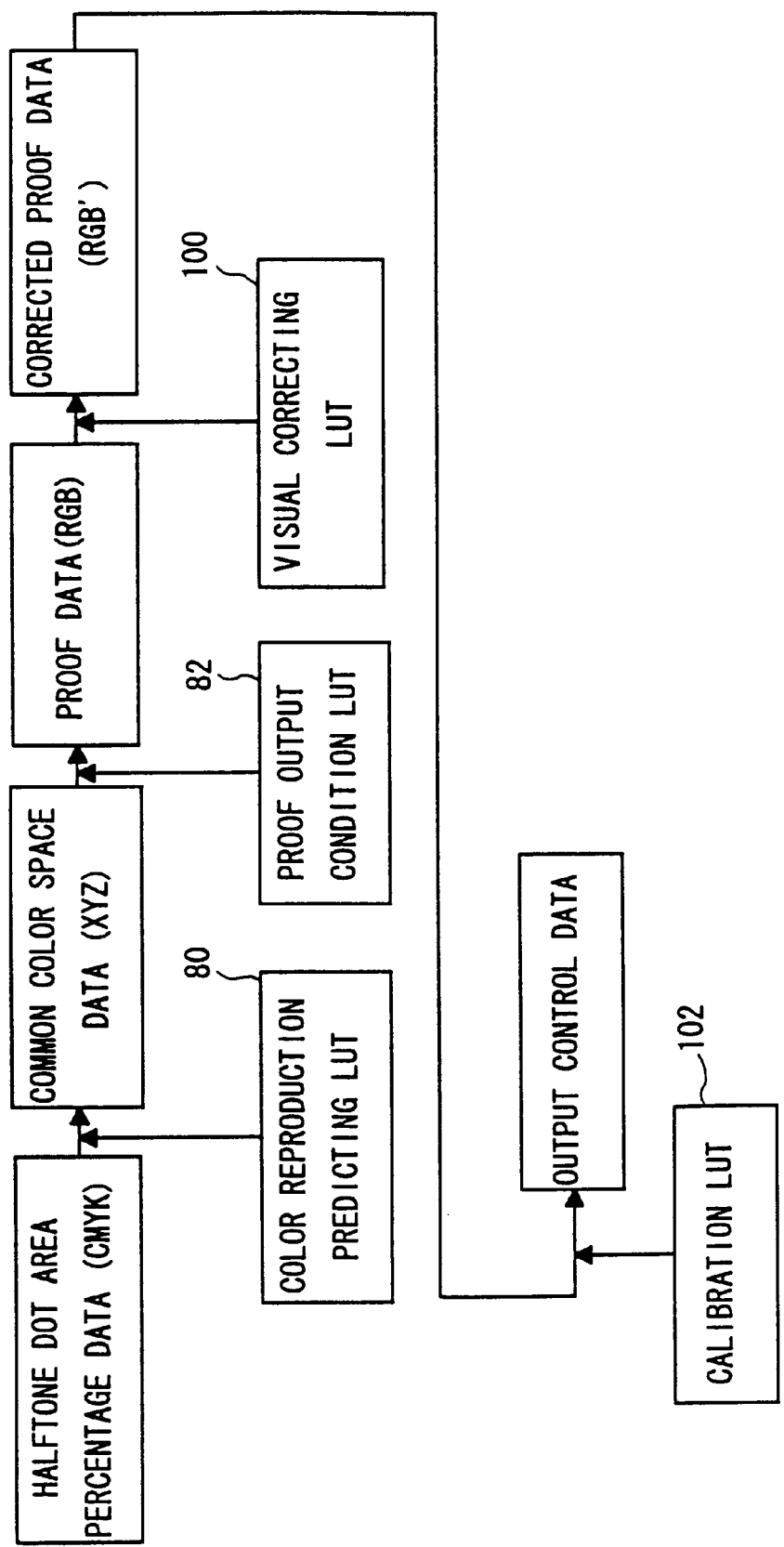
FIG. 15 is a block diagram illustrative of a visual color correcting process.

Visual adjustments may be made according to a gradation curve adjustment process and a gray balance adjustment process, which may be carried out singly or in combination. FIG. 15 shows in block form a visual color correcting process which is carried out using a visual correcting lookup table (LUT) 100 (second color shift correcting means) which is a one-dimensional lookup table established for each of the colors R, G, B.

For making visual correction according to the gray balance adjustment process, a target chart for the color of gray is prepared with respect to a printed document to be matched. The target chart may comprise a printed document having given halftone dot percentages of the colors C, M, Y, K and printed under predetermined printing conditions, or a color patch which is calorimetrically equivalent to such a printed document. Because it is necessary to compensate for differences between observational conditions, it is preferable that the spectral absorption characteristics of the target chart be equal to those of the printed document.

Figure 16:
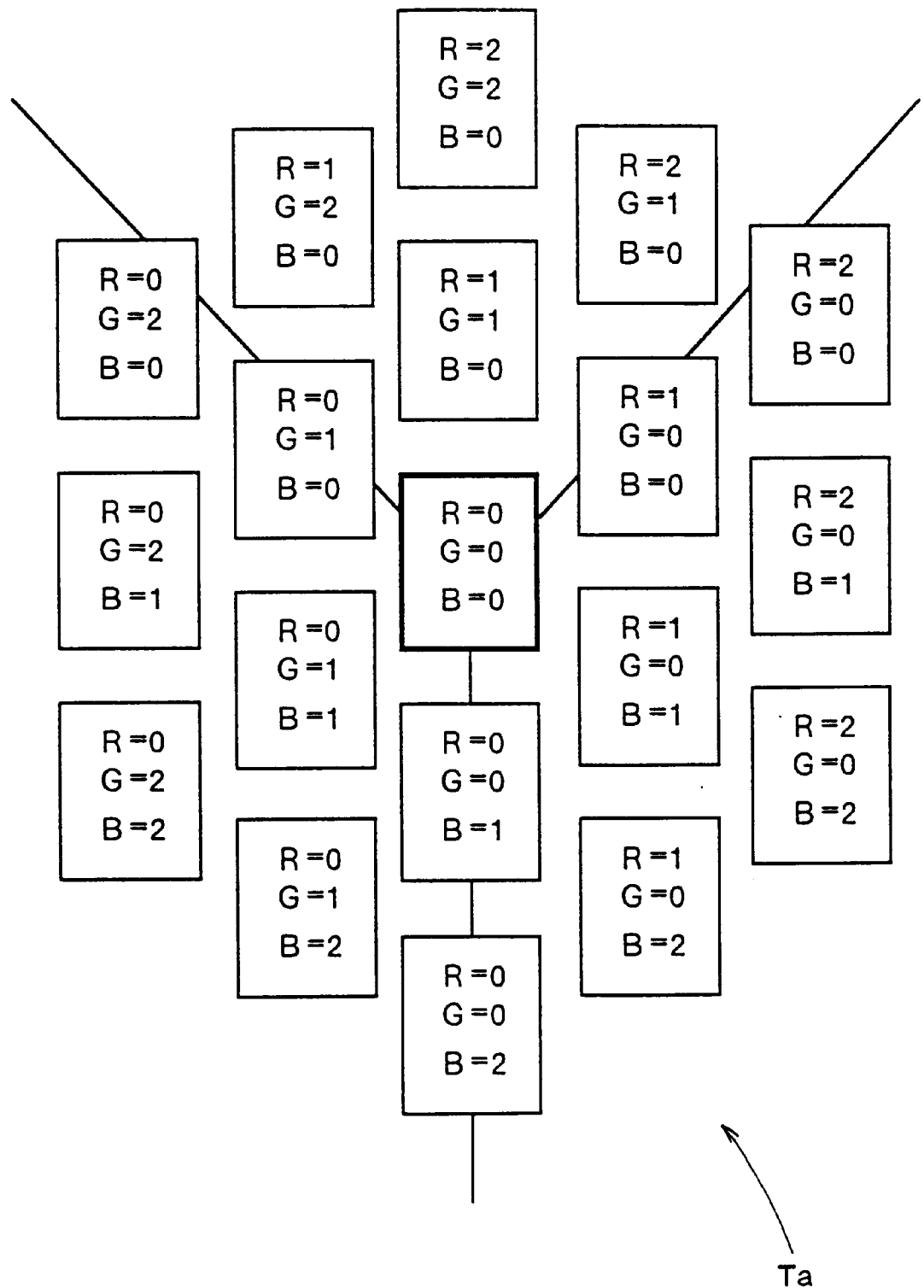
FIG. 16 is a diagram showing a test chart used in the visual color correcting process.

The output apparatus 16 outputs a test chart which contains, at its center, a proof image capable of calorimetrically reproducing the colors of the target chart and also contains proof images positioned around the central proof image and having slightly different RGB data. For example, as shown in FIG. 16, a test chart Ta contains a central patch of RGB data where R=G=B=0 and a hexagonal pattern of patches disposed around the central patch and having increased RGB data. The test chart Ta should preferably have a constant level of lightness and gray color shifts tinted by hues. The central patch of the test chart Ta is established such that it has the same colorimetric values as those of the target chart when all the output apparatus 16, the photosensitive medium 28, and observational conditions satisfy preset conditions.

The test chart Ta thus outputted and the target chart are visually compared with each other, and the patch which looks in the same colors is selected. The visual correcting lookup table 100 is established such that the RGB data of the selected patch are equal to the RGB data of the central patch.

For carrying out the visual correcting process according to the gradation curve adjustment process, a test chart Ta containing a central patch corresponding to the target chart and patches disposed around the central patch and having levels of lightness of the color of gray which vary stepwise is generated instead of the test chart Ta shown in FIG. 16. The test chart Ta is then compared with the target chart under actual observational conditions, and the patch which looks in the same colors is selected to establish the visual correcting lookup table 100. The target chart is not limited to the color of gray, but may be of monochromatic colors R, G, B, for example, and the gradation curves with respect to those monochromatic colors may be adjusted.

Using the visual correcting lookup table 100 thus established, the gray balance and the gradation are adjusted to obtain RGB' data which are corrected proof data. The gray balance and the gradation may be adjusted in any order, and may be repeatedly adjusted until the centers of the target chart and the test chart Ta are completely equalized with each other.

The corrected RGB' data are supplied to the calibration processor 22 in the output apparatus 16, and corrected into output control data using a calibration lookup table. A proof image capable of predicting colors highly accurately can now be generated according to the output control data.

A process of easily establishing a gray balance in the output device 16 or another output apparatus which is desired to be used will be described in detail below with reference to FIG. 17.

Figure 17:
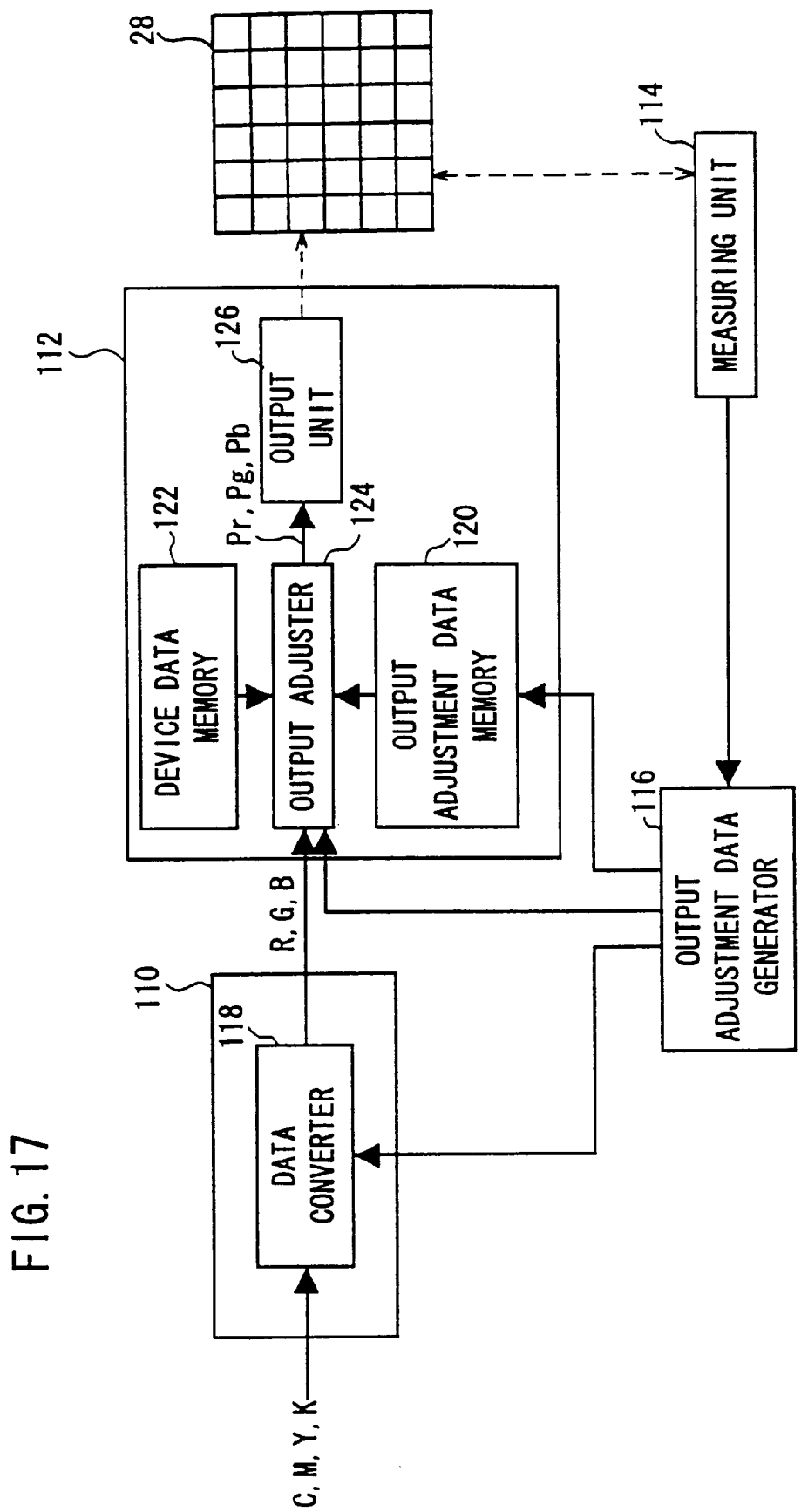
FIG. 17 is a block diagram of an image output system including an output apparatus which incorporates a method of and an apparatus for establishing a gray balance.

FIG. 17 shows in block form an image output system including an output apparatus which incorporates a method of and an apparatus for establishing a gray balance. The image output system comprises a processor 110 for effecting given image processing on halftone dot area percentage data of the four plates C, M, Y, K (hereinafter referred to as image data C, M, Y, K) which are supplied to convert the image data C, M, Y, K into color proof data of the colors R, G, B (hereinafter referred to as image data R, G, B), an output apparatus 112 for converting the image data R, G, B into laser power data Pr, Pg, Pb for recording an image with laser beams and controlling the laser beams with the laser power data Pr, Pg, Pb to form an image on the photosensitive medium 28, a measuring unit 114 for measuring the densities or calorimetric values of the image formed on the photosensitive medium 28, and an output adjustment data generator 116 for generating output adjustment data for which a gray balance is established, based on measured data from the measuring unit 114.

The processor 110 corresponds to the proof generating apparatus 12 shown in FIG. 1, the output apparatus 112 to the output apparatus 16, the laser power data Pr, Pg, Pb to the output control data, and the output adjustment data to the calibration lookup table.

The processor 110 has a data converter 118 for converting the image data C, M, Y, K into the image data R, G, B. The data converter 118 may convert the image data C, M, Y into the image data R, G, B, or may convert calorimetric values L*, a*, b* into the image data R, G, B, or determine calorimetric values L*, a*, b* from the image data C, M, Y, K, effecting desired image processing on the calorimetric values L*, a*, b*, and then convert the processed calorimetric values L*, a*, b* into the image data R, G, B.

The output apparatus 112 comprises an output adjustment data memory 120 for storing output adjustment data taking into account output characteristics of the output apparatus 112, a device data memory 122 for storing device data Rd, Gd, Bd, an output adjuster 124 for converting the image data R, G, B or the device data Rd, Gd, Bd into laser power data Pr, Pg, Pb based on the output adjustment data, and an output unit 126 for controlling laser beams based on the laser power data Pr, Pg, Pb to form an image on the photosensitive medium 28. The device data Rd, Gd, Bd serve to generate a test charge, a gray balance setting chart, etc., and may be any data not dependent on colors insofar as they are independent of each other.

A process of establishing a gray balance with the image output system is described successively in [1]~[5] below.

Figure 18:
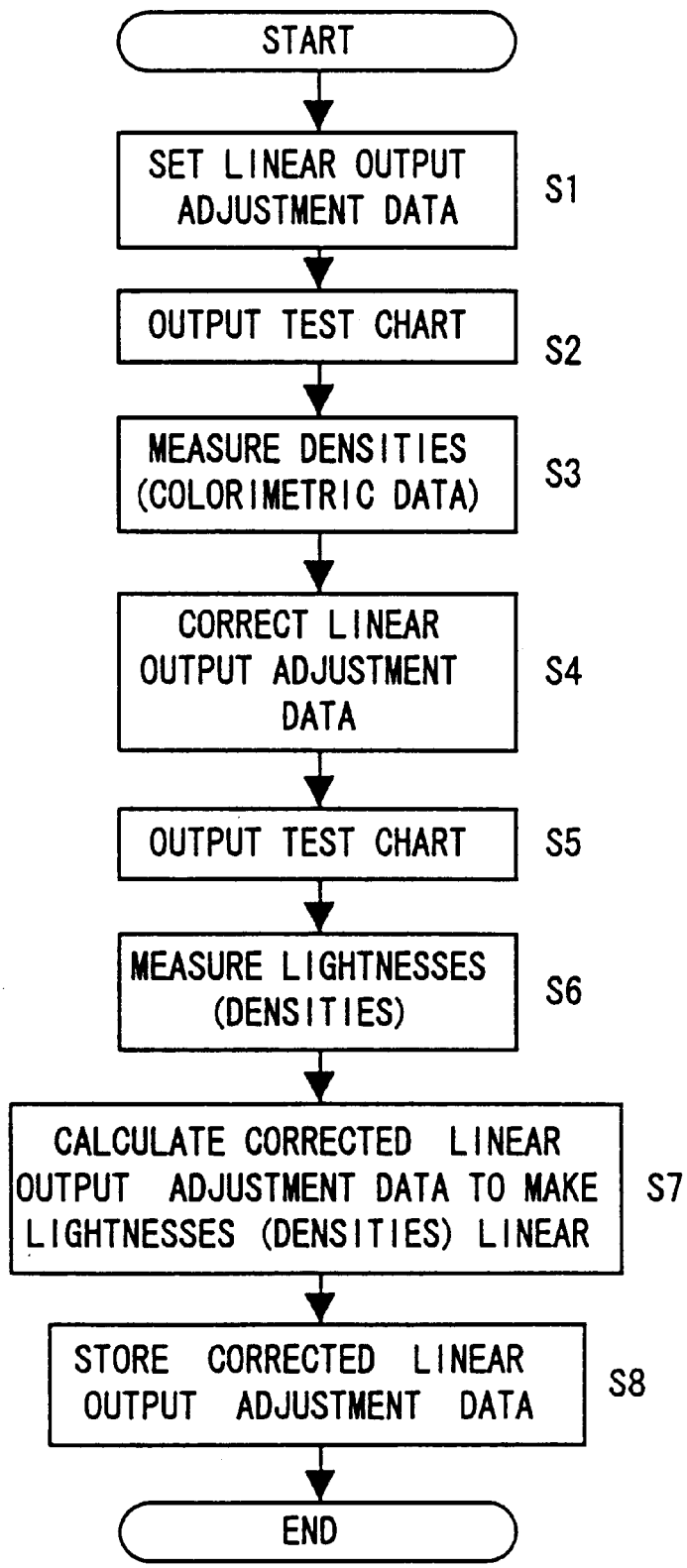
FIG. 18 is a flowchart of a process for generating output adjustment data in the output apparatus shown in FIG. 17.

[1] Prior to establishing a gray balance, output adjustment data taking into account output characteristics of the output apparatus 112 are generated. FIG. 18 shows a process for generating the output adjustment data.

First, as shown in FIG. 18, linear output adjustment data a1 representing the linear relationship of the laser power data Pr, Pg, Pb with respect to the device data Rd, Gd, Bd are downloaded from the output adjustment data memory 120 into the output adjuster 124 in a step S1 (see FIG. 19). In the linear output adjustment data a1, the laser power data Pr, Pg, Pb in a full range, e.g., 0~4095 of 12-bit data of the laser power data Pr, Pg, Pb, are associated with the device data Rd, Gd, Bd in a full range, e.g., 0~255 of 8-bit data of the device data Rd, Gd, Bd.

Then, the device data Rd, Gd, Bd are supplied from the device data memory 122 to the output adjuster 124, and converted thereby into the laser power data Pr, Pg, Pb using the linear output adjustment data a1. The laser power data Pr, Pg, Pb are supplied to the output unit 126, which step S2.

Densities Dr, Dg, Db or colorimetric values X, Y, Z of the colors R, G, B of each of patches of the test chart are measured by the measuring unit 114, producing test chart measured data a2 in a step S3 (see FIG. 19). The output adjustment data generator 116 determines a maximum value Dmax and a minimum value Dmin in each of channels R, G, B from the test chart measured data a2. At this time, maximum and minimum values Pmax, Pmin of the laser power data Pr, Pg, Pb indicative of the dynamic range of the output apparatus 112 are obtained in each of channels R, G, B from the maximum value Dmax and the minimum value Dmin.

Using the maximum and minimum values Pmax, Pmin, the linear output adjustment data a1 are corrected into corrected linear output adjustment data a3 in a step 34, and the corrected linear output adjustment data a3 are stored in the output adjustment data memory 120.

Then, the corrected linear output adjustment data a3 are downloaded into the output adjuster 124, and the device data Rd, Gd, Bd from the device data memory 122 are converted thereby into the laser power data Pr, Pg, Pb using the corrected linear output adjustment data a3. The laser power data Pr, Pg, Pb are supplied to the output unit 126, generating a test chart again on the photosensitive medium 28 in a step S5.

Lightnesses Lr*, Lg*, Lb* or densities of the colors R, G, B of the test chart are measured by the measuring unit 114, producing test chart measured data a4 in a step S6 (see FIG. 20). The test chart measured data a4 are nonlinear and not suitable for a process (described later) for calculating a gray balance. Therefore, corrected output adjustment data a6 capable of converting the test chart measured data a4 into linear characteristics a5 is calculated in a step S7 (see FIG. 20).

The corrected output adjustment data a6 are stored in the output adjustment data memory 120 as data which are capable of producing a linear output of the lightnesses Lr*, Lg*, Lb* or densities with respect to the linear device data Rd, Gd, Bd within the dynamic range of the output apparatus 126 in a step S8.

Figure 21:
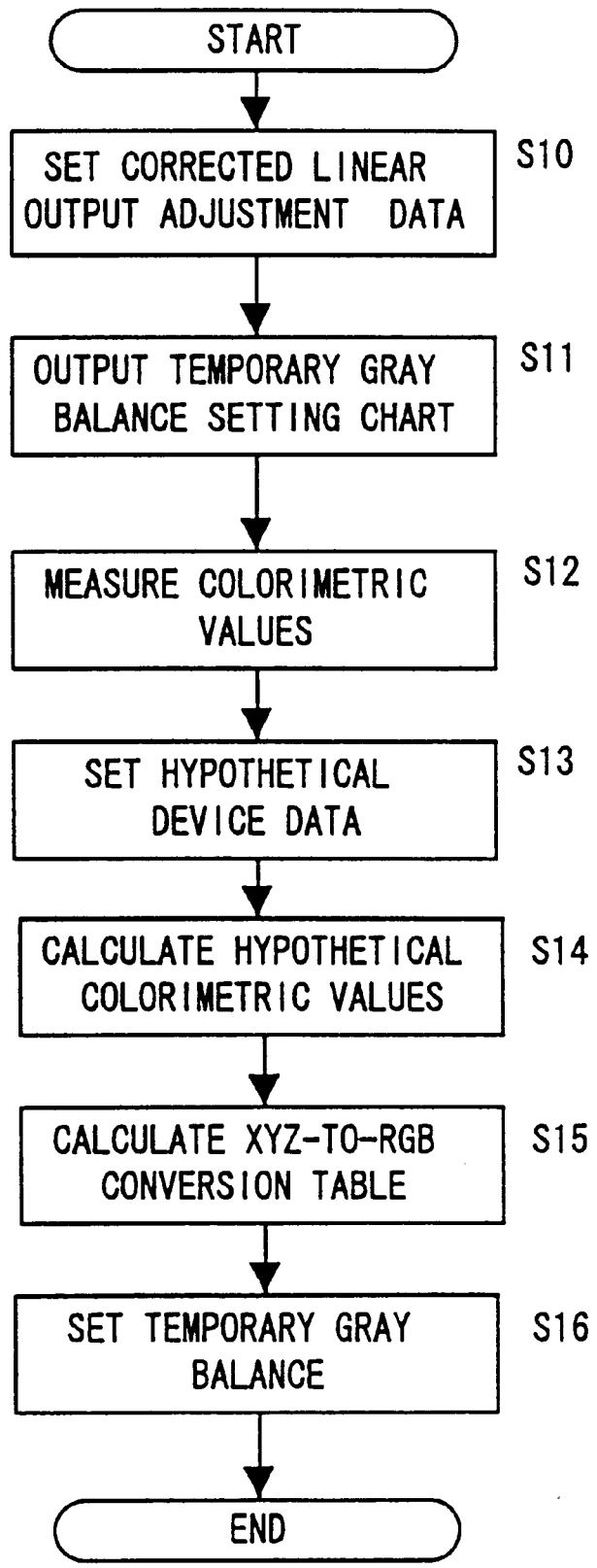
FIG. 21 is a flowchart of a process for establishing a temporary gray balance.

[2] Using the corrected output adjustment data a6, a temporary gray balance which is a rough gray balance is established. FIG. 21 shows a process for establishing such a temporary gray balance.

First, as shown in FIG. 21, the corrected output adjustment data a6 are downloaded from the output adjustment data memory 120 into the output adjuster 124 in a step S10.

Then, the device data Rd, Gd, Bd are supplied from the device data memory 122 into the output adjuster 124, and converted thereby into laser power data Pr, Pg, Pb using the corrected output adjustment data a6. The laser power data Pr, Pg, Pb are supplied to the output unit 126, which generates a temporary gray balance setting chart on the photosensitive medium 28 in a step S11. The temporary gray balance setting chart is a gray balance chart based on combinations of the device data Rd, Gd, Bd, e.g., Rd, Gd, Bd=0, 50, 100, 150, 200, 250, etc. at rough data intervals.

Then, colorimetric values X, Y, Z of the temporary gray balance setting chart are measured by the measuring unit 114 in a step S12. The temporary gray balance setting chart outputted to the photosensitive medium 28 corresponds to measuring points on black dots within a range shown hatched in FIG. 22 in an RGB real color space.

Hypothetical device data Rdi, Gdi, Bdi are established in a position sufficiently spaced from the above range in a step S13, and hypothetical colorimetric values Xi, Yi, Zi corresponding to the hypothetical device data Rdi, Gdi, Bdi are determined in a step S14. At this time, the hypothetical calorimetric values Xi, Yi, Zi are determined using the method of least squares on the assumption that the relationship between the hypothetical device data Rdi, Gdi, Bdi and the hypothetical calorimetric values Xi, Yi, Zi is monotonous with respect to the relationship between the device data Rd, Gd, Bd and the calorimetric values X, Y, Z. The above assumption is ensured based on the fact that the lightness of the chart generated on the photosensitive medium 28 decreases or increases monotonously as the device data Rd, Gd, Bd increase.

Using a set of all data (Rk, Gk, Bk, Xk, Yk, Zk) (k is the number of each of the data) composed of the device data including the hypothetical device data Rdi, Gdi, Bdi and the colorimetric values including the hypothetical colorimetric values Xi, Yi, Zi, four-dimensional planes X-RGB, Y-RGB, Z-RGB are determined by the method of least squares. The four-dimensional planes are defined by:

$$T = A \cdot D \quad (6)$$

The equation (6) represents the relationship indicated by the following equation (7):

$$\begin{bmatrix} X \\ Y \\ Z \end{bmatrix} = \begin{bmatrix} A_{X1} & A_{X2} & A_{X3} & A_{X4} \\ A_{Y1} & A_{Y2} & A_{Y3} & A_{Y4} \\ A_{Z1} & A_{Z2} & A_{Z3} & A_{Z4} \end{bmatrix} \begin{bmatrix} R \\ G \\ B \\ 1 \end{bmatrix} \quad (7)$$

The coefficient A which satisfies the equation (6) is determined using the method of least squares so that "E" in the equation (8) given below will be minimum. In the equation (8), k represents the number of each of the data, and a superscript T represents a transposition by which the rows and columns of the matrix are interchanged.

$$E = {}_k\Sigma(T_k - A \cdot D_k) \cdot (T_k - A \cdot D_k)^T \quad (8)$$

When the coefficient A is determined according to the equation (8), each of the four-dimensional planes is determined. Then, the hypothetical device data Rdi, Gdi, Bdi sufficiently spaced from the device data Rd, Gd, Bd and the hypothetical calorimetric values Xi, Yi, Zi corresponding thereto are determined on the four-dimensional planes X-RGB, Y-RGB, Z-RGB.

Figure 23:
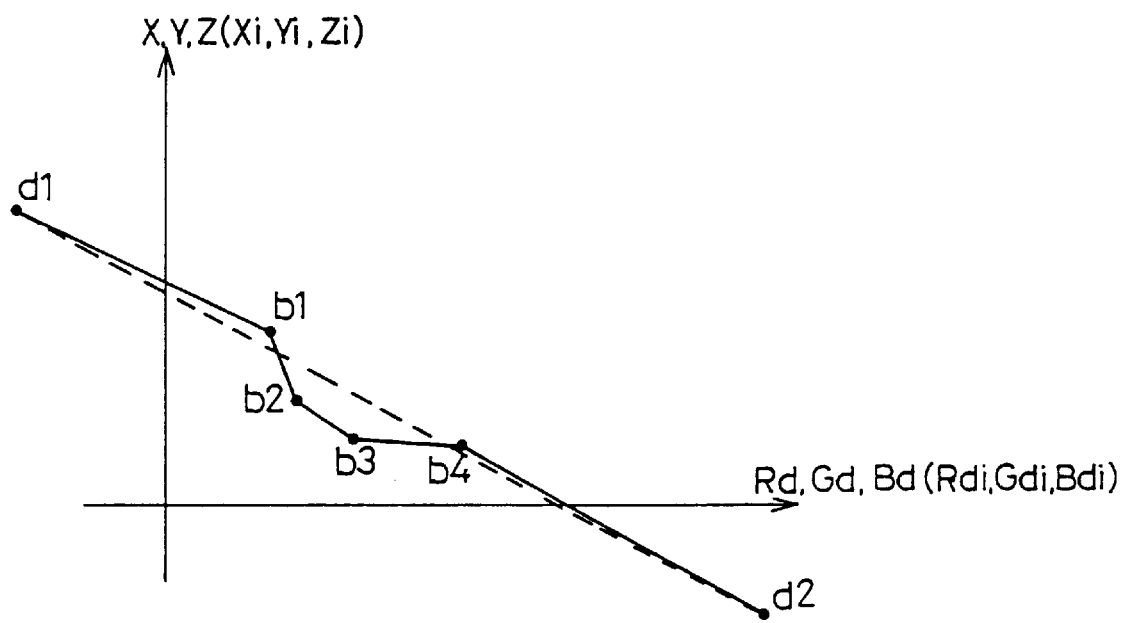
FIG. 23 is a diagram illustrative of a process of generating hypothetical device data according to the method of least squares.

FIG. 23 is a two-dimensional diagram of the relationship between the device data Rd, Gd, Bd and the hypothetical device data Rdi, Gdi, Bdi, and the calorimetric values X, Y, Z and the hypothetical calorimetric values Xi, Yi, Zi. Specifically, the relationship between the device data Rd, Gd, Bd and the calorimetric values X, Y, Z obtained from the temporary gray balance chart generated on the photosensitive medium 28 is on the monotonous decrease as indicated by points b1~b4 in FIG. 23. If a four-dimensional plane calculated using these points b1~b4 according to the method of least squares is indicated by a dotted line, then a plane interconnecting points d1, d2 indicative of the hypothetical colorimetric values Xi, Yi, Zi corresponding to the hypothetical device data Rdi, Gdi, Bdi on the four-dimensional plane and the points b1~b4 is on the monotonous decrease as indicated by a solid line in FIG. 23. Therefore, by generating the hypothetical calorimetric values Xi, Yi, Zi with respect to the hypothetical device data Rdi, Gdi, Bdi using the method of least squares, the monotonous relationship can be maintained between the device data Rd, Gd, Bd including the hypothetical device data Rdi, Gdi, Bdi and the calorimetric values X, Y, Z including hypothetical colorimetric values Xi, Yi, Zi.

After the hypothetical calorimetric values Xi, Yi, Zi with respect to the hypothetical device data Rdi, Gdi, Bdi have been determined, there is established a conversion table g for converting the device data Rd, Gd, Bd including the hypothetical device data Rdi, Gdi, Bdi into the calorimetric values X, Y, Z including hypothetical calorimetric values Xi, Yi, Zi. The conversion relationship is represented by:

$$XYZ = g(RGB) \quad (9)$$

Then, using the conversion table, an inverse conversion table $g^{-1}$ for converting the calorimetric values X, Y, Z into the device data Rd, Gd, Bd is determined according to a repetitive calculation process such as the Newton-Raphson formula or linear data interpolation process in a step S15.

Figure 24:
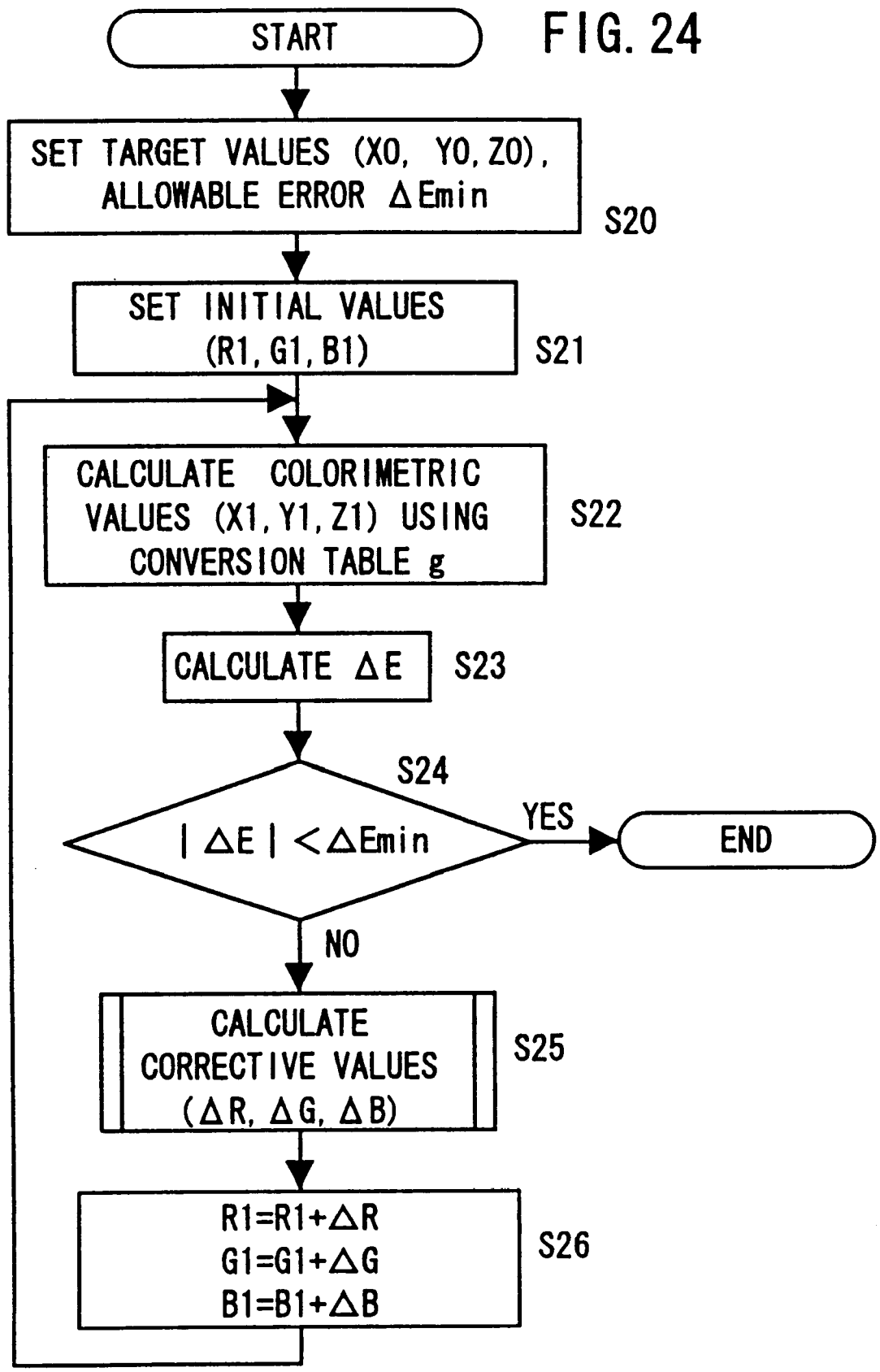
FIG. 24 is a flowchart of a process for calculating device data according to the Newton-Raphson formula.

FIG. 24 shows a process for determining the inverse conversion table $g^{-1}$ according to the Newton-Raphson formula. Since a gray balance is to be determined, target values in an XYZ space which correspond to target values (L*, 0, 0, 0) of the color of gray for a*=b*=0 in an L*a*b* space are set to (X0, Y0, Z0), and an allowable error in the repetitive calculation process is set to ΔEmin in a step S20. Then, known initial values (R1, G1, B1) in an RGB space are established in a step S21, and calorimetric values (X1, Y1, Z1) with respect to the initial values (R1, G1, B1) are determined using the conversion table g in a step S22. An error ΔE between the target values (X0, Y0, Z0) and the colorimetric values (X1, Y1, Z1) is determined in a step S23, and compared with the allowable error ΔEmin in a step S24. If not |ΔE|<ΔEmin, then corrective values (ΔR, ΔG, ΔB) are calculated in a step S25, and then the initial values (R1, G1, B1) are corrected by the corrective values (ΔR, ΔG, ΔB) in a step S26, after which the steps S22~S24 are repeated.

Figure 25:
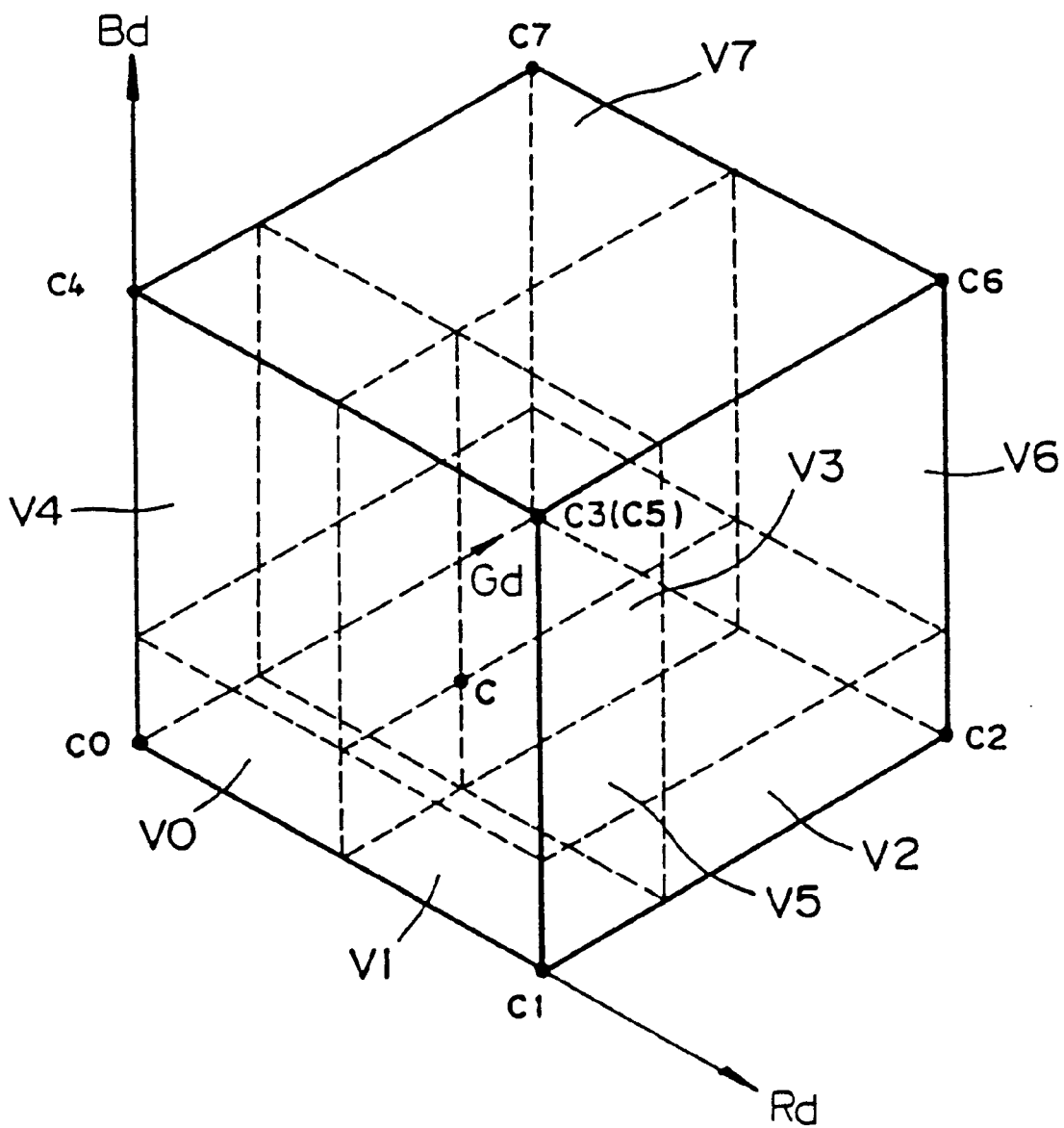
FIG. 25 is a diagram illustrative of a volume interpolating process.
Figure 26:
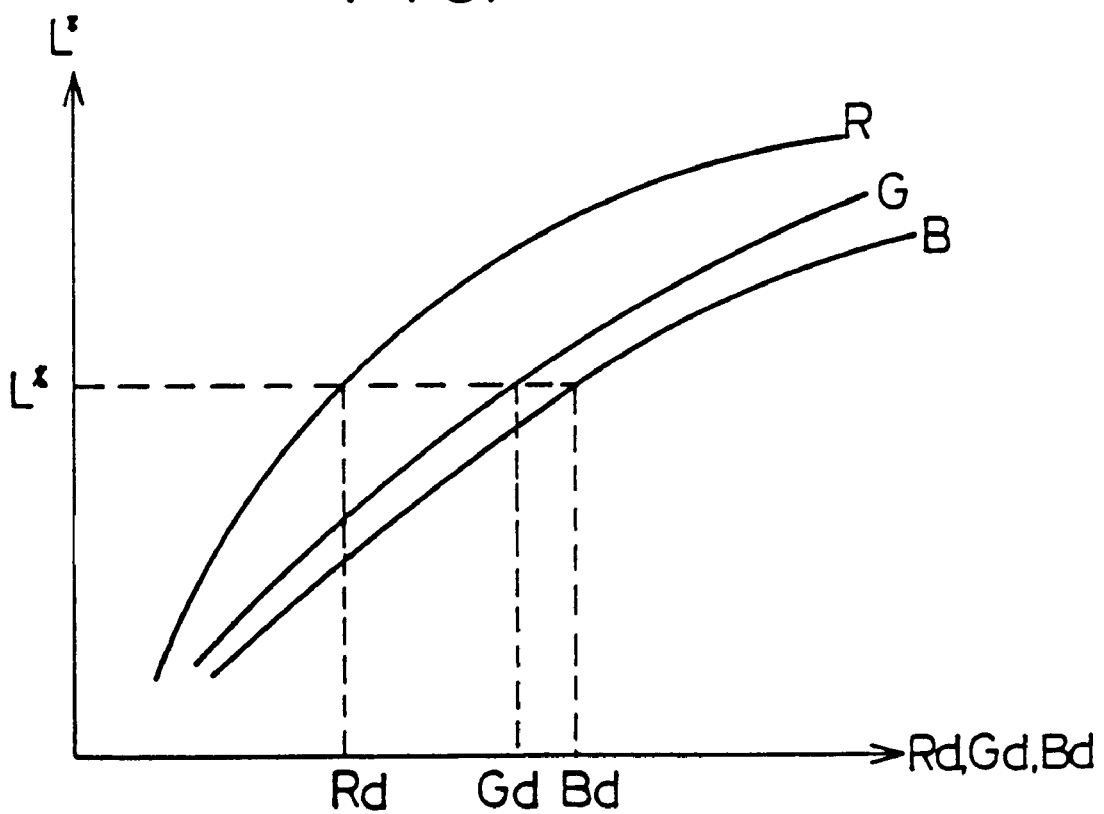
FIG. 26 is a diagram illustrative of a gray balance.

The corrective values (ΔR, ΔG, ΔB) are determined as follows: As shown in FIG. 25, when any device data Rd, Gd, Bd are given, the calorimetric values X, Y, Z with respect to the device data Rd, Gd, Bd (represented by a point c) are determined using calorimetric values $(X_0, Y_0, Z_0)$~$(X_7, Y_7, Z_7)$ corresponding to device data $(R_0, R_0, R_0)$~$(R_7, R_7, R_7)$ at eight grip points c0~c7, the volume V of a rectangular parallelepiped surrounded by the grip points c0~c7, and eight volumes V0~V7 divided by any interpolating point c in the rectangular parallelepiped, as follows:

$$X = \sum_{j=0}^{7} V_j \cdot X_j / V \quad (10)$$

$$Y = \sum_{j=0}^{7} V_j \cdot Y_j / V \quad (11)$$

$$Z = \sum_{j=0}^{7} V_j \cdot Z_j / V \quad (12)$$

If the calorimetric values X, Y, Z with respect to the device data Rd, Gd, Bd are linear in a small range in the equations (10)~(12), then the corrective values (ΔR, ΔG, ΔB) which represent small changes of the device data Rd, Gd, Bd and small changes ($\Delta X$, $\Delta Y$, $\Delta Z$) of the calorimetric values X, Y, Z satisfy the following relationship:

$$\begin{bmatrix} \Delta X \\ \Delta Y \\ \Delta Z \end{bmatrix} = \begin{bmatrix} \frac{\partial X}{\partial Rd} & \frac{\partial X}{\partial Gd} & \frac{\partial X}{\partial Bd} \\ \frac{\partial Y}{\partial Rd} & \frac{\partial Y}{\partial Gd} & \frac{\partial Y}{\partial Bd} \\ \frac{\partial Z}{\partial Rd} & \frac{\partial Z}{\partial Gd} & \frac{\partial Z}{\partial Bd} \end{bmatrix} \begin{bmatrix} \Delta R \\ \Delta G \\ \Delta B \end{bmatrix} \equiv J \begin{bmatrix} \Delta R \\ \Delta G \\ \Delta B \end{bmatrix} \quad (13)$$

where J represents a Jacobian matrix. If the Jacobian matrix J is determined in the equation (13), then the small changes ($\Delta X$, $\Delta Y$, $\Delta Z$) of the calorimetric values X, Y, Z with respect to the corrective values ($\Delta R$, $\Delta G$, $\Delta B$) for the device data Rd, Gd, Bd can be predicted. The Jacobian matrix J is determined by partially differentiating the equations (10) (12) with the device data Rd, Gd, Bd. Therefore, the corrective values ($\Delta R$, $\Delta G$, $\Delta B$) for the device data Rd, Gd, Bd are determined as:

$$\begin{bmatrix} \Delta R \\ \Delta G \\ \Delta B \end{bmatrix} = J^{-1} \begin{bmatrix} \Delta X \\ \Delta Y \\ \Delta Z \end{bmatrix} \quad (14)$$

By repeatedly effecting calculations using the Jacobian matrix J thus obtained, it is possible to determine an inverse conversion table $g^{-1}$ representing the relationship of the device data Rd, Gd, Bd to the target values X0, Y0, Z0 of any desired color of gray. The inverse conversion table $g^{-1}$ may also be determined as the relationship of the device data Rd, Gd, Bd to the target values L*, 0, 0 in the L*a*b* space.

For the Newton-Raphson formula to converge, it is necessary that an equation having a solution to be determined be a monotonous function. There is a monotonous relationship between the device data Rd, Gd, Bd including the hypothetical device data Rdi, Gdi, Bdi and the calorimetric values X, Y, Z including the hypothetical calorimetric values Xi, Yi, Zi, and the device space and the calorimetric value space extend into a hypothetical space. Since all device data Rd, Gd, Bd and calorimetric values X, Y, Z are present which are calculated in the repeated calculations, the repeated calculations can be carried out reliably without divergence to obtain accurate values.

In order to apply the Newton-Raphson formula, according to this embodiment, the corrected output adjustment data a6 are established so as to be capable of converting the temporary gray balance setting chart obtained from the device data Rd, Gd, Bd into linear characteristics a5 as shown in FIG. 20. Since the calorimetric values X, Y, Z are linear with respect to the device data Rd, Gd, Bd, it is possible to carry out calculations with few errors compared with the nonlinear test charge measured data a4. Specifically, if the test charge measured data a4 are used, changes in the lightness L* with respect to changes in the device data Rd, Gd, Bd may be large depending on the device data Rd, Gd, Bd (see FIG. 20), tending to produce more errors. If the linear characteristics a5 are used, the change can be rendered substantially constant in the full range of the lightness L* compared with the above example, making it possible to carry out stable calculations.

The data of the inverse conversion table $g^{-1}$ thus determined represent the relationship between the lightness L* (a*=b*=0) giving the color of gray and the device data Rd, Gd, Bd, and are established as a temporary gray balance in a step S16.

Figure 27:
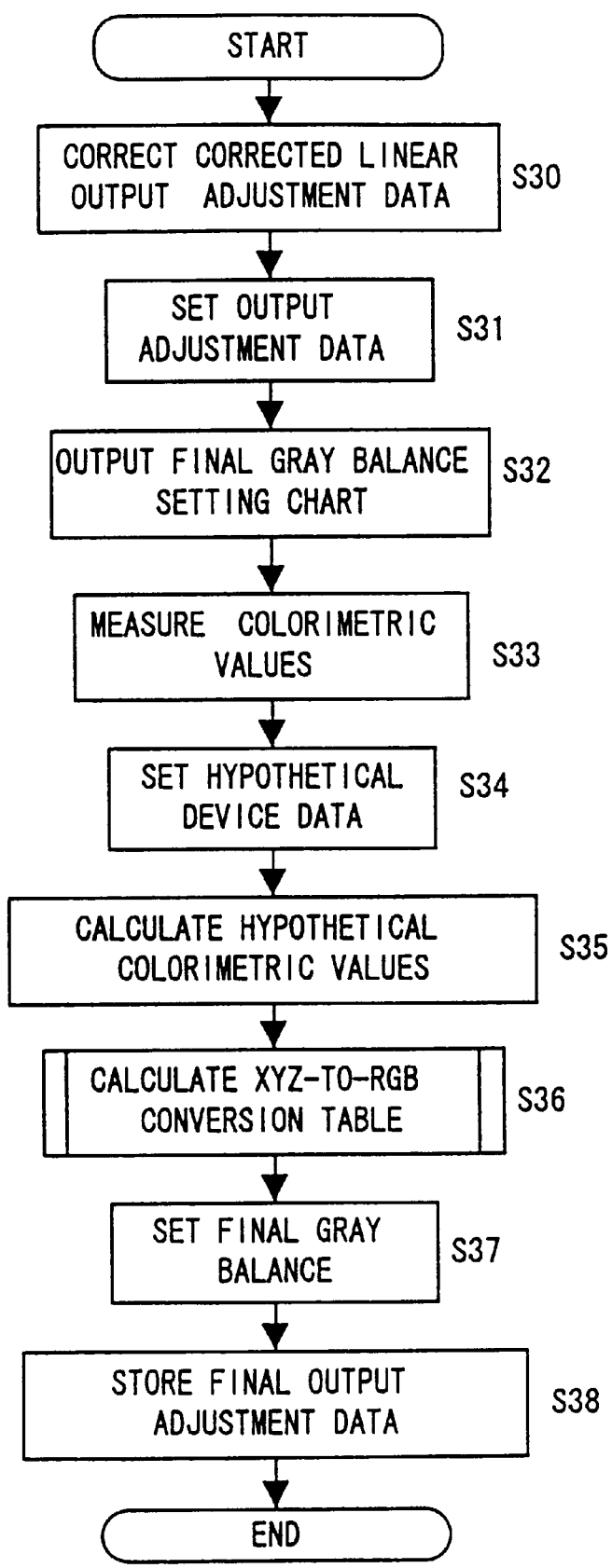
FIG. 27 is a flowchart of a process for establishing a final gray balance.

[3] The temporary gray balance thus established is approximately determined according to the roughly established temporary gray balance setting chart as shown in FIG. 22, and hence is not a sufficiently accurate gray balance. Therefore, a chart is outputted using the temporary gray balance, and a final gray balance with higher accuracy is determined using such a chart. FIG. 27 shows a process for establishing such a final gray balance.

First, the corrected output adjustment data a6 generated in [1] are corrected using the temporary gray balance generated in [2] in a step S30 to determine output adjustment data in which the gray balance is temporarily adjusted, for outputting the color of gray having a desired lightness L* when Rd=Gd=Bd. The output adjustment data are downloaded into the output adjuster 124 in a step S31.

Then, the device data Rd, Bd, Bd in the vicinity of the color of gray including Rd=Gd=Bd are converted into laser power data Pr, Pg, Pb using the output adjustment data. The laser power data Pr, Pg, Pb are supplied to the output unit 126, which generates a final gray balance setting chart on the photosensitive medium 28 in a step 32. The final gray balance setting chart is generated from the output adjustment data which have been established on the basis of the temporary gray balance, and represents measuring points on black dots in a range shown hatched in FIG. 28, for example, and corresponds to the color of gray or measuring points in the vicinity thereof. The final gray balance setting chart set to a pitch smaller than the temporary gray balance setting chart shown in FIG. 22.

Then, calorimetric values X, Y, Z of the final gray balance setting chart are measured by the measuring unit 114 in a step S33. Furthermore, hypothetical device data Rdi, Gdi, Bdi are established in a position sufficiently spaced from the above range in a step S34, and hypothetical calorimetric values Xi, Yi, Zi corresponding to the hypothetical device data Rdi, Gdi, Bdi are determined in a step S35.

Thereafter, steps S36 and S37 are carried out in the same manner as the steps S15 and S16 in [2] as shown in FIG. 21, thereby calculating a final gray balance capable of obtaining a color of gray with high accuracy. Then, output adjustment data in which the gray balance is temporarily adjusted, for outputting the color of gray having a desired lightness L* when Rd=Gd=Bd, are determined, and stored into the output adjustment data memory 120 in a step S38.

As described above, after the temporary gray balance is determined using the gray balance setting chart established at a rough pitch in [2], the final gray balance is determined using the gray balance setting chart which has been established at a smaller pitch in the vicinity of the color of gray in [3]. Thus, the final gray balance is determined at a high speed using the gray balance setting chart of a small number of patches for. The pitch of the gray balance setting chart may further be divided into a smaller pitch and the process in [3] may be repeated to establish a more accurate gray balance.

If the processing time permits, the temporary gray balance setting chart obtained from the corrected output adjustment data used to determine the temporary gray balance in [2] may be established in a smaller pitch in advance, and the final gray balance may be determined in one process using the temporary gray balance setting chart without the process in [3].

[4] A desired color of gray may not possibly be generated using the final gray balance generated as described above, due to changes in the characteristics of the output unit 126 of the image output system and aging of the photosensitive medium 28. When such a shortcoming occurs, a gray balance setting chart at a small pitch only in the vicinity of a desired gray region is generated using the output adjustment data obtained from the final gray balance, and a process of determining a gray balance in that region as described above is effected on a plurality of points using the gray balance setting chart, after which the output adjustment data may be corrected using the gray balances at the plural points. This allow the gray balance to be adjusted simply. The above process of determining the gray balance may automatically be carried out on line by the image output system.

Figure 29:
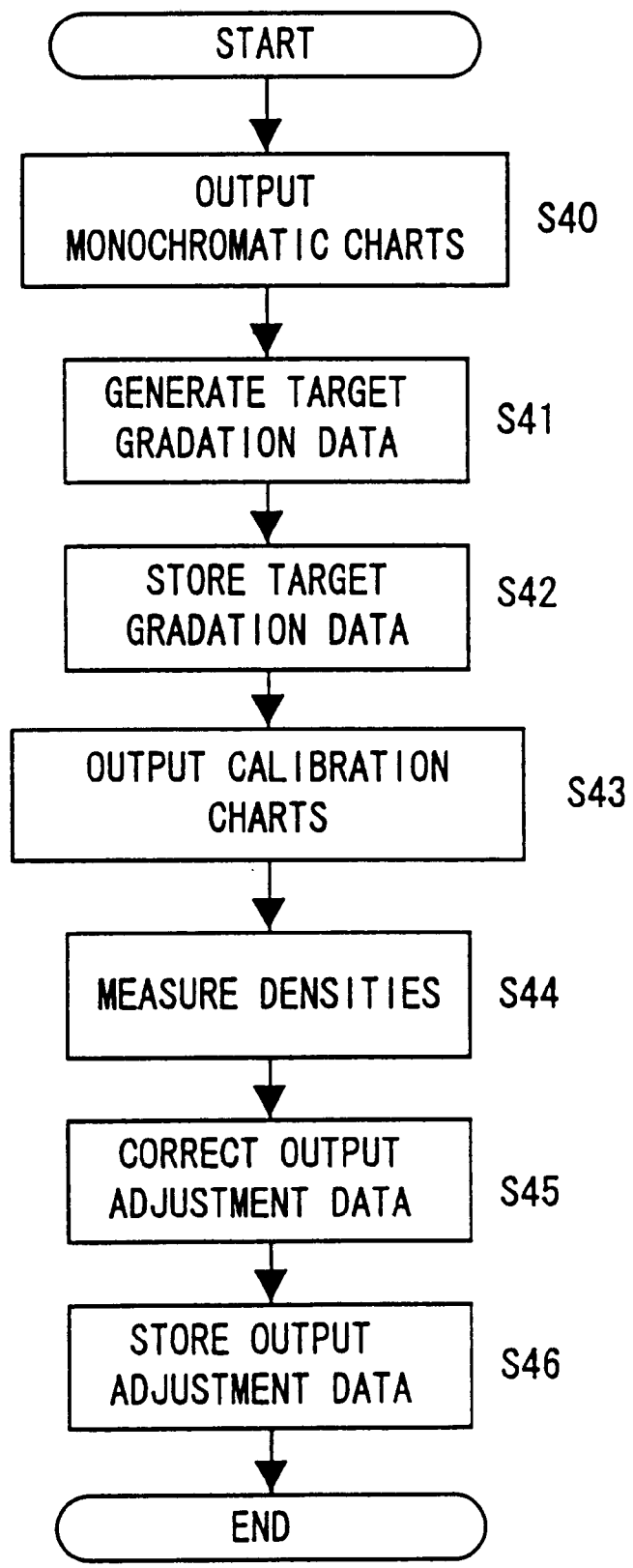
FIG. 29 is a flowchart of a process for generating calibration data.

[5] The monochromatic gradation in the image output signal for which the final gray balance has been established may be calibrated as follows: FIG. 29 shows a process of calibrating monochromatic gradation data.

First, the device data Rd, Gd, Bd are converted into respective laser power data Pr, Pg, Pb using the output adjustment data generated in [1]~[4] for which a gray balance has been established. The laser power data Pr, Pg, Pb are supplied to the output unit 126, which outputs monochromatic charts of the colors C, M, Y on the photosensitive medium 28 in a step S40. Then, the densities or colorimetric values of the monochromatic charts are measured by the measuring unit 114, generating target gradation data of the colors C, M, Y in a step S41. The target gradation data are stored in the output adjustment data generator 116, as color conversion data optimum for the output apparatus 112 for which a gray balance has been established, in a step S42.

If desired colors can no longer be produced using the output adjustment data due to aging of the output apparatus 112 and the output medium, then the output adjustment data are calibrated using the target gradation data. First, using the output adjustment data prior to being corrected, laser power data Pr, Pg, Pb are produced from the device data Rd, Gd, Sd, and monochromatic calibration charts of the respective colors are generated from the laser power data Pr, Pg, Pb in a step S43. Then, the densities or calorimetric values of the calibration charts are measured in a step S44, and thereafter the output adjustment data are corrected to turn the densities or calorimetric values into the target gradation data in a step S45. The output adjustment data thus obtained are stored as data representing adjusted monochromatic gradations into the output adjustment data memory 120 in a step S46. The steps S43~S46 may be repeated to correct the output adjustment data as required.

The image output system shown in FIG. 17 converts an image using the output adjustment data which have been established as described above.

Specifically, image data C, M, Y, K supplied to the processor 110 are converted into image data R, G, B by the data converter 118, and the image data R, G, B are transferred to the output apparatus 112 in which the image data R, G, B converted into laser power data Pr, Pg, Pb by the output adjustment data. The output unit 126 controls laser beams based on the laser power data Pr, Pg, Pb, forming a desired image on the photosensitive medium 28. In the image, the gray balance and gradations are adjusted highly accurately to reproduce desired colors.

In the above embodiment, the established gray balance is fed back to the output adjuster 124 to produce output adjustment data for which a gray balance has been established. However, the established gray balance may be fed back to the data converter 118 to produce conversion data for which a gray balance has been established.

The above process serves to establish a gray balance with respect to the output apparatus 16 or 112. However, a gray balance can easily be adjusted and shading can easily be corrected with respect to a plurality of desired output apparatus by using output characteristic data of a reference output apparatus for which a gray balance has been established as described above. Such a process will be described below with respect to a system shown in FIG. 30.

Figure 30:
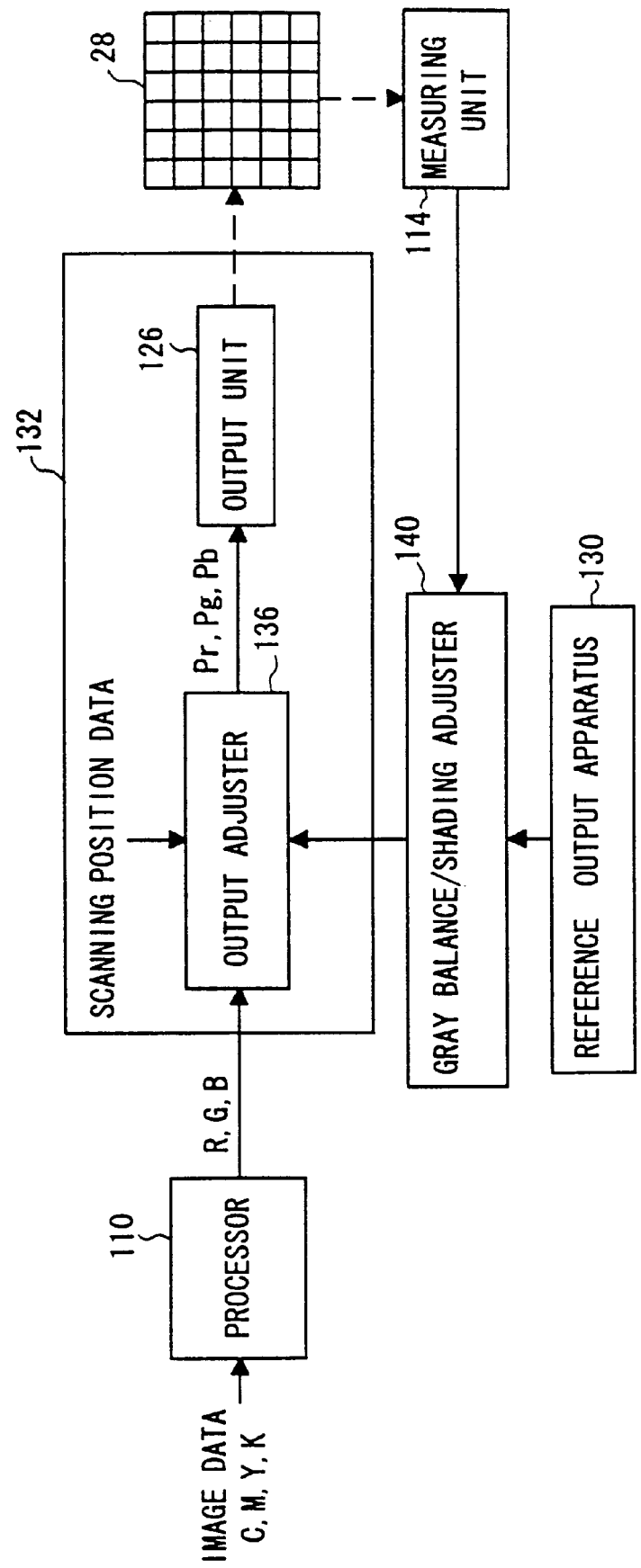
FIG. 30 is a block diagram of a system including an output apparatus to which a process of correcting shading is applied.

The system shown in FIG. 30 comprises a reference output apparatus 130 for which a gray balance has already been established highly accurately and shading has been corrected, a desired output apparatus 132 for which a gray balance is to be established and shading is to be corrected according to output characteristic data supplied from the reference output apparatus 130, a processor 110 for converting image data C, M, Y, K into device data R, G, B through given image processing, a gray balance/shading adjuster 140 for establishing a gray balance and adjusting shading for the desired output apparatus 132, and a measuring unit 114 for measuring an image (chart) on the photosensitive medium 28 to obtain calorimetric values. The desired output apparatus 132 is of a structure identical to the reference output apparatus 130 as to its function to form images, and has different individual output characteristics only. The photosensitive medium 28 used in the desired output apparatus 132 has substantially the same characteristics as those of a recording medium used in the reference output apparatus 130.

The desired output apparatus 132 comprises an output adjuster 136 for converting the device data R, G, B into laser power data Pr, Pg, Pb as output control data for effecting laser beam recording, according to output adjustment data for which a gray balance has been established and shading has been corrected as described later on, and an output unit 126 for controlling laser beams with the laser power data Pr, Pg, Pb to form an image on the photosensitive medium 28.

Figure 31:
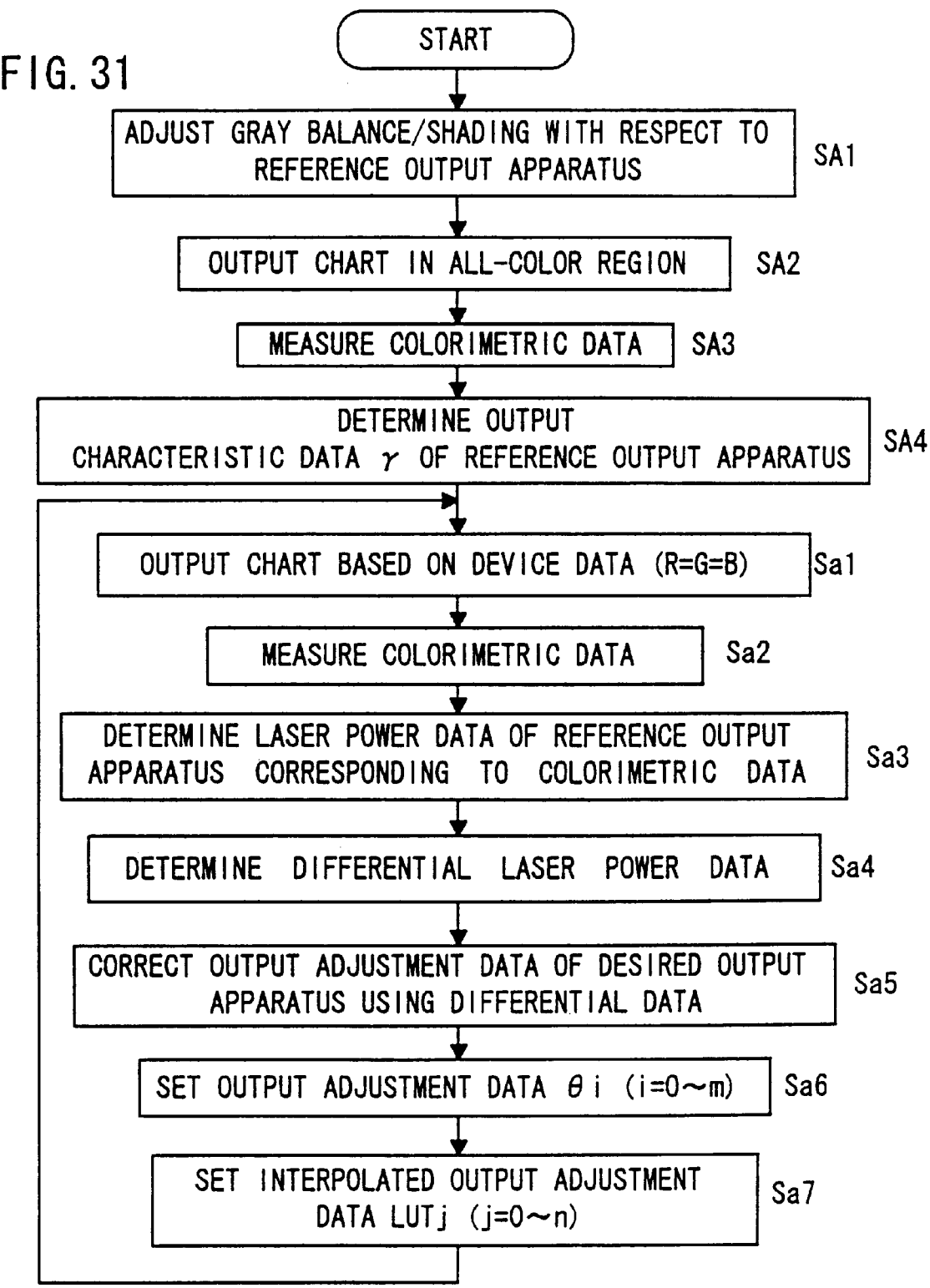
FIG. 31 is a flowchart of a process of establishing a gray balance and correcting shading in a desired output apparatus.

A process of establishing a gray balance and correcting shading in the desired output apparatus 132 will be described below with reference to FIG. 31. Steps SA1~SA4 are executed by the reference output apparatus 130, whereas steps Sa1~Sa7 are executed by the desired output apparatus 132. Data relative to the reference output apparatus 130 are indicated by a suffix (m), if necessary, and data relative to the desired output apparatus 132 are indicated by a suffix (ob), if necessary.

First, the gray balance and shading are adjusted with respect to the reference output apparatus 130 according to the above-described process or any other desired process in a step SA1. In the reference output apparatus 130 for which the gray balance has been established and shading has been corrected with high accuracy, data for converting device data R, G, B (m) into laser power data Pr, Pg, Pb (m) are referred to as first output characteristic data $\alpha(m)$.

Then, a chart in a full-color range established at a small pitch in the vicinity of the color of gray is generated on the recording medium by the reference output apparatus 130 using the first output characteristic data $\alpha(m)$ in a step SA2. Colorimetric values L*, a*, b* (m) of each of the patches of the chart are measured in a step SA3. Second output characteristic data $\beta(m)$ representing the relationship between device data R, G, B (m) and the calorimetric values L*, a*, b* (m) are determined. Furthermore, third output characteristic data $\gamma(m)$ representing the relationship between the laser power data Pr, Pg, Pg (m) and the calorimetric values L*, a*, b* (m) are determined from the first output characteristic data $\Delta(m)$ and the second output characteristic data $\beta(m)$ in a step SA4. The first, second, and third output characteristic data $\alpha(m)$, $\beta(m)$, $\gamma(m)$ are supplied from the reference output apparatus 130 to the gray balance/shading adjuster 140 of the desired output apparatus 132.

Figure 32:
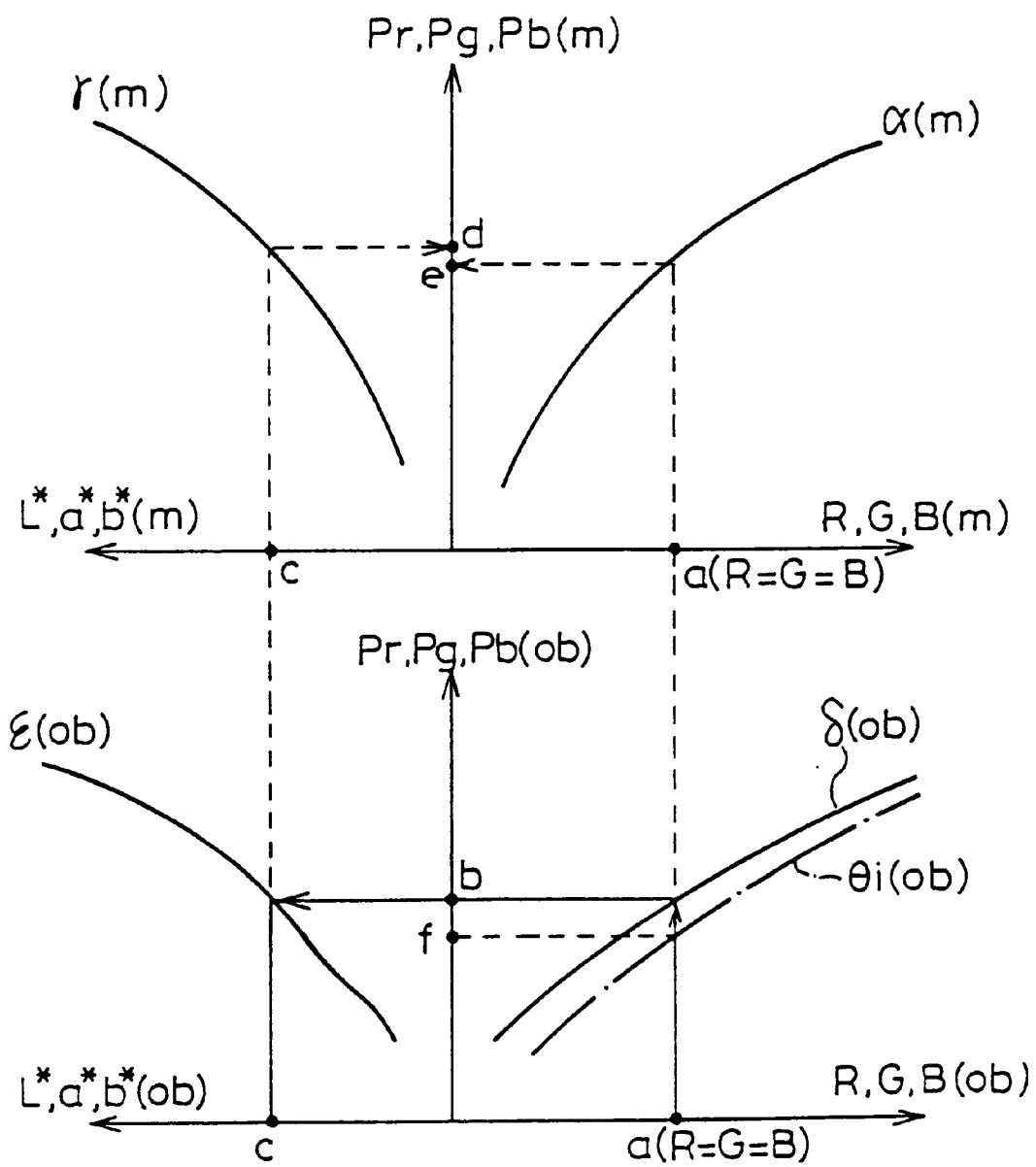
FIG. 32 is a diagram illustrative of a process of establishing a gray balance in the desired output apparatus.

The relationship between the first output characteristic data a(m) and the third output characteristic data γ(m), and the device data R, G, B (m), the laser power data Pr, Pg, Pb (m), and the colorimetric values L*, a*, b* (m) is shown in FIG. 32.

Then, in the desired output apparatus 132, device data R, G, B (ob) (R=G=B) (see data a in FIG. 32) for forming a color of gray are converted into laser power data Pr, Pg, Pb (ob) (see data b in FIG. 32) using output adjustment data δ(ob) prior to being adjusted which is established in the output adjuster 136 for converting the device data R, G, B into the laser power data Pr, Pg, Pb, and a chart T in the color of gray is generated on the photosensitive medium 28 based on the laser power data Pr, Pg, Pb (ob) in a step Sa1.

Figure 33:
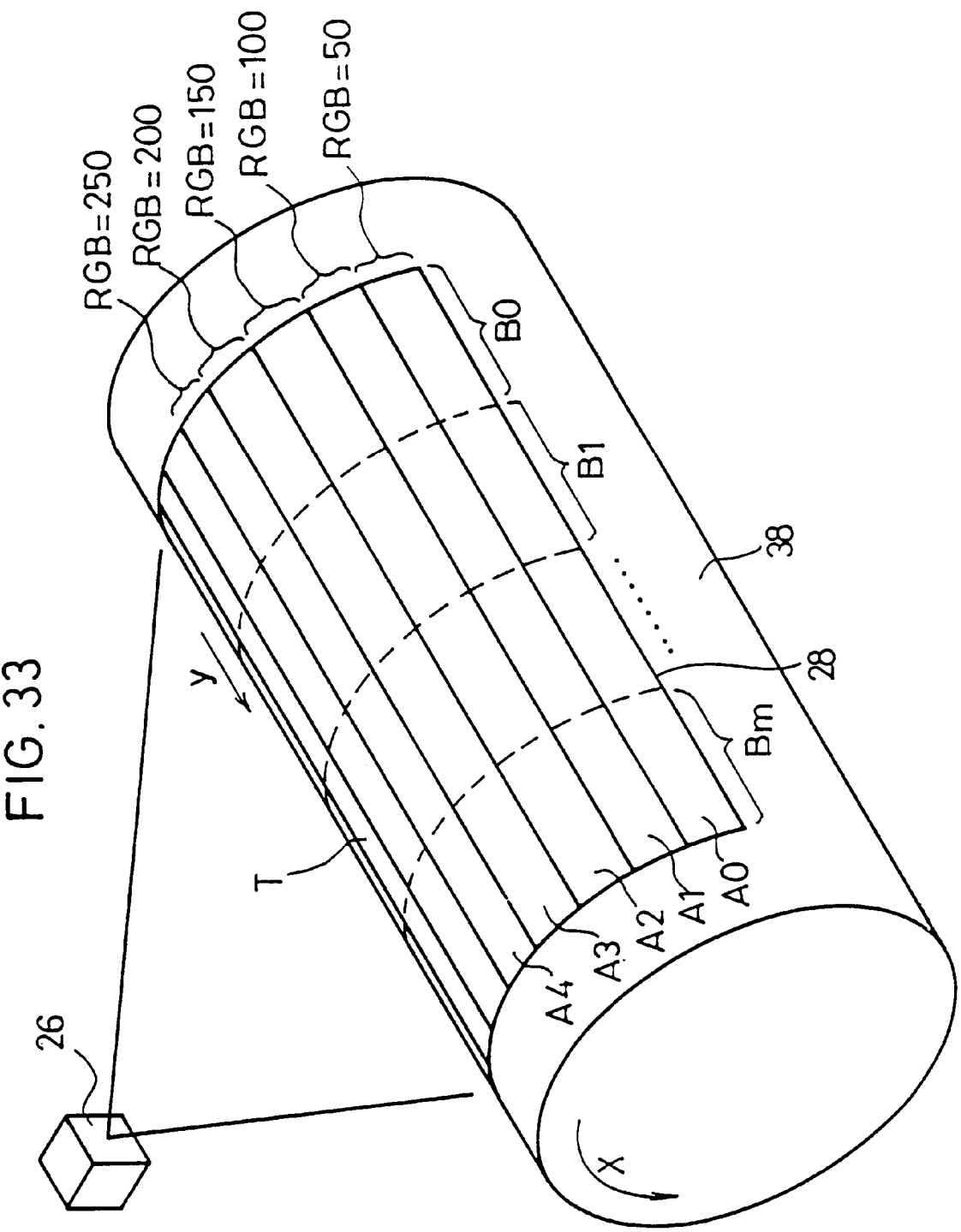
FIG. 33 is a perspective view showing a chart for correcting shading and divided regions of the chart in the desired output apparatus.
Figure 34:
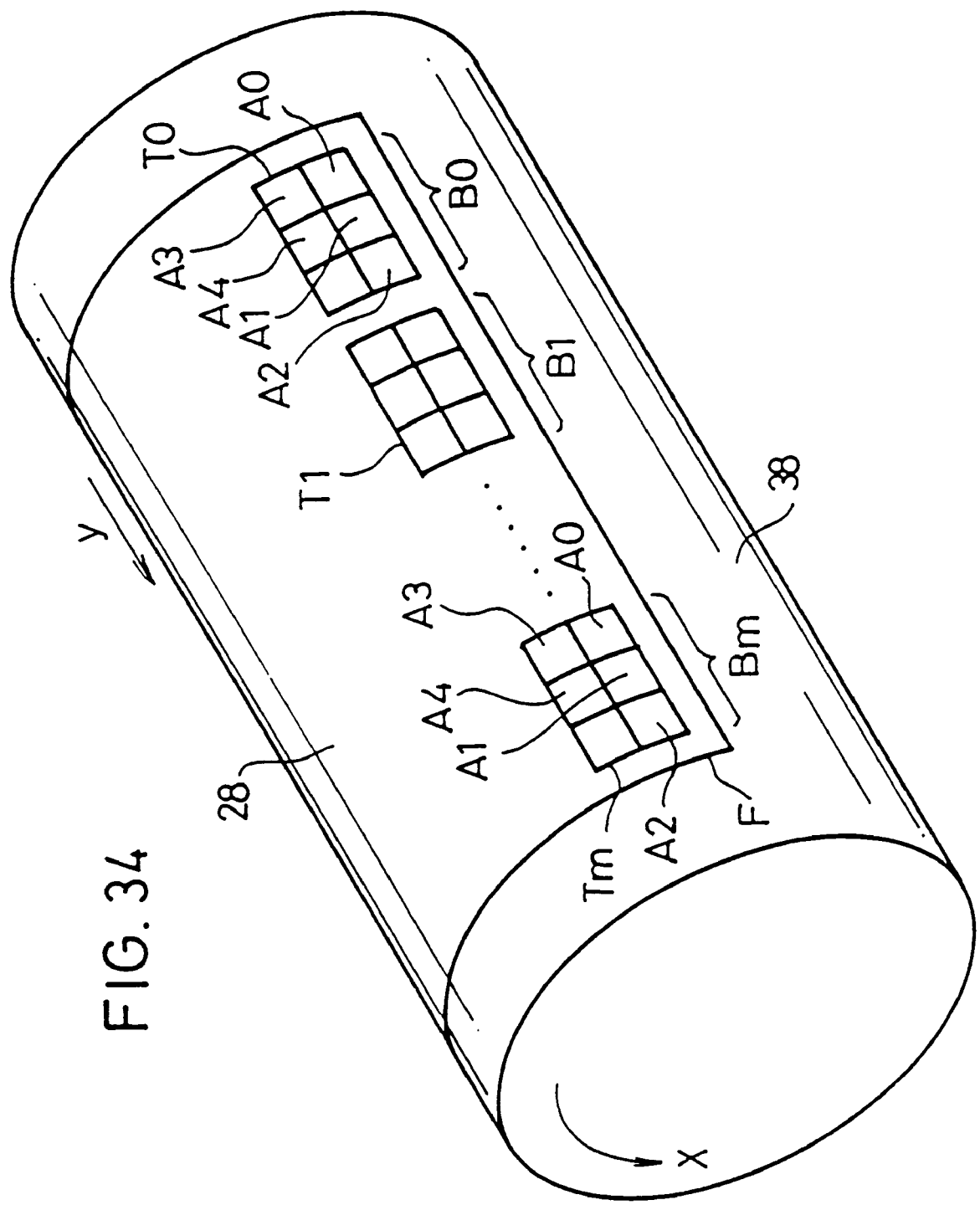
FIG. 34 is a perspective view showing subcharts for correcting shading and divided regions of the chart in the desired output apparatus.

In the output unit 126, as shown in FIG. 33, laser beams from the exposure head 26 are scanned in the direction indicated by the arrow y to form an image on the photosensitive medium 28 wound around the exposure drum 38 which is being rotated in the direction indicated by the arrow x. The temperature distribution in the direction indicated by the arrow y on the exposure drum 38 may not be uniform, and the shape of the beam spot of the laser beams applied from the exposure head 26 to the photosensitive medium 28 may not remain the same in scanning positions along the direction indicated by the arrow y. For these reasons, the photosensitive medium 28 tends to suffer shading in the direction indicated by the arrow y, with the result that a uniform image may not be formed in the direction indicated by the arrow y even though the same device data R, G, B are employed. As shown in FIG. 33, the chart T is generated according to device data R, G, B (R=G=B) (ob) to produce colors of gray at R=G=B=50, 100, 150, 200, 250 in respective regions A0~A4 along the direction indicated by the arrow x, and each of the regions A0~A4 is divided into a plurality of regions B0~Bm along the direction indicated by the arrow y along which shading appears. Alternatively, as shown in FIG. 34, subcharts T0~Tm each having a grid-like pattern of regions A0~A4 may be arranged along the direction indicated by the arrow y. The subcharts T0~Tm correspond in position to the regions B0~Bm.

The chart T or subcharts T0~Tm thus generated are measured by the measuring unit 114 to determine calorimetric values L*, a*, b* (ob) with respect to the regions B0~Bm in a step Sa2 (see data c in FIG. 32). The relationship between the laser power data Pr, Pg, Pb (ob) (data b in FIG. 32) of the desired output apparatus 132 and the calorimetric values L*, a*, b* (ob) (data c in FIG. 32) is referred to output characteristic data (ob). The relationship between the output characteristic data α(m), γ(m), ε(ob), δ(ob) is shown in FIG. 32.

In the regions B0~Bm, laser power data Pr, Pg, Pb (m) of the reference output apparatus 130 which correspond to the calorimetric values L*, a*, b* (ob) (data c in FIG. 32) determined in the step Sa2 are determined using the third output characteristic data γ(m) in a step Sa3 (data d in FIG. 32).

The relationship of the laser power data Pr, Pg, Pb (m) to the calorimetric values L*, a*, b* (m) can be determined as an inverse conversion of the relationship of the calorimetric values L*, a*, b* (m) to the laser power data Pr, Pg, Pb (m) according to the Newton-Raphson formula or any other calculation process. Instead of the third output characteristic data γ(m), the second output characteristic data β(m) may be used to determine the relationship of the device data R, G, B (m) to the calorimetric values L*, a*, b* (m) according to the Newton-Raphson formula or the like, and thereafter the first output characteristic data α(m) may be used to determine the laser power data Pr, Pg, Pb (m), with the result that the relationship of the laser power data Pr, Pg, Pb (m) to the calorimetric values L*, a*, b* (m) may be determined.

Then, laser power data Pr, Pg, Pb (m) (data e in FIG. 32) at the time the device data R, G, B (R=G=B) (data a in FIG. 32) are given to the reference output apparatus 130 are determined using the first output characteristic data α(m), after which differential data (e–d) between the data d, e are determined in each of the regions B0~Bm in a step Sa4.

Using the differential data (e–d), laser power data Pr, Pg, Pb (ob) (data f in FIG. 32) with respect to the device data R, G, B (R=G=B) (data a in FIG. 32) of the desired output apparatus 132 are corrected to satisfy the relationship:

$$f-b=e-d \tag{15}$$

thereby determining corrected output adjustment data θi(ob) (i=0~m) with respect to each of the regions B0~Bm in a step Sa5. The output adjustment data θi(ob) may be determined by determining ratio data e/d between the data d, e and multiplying the data b by the ratio data e/d, rather than using the differential data (e–d).

Figure 35:
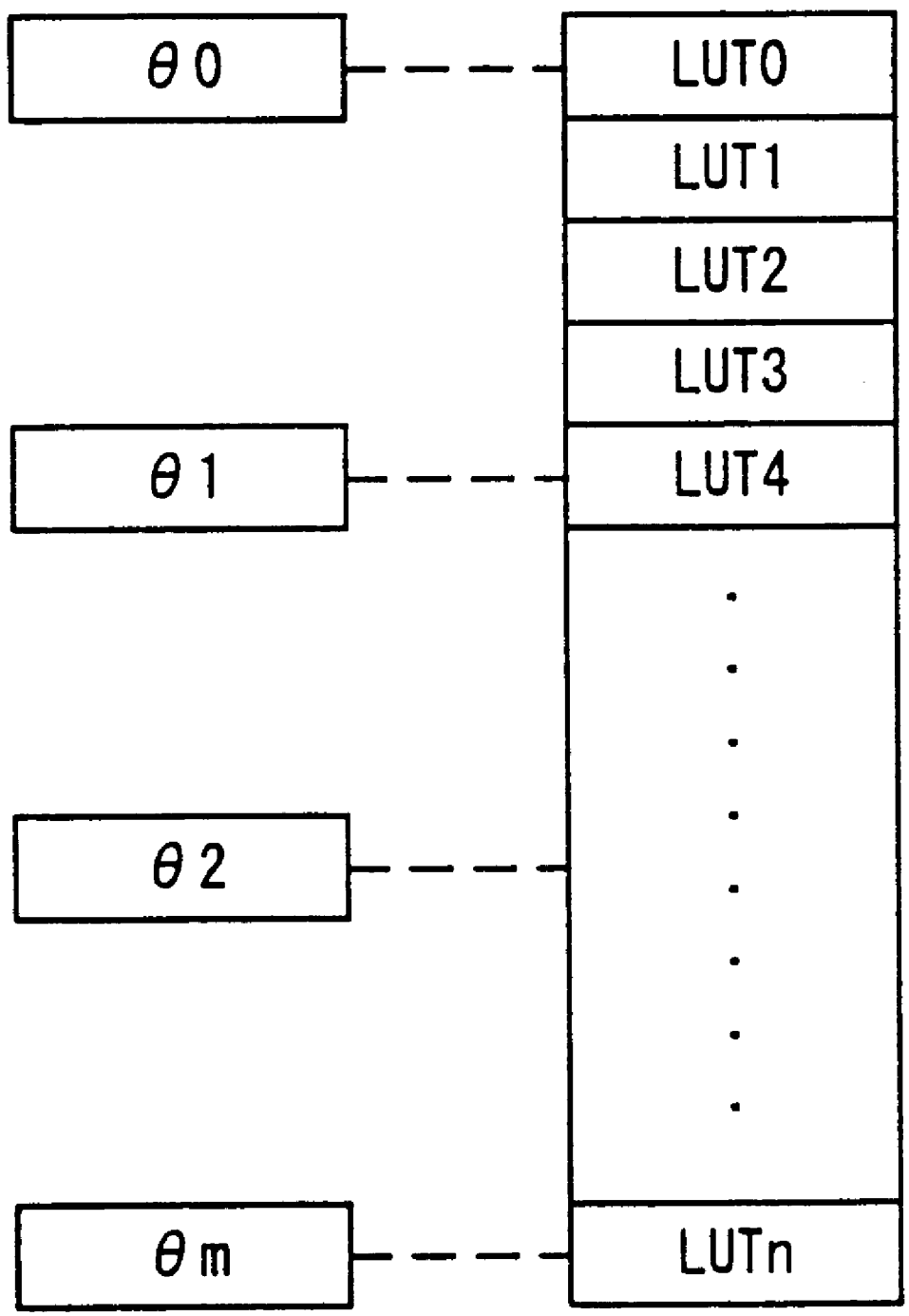
FIG. 35 is a diagram showing a process of interpolating output adjustment data for shading correction.

The output adjustment data θi(ob) determined with respect to each of the regions B0~Bm are set in the output adjuster 136 of the desired output apparatus 132 in a step Sa6. The output adjustment data θi(ob) have been established roughly along the direction indicated by the arrow y on the exposure drum 38. Therefore, as shown in FIG. 35, the output adjustment data θi(ob) are interpolated using output adjustment data θi(ob) established with respect to adjacent regions B0~Bm, producing finely divided output adjustment data LUTj (j=0~n, n>m) which are set in the output adjuster 136 in a step Sa7. The output adjustment data LUTj may be determined with respect to each of scanning lines formed by the exposure head 26, or with respect to every given number of scanning lines depending the degree of shading.

In the output adjustment data LUTj thus determined, gray balances are established in (n+1) regions divided from each of the regions B0~Bm, and a gray balance is established in each of the (n+1) regions. Therefore, the output adjustment data LUTj are capable of correcting shading between the (n+1) regions. The desired output apparatus 132 thus outputs minimum necessary charts using the device data R, G, B (R=G=B) for forming a color of gray, and gray balances can easily be established and shading can be corrected at the same time easily and quickly based on the charts.

The steps Sa1~Sa7 are repeated, if necessary, to produce output adjustment data LUTj capable of establishing a gray balance and correcting shading highly accurately with respect to the desired output apparatus 132.

The desired output apparatus 132 for which the gray balance and shading have been adjusted converts image data using the output adjustment data LUTj (j=0~n) which have been established as described above.

Figure 36:
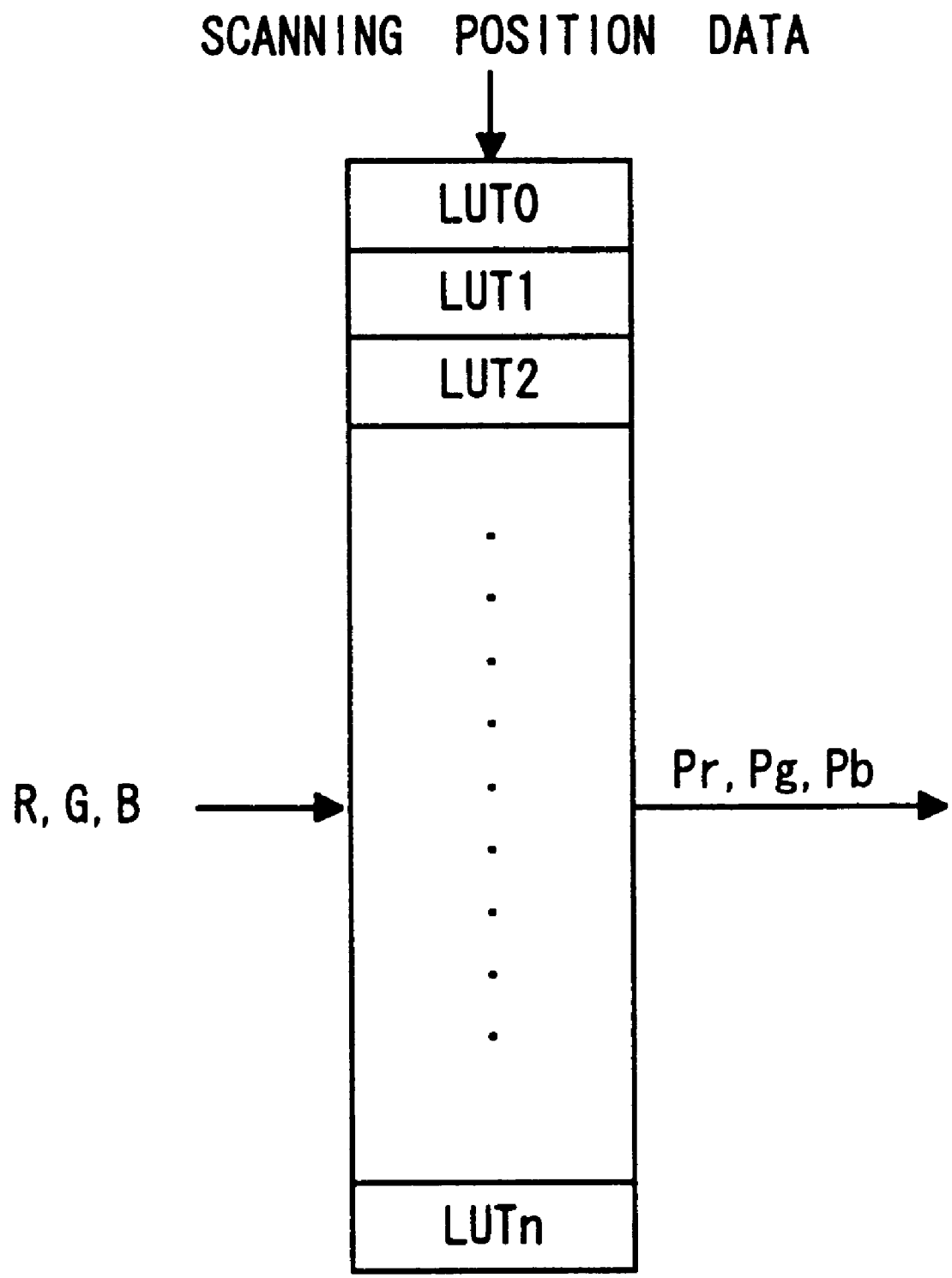
FIG. 36 is a diagram of a process of converting device data with the output adjustment data for adjusting a gray balance and shading.

Specifically, image data C, M, Y, K supplied to the processor 110 are converted into device data R, G, B, which are transferred to the output adjuster 136. In the output adjuster 136, as shown in FIG. 36, the device data R, G, B are converted into laser power data Pr, Pg, Pb according to the output adjustment data LUTj (j=0~n) which have been selected depending on scanning position data of the laser beams applied by the exposure head 26. Then, the laser beams are controlled by the laser power data Pr, Pg, Pb for thereby forming a desired image on the photosensitive medium 28. Since a gray balance has been adjusted highly accurately and shading is corrected depending on the scanning position in the image, the image reproduces desired colors on the photosensitive medium 28.

The steps Sa1~Sa7 may be executed immediately before an each image is outputted for producing highly accurate images for which a gray balance and shading have been adjusted. The steps Sa1~Sa7 may be executed when the desired output apparatus 132 is turned on. If the chart T is generated using device data R, G, B more finely divided than the device data R, G, B (R=G=B=50, 100, 150, 200, 150) described above, then a gray balance and shading can be adjusted more accurately.

Another process of establishing a gray balance and correcting shading with respect to the desired output apparatus 132 will be described below with reference to FIG. 37.

A region Bs ($0 \leq s \leq m$) which is less subject to shading due to the temperature of the exposure drum 38 and has most stable characteristics is selected, and a corrective quantity $\Delta Ps$ as first corrective data which represent the difference between the laser power data Pr, Pg, Pb (m) of the reference output apparatus 130 with respect to the device data R, G, B (R=G=B) and the laser power data Pr, Pg, Pb (m) of the reference output apparatus 130 with respect to the colorimetric values L*, a*, b*, is determined in the same manner as with the step Sa4 in a step Sb1.

Then, using the corrective quantity $\Delta Ps$, output adjustment data $\theta s$ (ob) capable of establishing a gray balance with respect to the region Bs is determined in the same manner as with the step Sa7, and used as gray balance setting data MLUT in the desired output apparatus 132 in a step Sb2.

Second corrective quantities $\Delta P0 \sim \Delta Pm$ with respect to other regions B0~Bm except the region Bs are determined in the same manner as with the step Sb1 in a step Sb3. A difference $\Delta \Delta Psi$ as third differential data which represent the difference between the corrective quantity $\Delta Ps$ and each of the corrective quantities $\Delta P0 \sim \Delta Pm$ is determined as:

$$\Delta \Delta Psi = \Delta Ps - \Delta Pi \ (i=0 \sim m)$$

in a step Sb4.

Figure 38A:
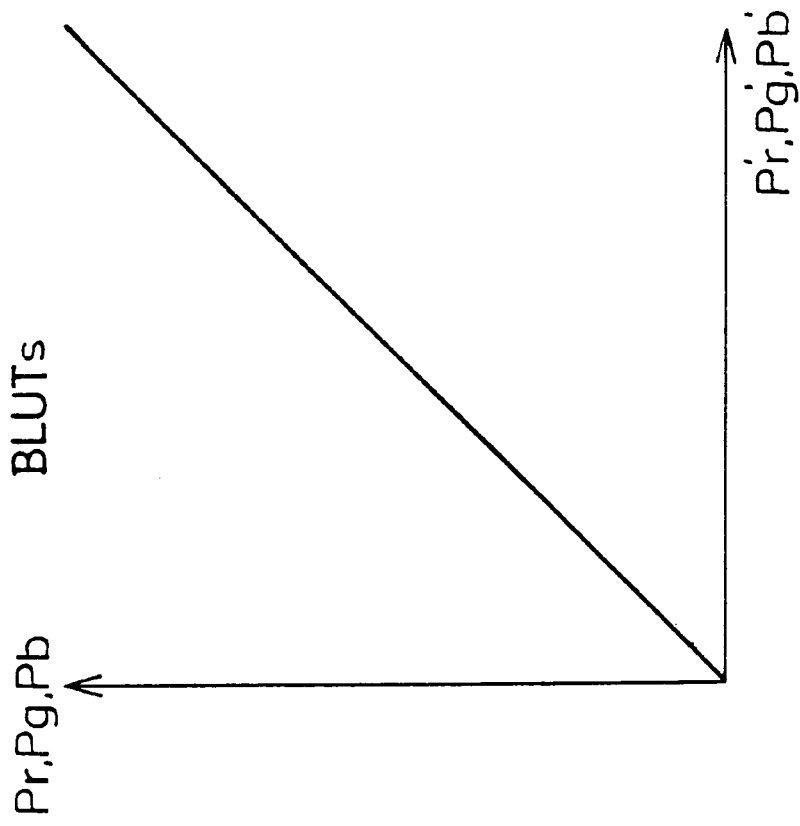
FIGS. 38A and 38B are diagrams showing shading correcting data.
Figure 38B:
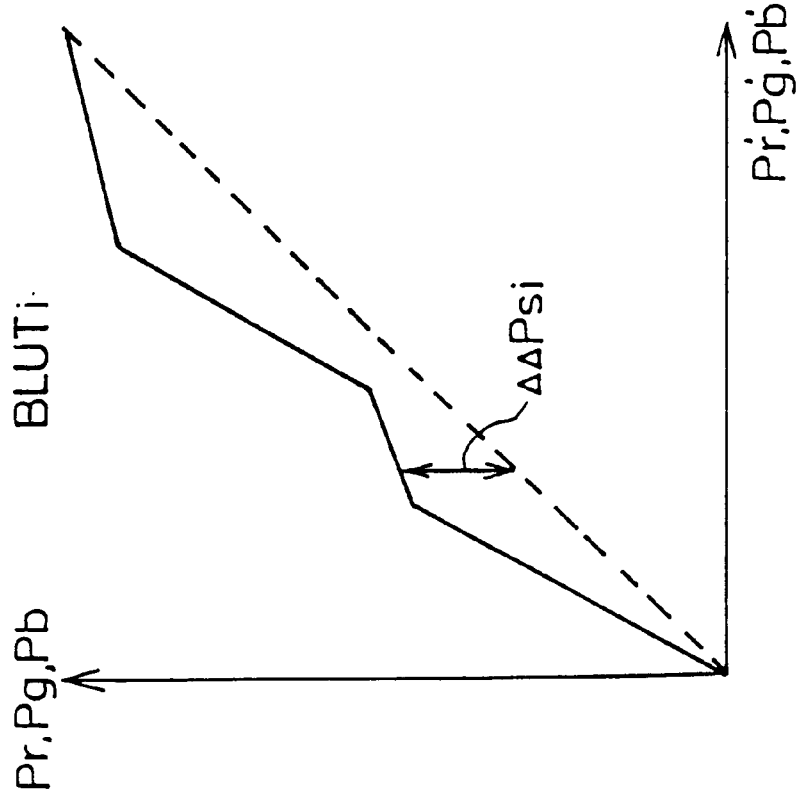

Then, using the difference $\Delta \Delta Psi$, shading correcting data BLUT0~BLUTm with respect to the regions B0~Bm are determined in a step Sb5. For example, shading correcting data BLUTi are established using the difference $\Delta \Delta Psi$, as shown in FIG. 38A, as representing the relationship of laser power data Pr, Pg, Pb subsequent to shading correction to laser power data Pr', Pg', Pb' prior to shading correction. Shading correcting data BLUTs are established, as shown in FIG. 38B, as representing the equalized relationship between laser power data Pr, Pg, Pb subsequent to shading correction and laser power data Pr', Pg', Pb' prior to shading correction.

The gray balance setting data MLUT and the shading correcting data BLUT0~BLUTm may be determined using ratio data, rather than the differential data. Specifically, in the region Bs, ratio data e/d between the data d, e shown in FIG. 32 are determined, and the radio data e/d as first corrective data are multiplied by the data b to produce output adjustment data $\theta s(ob)$, which are used as gray balance setting data MLUT with respect to all the regions B0~Bm. With respect to the regions B0~Bm except the region Bs, the radio data e/d as second corrective data are multiplied by the data b to produce output adjustment data $\theta s(ob)$. The difference $\delta Psi$ as third corrective data between these output adjustment data are determined as follows:

$$\delta Psi = \theta s(ob) - \theta i(ob)$$

Using the difference $\delta Psi$, shading correcting data BLUT0~BLUTm with respect to the regions B0~Bm are determined in the same manner as with the step Sb5.

Since the shading correcting data BLUTi thus determined have been established roughly along the direction indicated by the arrow y on the exposure drum 38, they are interpolated, producing finely divided shading correcting data SLUTj (j=0~n, n>m), as with the output adjustment data LUTj (j=0~n, n>m) in the above embodiment, in a step Sb6.

Figure 39:
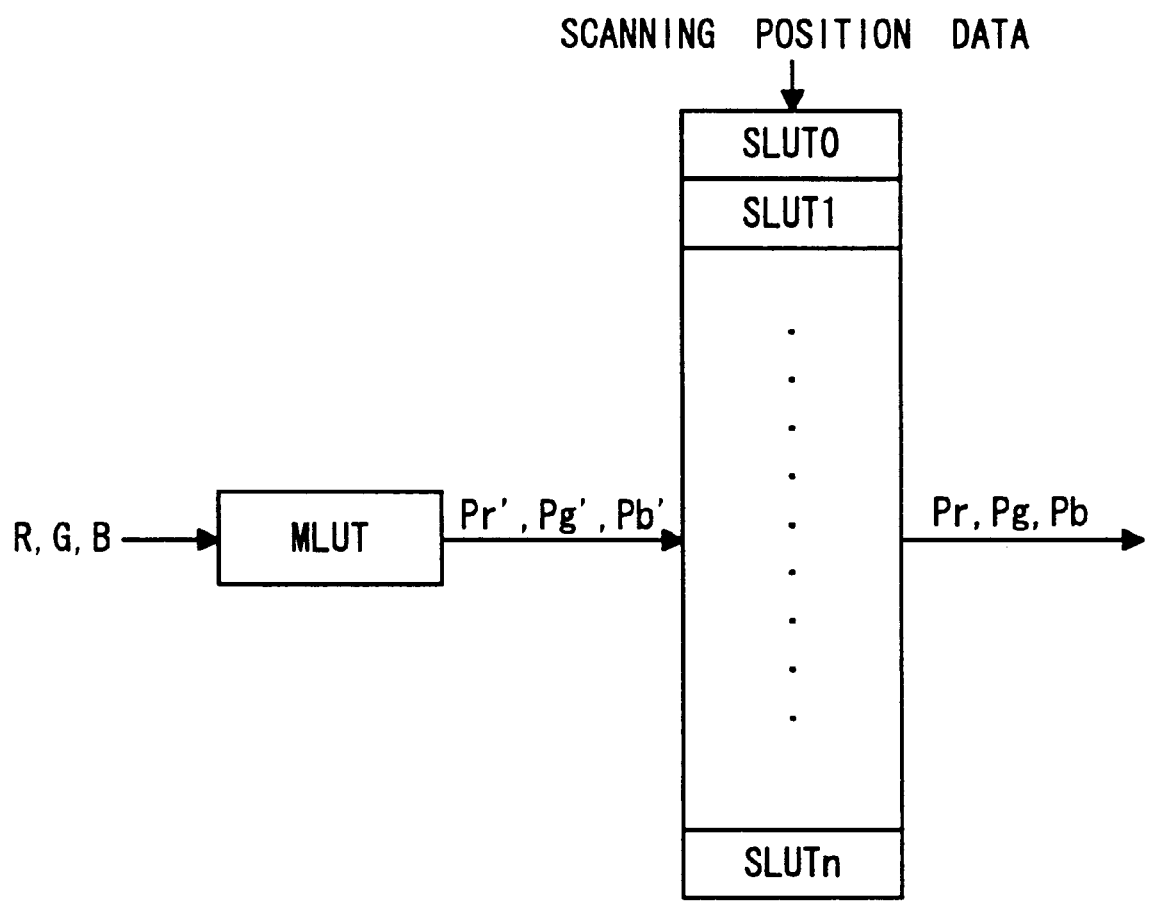
FIG. 39 is a diagram illustrative of a process of converting device data using gray balance setting data and shading correcting data.

The gray balance setting data MLUT and the shading correcting data SLUTj are set in the output adjuster 136, for processing the device data R, G, B as shown in FIG. 39. Specifically, the device data R, G, B are converted by the output adjuster 136 into laser power data Pr', Pg', Pb' for which a gray balance has been established by the gray balance setting data MLUT. Then, the laser power data Pr', Pg', Pb' are converted into laser power data Pr, Pg, Pb whose shading has been corrected by the shading correcting data SLUTj (j=0~n) selected depending on the scanning position data of the laser beams applied by the exposure head 26. The laser beams are then controlled based on the laser power data Pr, Pg, Pb for forming a desired image on the photosensitive medium 28.

If shading can be ignored, only a gray balance may be adjusted using single output adjustment data $\theta$(ob) which represent equalized output adjustment data $\theta i$(ob) established with respect to the regions B0~Bm.

Figure 40:
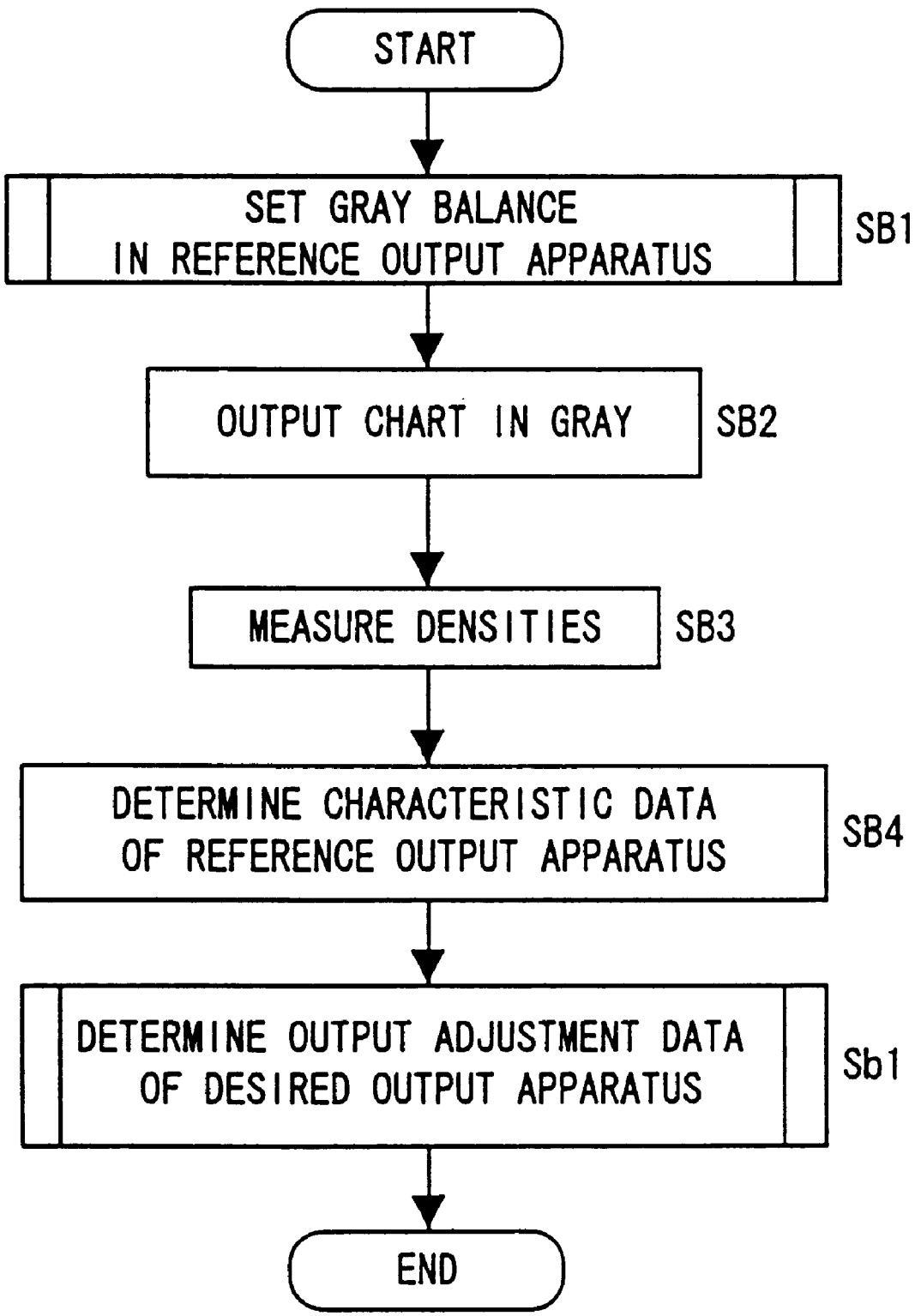
FIG. 40 is a flowchart of another process of establishing a gray balance in the desired output apparatus.

Another process of establishing a gray balance in the desired output apparatus 132 will be described below with reference to FIG. 40.

A gray balance is established with respect to the reference output apparatus 130 according to any desired process in a step SB1.

In the reference output apparatus 130, laser power data Pr, Pg, Pb (m) are generated from the device data R, G, B (m) (R=G=B) using the first output characteristic data $\alpha$(m), and a chart in a color of gray is formed on the recording medium based on the laser power data Pr, Pg, Pb (m) in a step SB2. Densities Dr, Dg, Db (m) of the chart are measured in a step SB3, determining second output characteristic data $\beta'$(m) as gray target gradation data which represent the relationship between the device data R, G, B (m) and the densities Dr, Dg, Db (m).

Then, third output characteristic data $\gamma'$(m) representing the relationship between the laser power data Pr, Pg, Pb (m) and the densities Dr, Dg, Db (m) are determined from the first output characteristic data $\alpha$(m) and the second output characteristic data $\beta'$(m) in a step SB4. The first, second, and third output characteristic data $\alpha$(m), $\beta'$(m), $\gamma'$(m) are supplied to the gray balance/shading adjuster 140 of the desired output apparatus 130.

In the desired output apparatus 130, a chart is outputted based on the device data R, G, B (ob) (R=G=B) for forming a color of gray, and densities Dr, Dg, Db (ob) of the chart are measured. Then, output adjustment data for which a gray balance has been established are determined in the same manner as with the steps Sa1~Sa6 in a step Sb1.

The relationship of the laser power data Pr, Pg, Pb (m) to the densities Dr, Dg, Db (m) may be determined according to the Newton-Raphson formula. Since these data are linearly related to each other, the relationship between these data may be determined easily using any other desired process. Rather than using the third output characteristic data $\gamma'$(m), the second output characteristic data $\beta'$(m) may be used to determine the relationship of the device data R, G, B (m) to the densities Dr, Dg, Db (m), and thereafter the first output characteristic data $\alpha$(m) may be used to determine the laser power data Pr, Pg, Pb (m) for thereby determining the relationship of the laser power data Pr, Pg, Pb (m) to the densities Dr, Dg, Db (m).

In the above embodiment, the output adjustment data for which a gray balance has been established are determined using the first, second, and third output characteristic data α(m), β'(m), γ'(m) or the first and second output characteristic data α(m), β'(m) in the reference output apparatus 130. However, the output adjustment data may be determined using only the second output characteristic data β'(m) which represent the relationship of the densities Dr, Dg, Db (m) to the device data R, G, B (m).

Specifically, after the second output characteristic data β'(m) of the reference output apparatus 130 determined in the step SB3 have been supplied to the gray balance/shading adjuster 140, the desired output apparatus 132 outputs a chart based on the device data R, G, B (ob) (R=G=B) for forming a color of gray, and densities Dr, Dg, Db (ob) of the chart are measured. Then, the densities Dr, Dg, Db (ob) and the densities Dr, Dg, Db (m) with respect to the same device data R, G, B (R=G=B) are associated with each other, and lower power data Pr, Pg, Pb (ob) in the desired output apparatus 132 which are capable of obtaining the densities Dr, Dg, Db (m) are established with respect to the device data R, G, B (ob) (R=G=B), for thereby determining output adjustment data.

Figure 41:
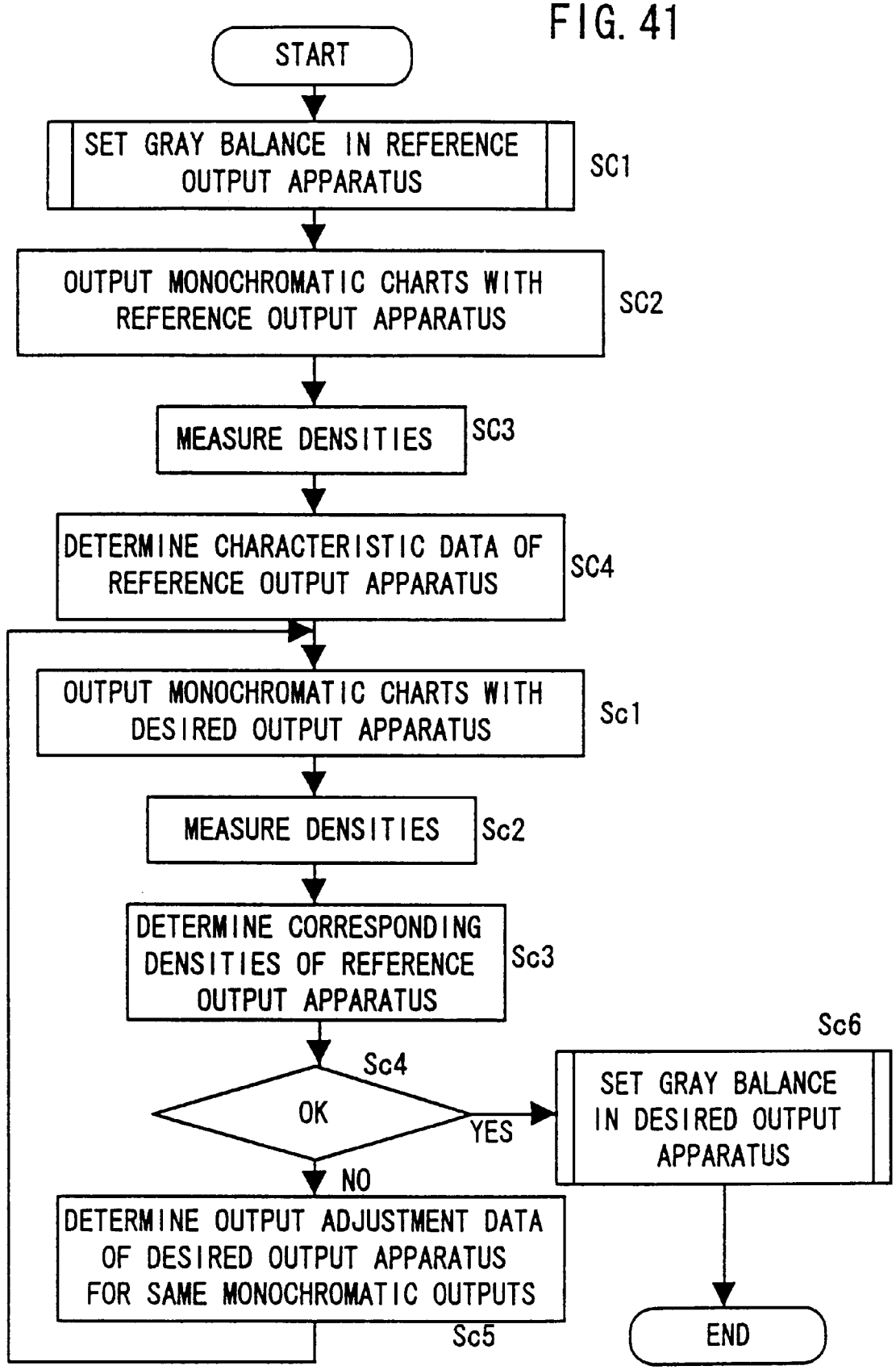
FIG. 41 is a flowchart of still another process of establishing a gray balance in the desired output apparatus.

Still another process of establishing a gray balance in the desired output apparatus 132 will be described below with reference to FIGS. 41 and 42.

A gray balance is established with respect to the reference output apparatus 130 according to any desired process in a step SC1.

In the reference output apparatus 130, laser power data Pr, Pg, Pb (m) are generated from the device data R, G, B (m) using the first output characteristic data α(m), and monochromatic charts in the colors C, M, Y are formed on the recording medium based on the laser power data Pr, Pg, Pb (m) in a step SC2. Densities Dr, Dg, Db (m) of the monochromatic charts are measured in a step SC3, determining second output characteristic data β"(m) as monochromatic target gradation data which represent the relationship between the device data R, G, B (m) and the densities Dr, Dg, Db (m). Then, third output characteristic data γ"(m) representing the relationship between the laser power data Pr, Pg, Pb (m) and the densities Dr., Dg, Db (m) are determined from the first output characteristic data α(m) and the second output characteristic data β"(m) in a step SC4. The first, second, and third output characteristic data α(m), β"(m), γ"(m) are supplied to the gray balance/shading adjuster 140 of the desired output apparatus 132.

Figure 42:
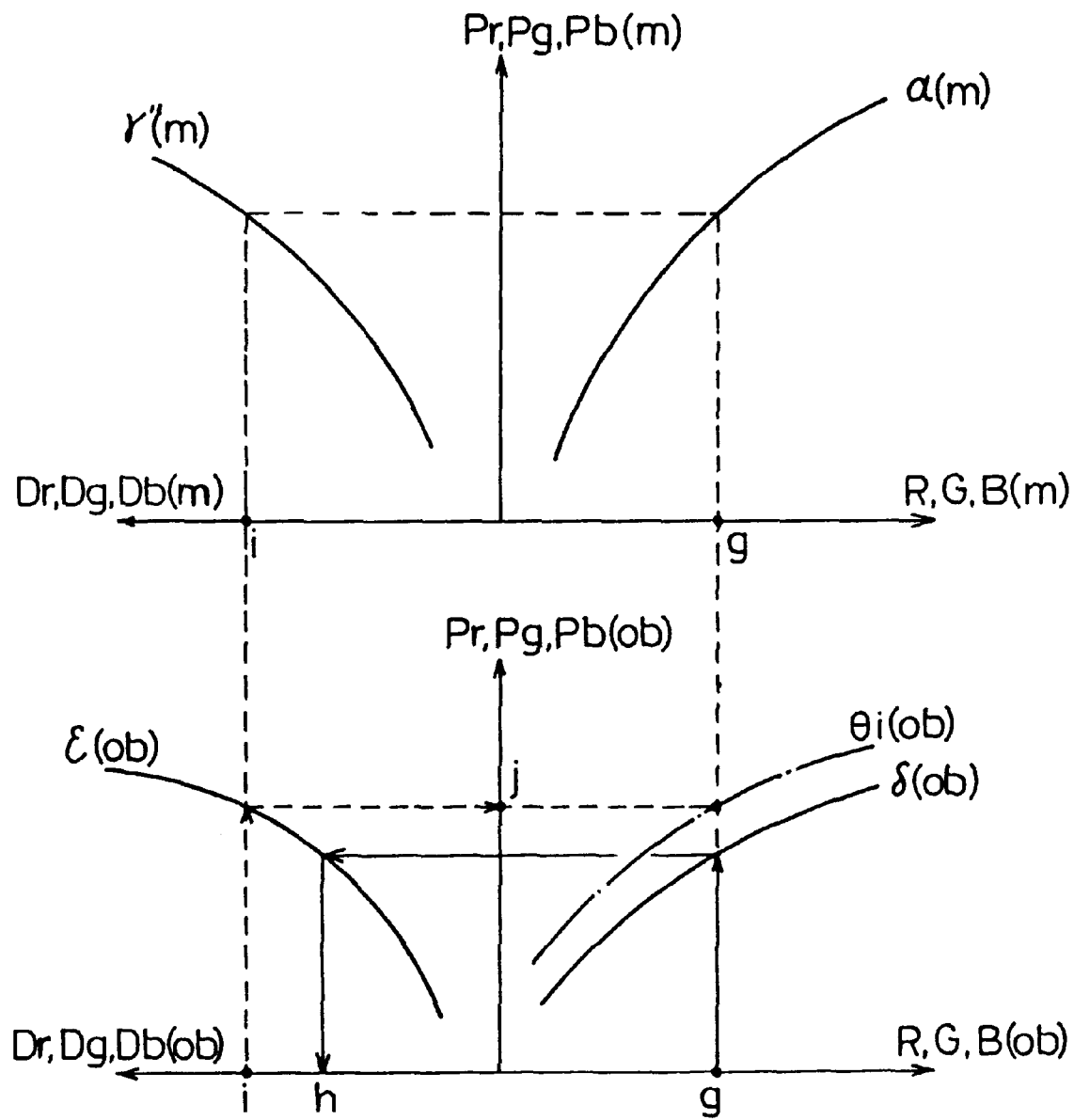
FIG. 42 is a diagram illustrative of the process of establishing a gray balance in the desired output apparatus as shown in FIG. 41.
Figure 43:
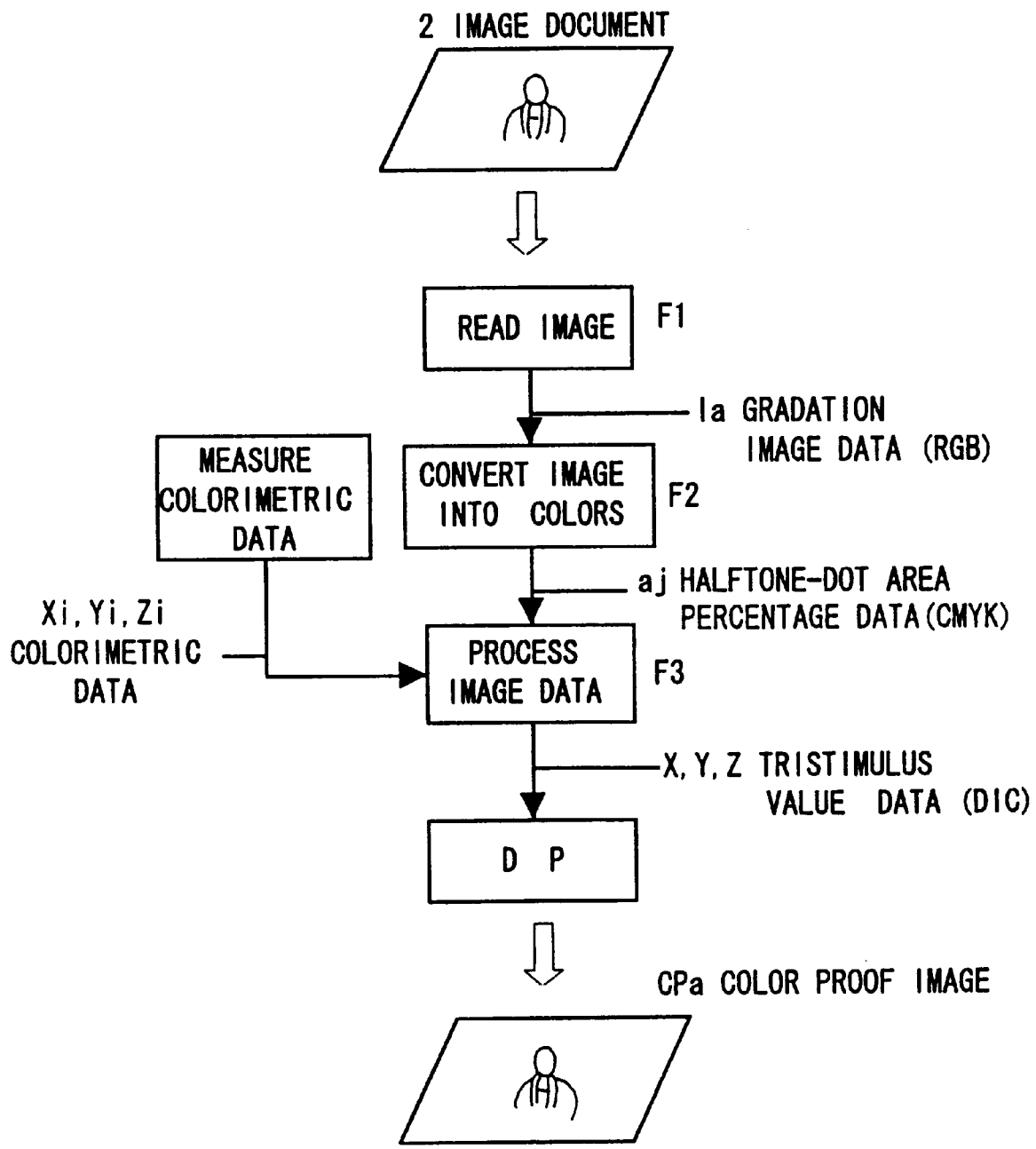
FIG. 43 is a diagram of a conventional process of generating a color proof image.

In the desired output apparatus 130, monochromatic charts are outputted based on the device data R, G, B (ob) (see data g in FIG. 42) for forming desired individual colors in a step Sc1, and densities Dr, Dg, Db (ob) of the monochromatic charts are measured in a step Sc2 (see data h in FIG. 42). Then, densities Dr. Dg, Db (m) (see data i in FIG. 42) obtained when the device data R. G, B (ob) (data g) are given to the reference output apparatus 130 are determining using the first output characteristic data α(m) and the third output characteristic data γ"(m) in a step Sc3.

If the densities Dr. Dg, Db (ob) (data h) and the densities Dr, Dg, Db (m) (data i) are not the same as each other in a step Sc4, then laser power data Pr, Pg, Pb (ob) (see data j in FIG. 42) with respect to the densities Dr, Dg, Db (m) (data i) are determined. Then, output adjustment data θi(ob) in the desired output apparatus 132 which are capable of obtaining individual colors that agree with the individual colors outputted by the reference output apparatus 130 are determined as representing the relationship between the laser power data Pr, Pg, Pb (ob) (data j) and the device data R, G, B (ob) (data g) in a step Sc5.

The steps Sc1~Sc5 are repeated using the output adjustment data θi(ob) thus established for increasing the accuracy of individual colors outputted by the desired output apparatus 132.

After the individual colors have thus been adjusted in the step Sc4, the desired output apparatus 132 establishes a gray balance in substantially the same manner as with the step SC1 in a step Sc6. Since the individual colors have already been adjusted, the output adjustment data θi(ob) established in the desired output apparatus 132 can be regarded such that a temporary gray balance has already been determined therefor. Therefore, the desired output apparatus 132 can quickly determine a final gray balance. Since the output adjustment data θi(ob) are determined with respect to each of the regions B0~Bm, shading correction can simultaneously be carried out.

Although certain preferred embodiments of the present invention have been shown and described in detail, it should be understood that various changes and modifications may be made therein without departing from the scope of the appended claims.

What is claimed is:

1. A system for generating a color proof image for a printed color document including a halftone dot image, comprising:

first converting means for converting image data according to first printing conditions including a sheet and inks of the printed color document to generate image data having a desired color not depending on an output apparatus;

second converting means for converting the image data according to second printing conditions relative to a halftone dot screening process for the printed color document to generate image data having an image structure which is produced with respect to the printed color document according to the halftone dot screening process; and third converting means for producing image data having a desired color and a desired image structure from the image data produced by said first converting means and said second converting means, and converting the image data according to output conditions inherent in the output apparatus, thereby to generate image data depending on said output apparatus;

said output apparatus having means for generating the color proof image based on the image data produced by said third converting means.

2. A system according to claim 1, further comprising first color shift correcting means for correcting a color shift due to the image structure of the image data produced by said second converting means.

3. A system according to claim 1, wherein said first printing conditions include a condition of an observational light source used for comparing the printed color document and the color proof image.

4. A system according to claim 1, wherein said second printing conditions include a screen type, a screen angle, and a screen ruling in said halftone dot screening process.

5. A system according to claim 1, wherein said output apparatus comprises:

an exposure unit for forming a latent color proof image on a photosensitive medium with a beam modulated by the image data and outputted from an exposure head; and a transfer unit for heating the photosensitive medium in superposed relation to an image-receiving medium to transfer a visible color proof image from said photosensitive medium to said image-receiving medium.

6. A system according to claim 5, wherein said transfer unit comprises:
- a heating drum for heating the photosensitive medium in superposed relation to the image-receiving medium;
- a temperature sensor for detecting a temperature of said heating drum; and
- a transfer unit control circuit for setting said heating drum to a predetermined temperature based on a signal from said temperature sensor.

7. A system according to claim 5, wherein said exposure head comprises a plurality of light modulator elements arrayed in a scanning direction for modulating light transmittance thereof with said image data, and a plurality of light sources arrayed in said scanning direction for applying spreading light to said light modulator elements, said exposure unit having an exposure unit control circuit for driving said light modulator elements.

8. A system according to claim 7, wherein said exposure unit control circuit has an interpixel data corrector for correcting interpixel data out of an interference between adjacent pixels formed on said photosensitive medium.

9. A system according to claim 7, wherein said output apparatus has a colorimeter for measuring colors of the visible color proof image produced by said transfer unit, and said exposure unit control circuit has means for correcting a drive signal to be applied to said light modulator elements based on a signal from said calorimeter.

10. A system according to claim 1, further comprising second color shift correcting means for processing the image data according to corrective data established to visually equalize colors of a test chart generated by said output apparatus using the image data produced by said third converting means with colors of a target chart.

11. A system for generating a color proof image for a printed color document, comprising:
- an exposure head having light modulator elements for modulating light to be applied to a photosensitive medium based on image data and a scanning mechanism for scanning the photosensitive medium with the modulated light to produce a color proof image on the photosensitive medium;
- an image data converter for converting the image data into signal data of an output apparatus according to printing conditions including a sheet and inks of the printed color document, output conditions inherent in said output apparatus, and observational conditions for observing the printed color document and the color proof image;
- a detector for detecting an output state of a test pattern outputted by said output apparatus;
- a signal data converter for converting the signal data of the output apparatus into a drive signal for said light modulator elements depending on said output state; and
- second color shift correcting means for correcting the signal data based on corrective data established to equalize colors of a test chart generated by said output apparatus and colors of a target chart.

12. A system according to claim 11, wherein said observational conditions include data of a quantity of ultraviolet radiation from an observational light source.

13. A system according to claim 11, wherein said test chart comprises a central patch in a color of gray and a plurality of patches disposed around said central patch and having color shifts tinted by hues depending on images data R, G, B.

14. A system according to claim 11, wherein said output apparatus comprises:
- an exposure unit for forming a latent color proof image on a photosensitive medium with a beam modulated by the image data and outputted from an exposure head; and
- a transfer unit for heating the photosensitive medium in superposed relation to an image-receiving medium to transfer a visible color proof image from said photosensitive medium to said image-receiving medium.

15. A system according to claim 14, wherein said transfer unit comprises:
- a heating drum for heating the photosensitive medium in superposed relation to the image-receiving medium;
- a temperature sensor for detecting a temperature of said heating drum; and
- a transfer unit control circuit for setting said heating drum to a predetermined temperature based on a signal from said temperature sensor.

16. A system according to claim 14, wherein said exposure head comprises a plurality of light modulator elements arrayed in a scanning direction for modulating light transmittance thereof with said image data, and a plurality of light sources arrayed in said scanning direction for applying spreading light to said light modulator elements, said exposure unit having an exposure unit control circuit for driving said light modulator elements.

17. A system according to claim 16, wherein said exposure unit control circuit has an interpixel data corrector for correcting interpixel data out of an interference between adjacent pixels formed on said photosensitive medium.

18. A system according to claim 16, wherein said output apparatus has a calorimeter for measuring colors of the visible color proof image produced by said transfer unit, and said exposure unit control circuit has means for correcting a drive signal to be applied to said light modulator elements based on a signal from said calorimeter.

* * * * *